(12) United States Patent
Egboiyi et al.

(10) Patent No.: US 12,715,809 B2
(45) Date of Patent: Aug. 25, 2026

(54) COATED GLASS ARTICLES

(71) Applicant: CORNING INCORPORATED, Corning, NY (US)

(72) Inventors: Benedict Osobomen Egboiyi, Horseheads, NY (US); Alexandre Michel Mayolet, Corning, NY (US); Ananthanarayanan Subramanian, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 206 days.

(21) Appl. No.: 18/527,526

(22) Filed: Dec. 4, 2023

(65) Prior Publication Data

US 2024/0182356 A1 Jun. 6, 2024

Related U.S. Application Data

(60) Provisional application No. 63/452,727, filed on Mar. 17, 2023, provisional application No. 63/430,186, filed on Dec. 5, 2022.

(51) Int. Cl.
*G02B 1/115* (2015.01)
*C03C 3/083* (2006.01)
(Continued)

(52) U.S. Cl.
CPC ............ *C03C 17/245* (2013.01); *C03C 3/083* (2013.01); *C03C 3/091* (2013.01)

(58) Field of Classification Search
None
See application file for complete search history.

(56) References Cited

U.S. PATENT DOCUMENTS 8,854,623 B2 10/2014 Fontaine et al.
9,328,016 B2 5/2016 Paulson
(Continued)

FOREIGN PATENT DOCUMENTS

WO 2023/183211 A2 9/2023
WO 2023/230016 A1 11/2023

OTHER PUBLICATIONS

International Search Report and Written Opinion of the International Searching Authority; PCT/US2023/082228; dated Apr. 24, 2024; 10 pages; European Patent Office.
(Continued)

*Primary Examiner* — Kim S. Horger
(74) *Attorney, Agent, or Firm* — William J. Tucker

(57) ABSTRACT

A coated glass article is described herein that includes a glass substrate including a first major surface and a second major surface. The first major surface and the second major surface may be opposing sides of the glass substrate. The coated glass article includes an optical coating disposed on the first major surface of the glass substrate. The coated glass article may have a retained strength after impact damage of greater than or equal to 250 MPa. The coated glass article may have a failure height of greater than or equal to 50 cm as measured according to a Drop Test Method on 80 grit sandpaper. In addition, the substrate can comprise 5.0-10.0 mol % $Li_2O$, 1.0-10.0 mol % $Na_2O$, and a lithium to sodium molar ratio ($Li_2O$:$Na_2O$) from 1.2 to 2.0.

33 Claims, 20 Drawing Sheets

(51) Int. Cl.
*C03C 3/091* (2006.01)
*C03C 17/245* (2006.01)

(56) References Cited

U.S. PATENT DOCUMENTS

| | | | | |
|---|---|---|---|---|
| 9,684,097 | B2 | 6/2017 | Koch et al. | |
| 9,703,011 | B2 | 7/2017 | Adib et al. | |
| 9,726,786 | B2 | 8/2017 | Hart et al. | |
| 10,077,207 | B2 | 9/2018 | Lee et al. | |
| 10,160,688 | B2 | 12/2018 | Amin et al. | |
| 10,162,084 | B2 | 12/2018 | Hart et al. | |
| 10,416,352 | B2 | 9/2019 | Hart et al. | |
| 10,444,408 | B2 | 10/2019 | Bellman et al. | |
| 10,802,179 | B2 | 10/2020 | Bellman et al. | |
| 10,822,271 | B2 | 11/2020 | Adib et al. | |
| 11,016,680 | B2 | 5/2021 | Hart et al. | |
| 11,231,526 | B2 | 1/2022 | Bellman et al. | |
| 11,242,280 | B2 | 2/2022 | Hart et al. | |
| 11,267,973 | B2 | 3/2022 | Amin et al. | |
| 11,500,130 | B2 | 11/2022 | Hart et al. | |
| 11,531,141 | B2 | 12/2022 | Hart et al. | |
| 11,584,681 | B2 | 2/2023 | Cui et al. | |
| 11,714,213 | B2 | 8/2023 | Bellman et al. | |
| 11,884,585 | B2 | 1/2024 | Guo et al. | |
| 2014/0113083 | A1 | 4/2014 | Lee et al. | |
| 2015/0079398 | A1* | 3/2015 | Amin | C01B 21/072<br>423/325 |
| 2016/0102011 | A1 | 4/2016 | Hu et al. | |
| 2016/0102014 | A1 | 4/2016 | Hu et al. | |
| 2018/0011225 | A1 | 1/2018 | Bellman et al. | |
| 2019/0072469 | A1 | 3/2019 | Chambliss et al. | |
| 2019/0369672 | A1 | 12/2019 | Guo et al. | |
| 2020/0023738 | A1* | 1/2020 | Black | H05K 5/0243 |
| 2020/0079689 | A1 | 3/2020 | Guo et al. | |
| 2020/0158916 | A1* | 5/2020 | Hart | G02B 1/113 |
| 2021/0087105 | A1* | 3/2021 | Bellman | C03C 17/42 |
| 2021/0155530 | A1 | 5/2021 | Cui et al. | |
| 2022/0128737 | A1 | 4/2022 | Hart et al. | |
| 2022/0317340 | A1 | 10/2022 | Amin et al. | |
| 2023/0273345 | A1 | 8/2023 | Amin et al. | |
| 2023/0359074 | A1 | 11/2023 | Amin et al. | |
| 2024/0182356 | A1 | 6/2024 | Egboiyi et al. | |

OTHER PUBLICATIONS

Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

Chen et al; "Angle-Adjustment-Based Tunable Chirped Mirrors With Continuous Dispersion Compensation"; Optics Letters, vol. 44, No. 24 (2019), pp. 6053-6056.

Oliver et al., "An improved technique for determining hardness and elastic modulus using load and displacement sensing indentation experiments," J. Mater. Res., vol. 7, No. 6, 1992, pp. 1564-1583.

Oliver et al., "Measurement of Hardness and Elastic Modulus by Instrument Indentation: Advances in Understanding and Refinements to Methodology," J. Mater. Res., vol. 19, No. 1, 2004, pp. 3-20.

Reddy, K.P.R. et al, "Fracture Toughness Measurement of Glass and Ceramic Materials Using Chevron-Notched Specimens," J. Am. Ceram. Soc., 71 [6], C-310-C-313 (1988).

Corning Inc., "Information Related to Coatings on Commercially Available Tablet Devices—Supplying data related to the Apple iPad Air 2 (released Oct. 2014), Apple iPad Pro 2nd Generation (released Jun. 2017), and Apple iPad Air 4th Generation (released Oct. 2020)" 28 pages. This document has not been published in a book, magazine, journal, etc.

* cited by examiner

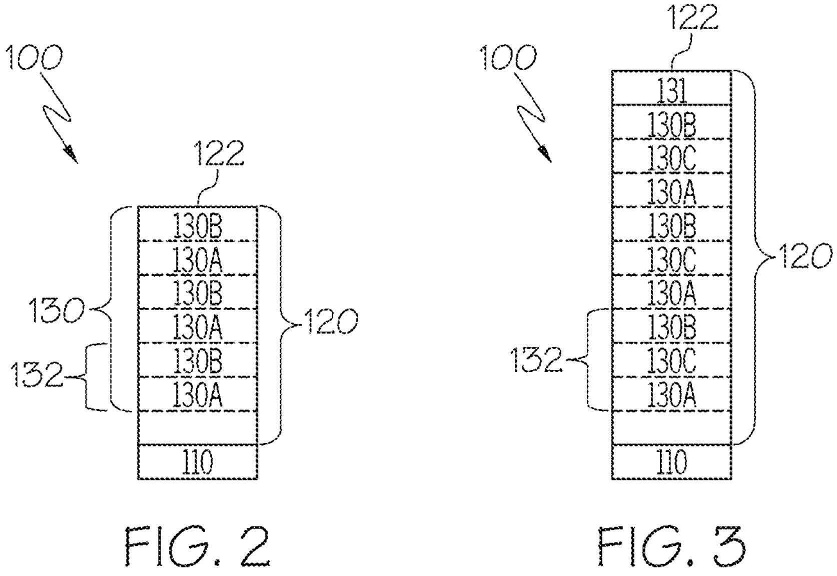
100
122
130B
130A
130B
130A
130B
130A
130
132
120
110
FIG. 2
100
122
131
130B
130C
130A
130B
130C
130A
130B
130C
130A
132
120
110
FIG. 3
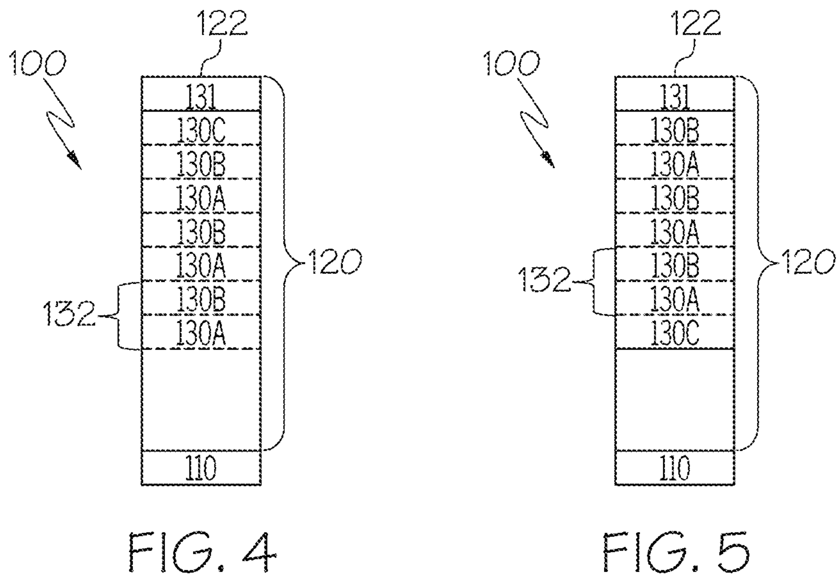
100
122
131
130C
130B
130A
130B
130A
130B
130A
132
120
110
FIG. 4
100
122
131
130B
130A
130B
130A
130B
130A
130C
132
120
110
FIG. 5

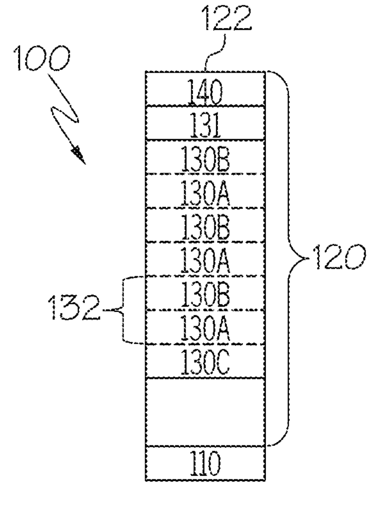
FIG. 6
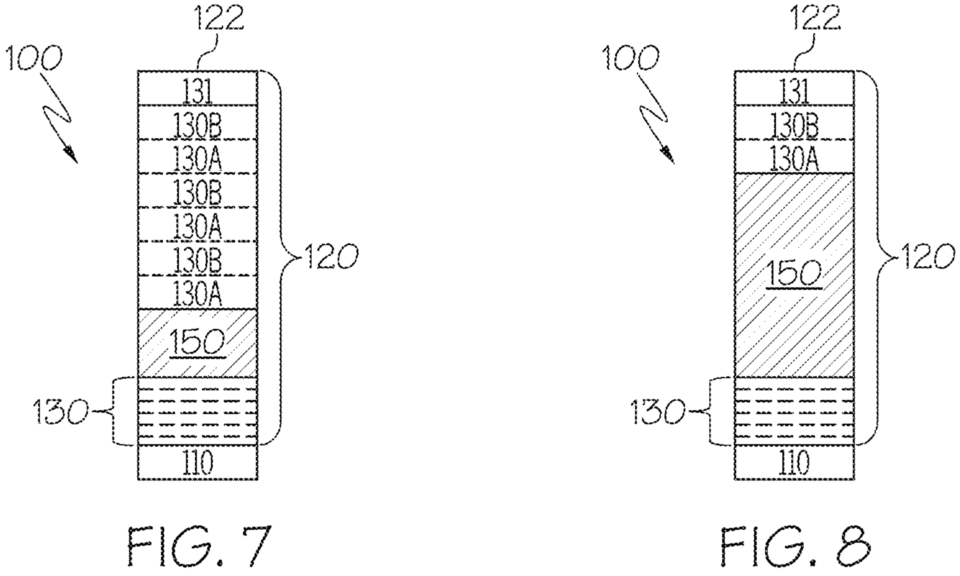
FIG. 7
FIG. 8

10
12
14
16
18
20
22
24

307
306
303
302
301
305
304

COATED GLASS ARTICLES

CLAIM OF PRIORITY

This application claims the benefit of priority under 35 U.S.C. § 119 of U.S. Provisional Application No. 63/452,727 filed Mar. 17, 2023 and claims the benefit of priority under 35 U.S.C. § 119 of U.S. Provisional Application No. 63/430,186 filed Dec. 5, 2022 The entire contents of each of these applications are hereby incorporated herein by reference for all purposes.

FIELD OF THE DISCLOSURE

This disclosure relates to coated articles and, more particularly, to coated glass articles suitable for use as a cover, user interface and/or display for electronic device products, e.g., mobile devices.

BACKGROUND

Cover articles are often used to protect critical devices within electronic products, to provide a user interface for input and/or display, and/or many other functions. Such products include mobile devices, such as smart phones, mp3 players, and computer tablets. Cover articles also include architectural articles, transportation articles (e.g., articles used in automotive applications, trains, aircraft, sea craft, etc.), appliance articles, or any article that requires some transparency, scratch-resistance, abrasion resistance, or a combination thereof.

These applications often demand a combination of scratch-resistance, drop performance, retained strength after surface damage, and strong optical performance characteristics. The optical performance can be measured in terms of maximum light transmittance and minimum reflectance.

Often, coatings applied to glass substrates for optical property enhancements (e.g., increased transmittance and/or reduced reflectance) and/or scratch resistance can degrade the mechanical properties (e.g., drop resistance and/or retained strength after surface damage) of the cover articles employing these features. In general, state-of-the art cover articles do not meet the full combination of these demands, or at least can be improved.

SUMMARY

The present disclosure discloses coated articles that meets the aforementioned demands of scratch-resistance, drop performance, retained strength after surface damage, and strong optical performance characteristics, e.g., in terms of maximum light transmittance and minimum reflectance.

According to one or more embodiments of the present disclosure, a coated glass article may comprise a glass substrate comprising a first major surface and a second major surface. The first major surface and the second major surface may be opposing sides of the glass substrate. The glass substrate may have a composition comprising: $SiO_2$ in an amount greater than or equal to 50.0 mol % and less than or equal to 70.0 mol %; $Al_2O_3$ in an amount greater than or equal to 10.0 mol % and less than or equal to 20.0 mol %; $P_2O_5$ in an amount greater than or equal to 0.0 mol % and less than or equal to 2.0 mol %; $B_2O_3$ in an amount greater than or equal to 1.0 mol % and less than or equal to 6.0 mol %; $Li_2O$ in an amount greater than or equal to 5.0 mol % and less than or equal to 10.0 mol %; $Na_2O$ in an amount greater than or equal to 1.0 mol % and less than or equal to 10.0 mol %; and $K_2O$ in an amount greater than or equal to 0.01 mol % and less than or equal to 1.0 mol %. The coated glass article may also comprise an optical coating disposed on the first major surface of the glass substrate. The optical coating may form an anti-reflective surface. The optical coating may comprise a scratch-resistant layer and an anti-reflective coating comprising a plurality of alternating high refractive index and low refractive index layers disposed between the scratch-resistant layer and the glass substrate. The optical coating may have a physical thickness of from about 50 nm to about 10 microns. The coated glass article may exhibit a maximum hardness of from about 10 GPa to about 30 GPa measured at an indentation depth of about 600 nm from the anti-reflective surface of the optical coating, the maximum hardness measured by a Berkovich Indenter Hardness Test. The coated glass article may exhibit a retained strength of greater than or equal to 250 MPa. Accordingly, these coated glass article embodiments can be employed in various electronic device products and can offer an advantageous combination of scratch-resistance, drop performance, retained strength after surface damage, and strong optical performance characteristics (e.g., increased transmittance and reduced reflectance).

According to additional embodiments of the present disclosure, a coated glass article for a mobile display cover may comprise a glass substrate having a composition comprising: $SiO_2$ in an amount greater than or equal to 50.0 mol % and less than or equal to 70.0 mol %, $Al_2O_3$ in an amount greater than or equal to 10.0 mol % and less than or equal to 25.0 mol %, $Li_2O$ in an amount greater than or equal to 5.0 mol % and less than or equal to 15.0 mol %. The glass substrate may comprise a first major surface and a second major surface. The first major surface and the second major surface may be opposing sides of the glass substrate. The glass substrate may also comprise a depth of layer of greater than or equal to 3 μm. The glass substrate may also comprise an elastic modulus of greater than or equal to 72 GPa. The glass substrate may also comprise a fracture toughness of greater than or equal to 0.7 $MPa \cdot m^{0.5}$. The glass substrate may also comprise an optical coating disposed on the first major surface of the glass substrate. The coated glass article may exhibit an average photopic transmittance of greater than 85% and an average photopic reflectance of less than 8%. The coated glass article may exhibit a maximum hardness of from about 12 GPa to about 30 GP as measured at an indentation depth of about 600 nm from the anti-reflective surface of the optical coating, the maximum hardness measured by a Berkovich Indenter Hardness Test. The coated glass article may also exhibit a retained strength of greater than or equal to 250 MPa. Accordingly, these coated glass article embodiments can be employed in various electronic device products and can offer an advantageous combination of scratch-resistance, drop performance, retained strength after surface damage, and strong optical performance characteristics (e.g., increased transmittance and reduced reflectance).

According to yet more additional embodiments of the present disclosure, a coated glass article may comprise a glass substrate comprising a first major surface and a second major surface, wherein the first major surface and the second major surface are opposing sides of the glass substrate. The coated glass article may comprise an optical coating disposed on the first major surface of the glass substrate, the optical coating forming an anti-reflective surface, wherein the optical coating comprises a scratch-resistant layer and an anti-reflective coating comprising a plurality of alternating high refractive index and low refractive index layers disposed between the scratch-resistant layer and the glass substrate. The optical coating has a physical thickness of from about 50 nm to about 10 microns. The coated glass article exhibits a maximum hardness of from about 10 GPa to about 30 GPa measured at an indentation depth of about 600 nm from the anti-reflective surface of the optical coating, the maximum hardness measured by a Berkovich Indenter Hardness Test. The coated glass article has a failure height of from about 50 cm to about 220 cm as measured according to a Drop Test Method on 80 grit Garnet sandpaper. Accordingly, these cover article embodiments can be employed in various electronic device products and can offer an advantageous combination of scratch-resistance, drop performance, retained strength after surface damage, and strong optical performance characteristics (e.g., increased transmittance and reduced reflectance).

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a cross-sectional side view of a coated article, according to one or more embodiments described herein;

FIG. 3 is a cross-sectional side view of a coated article, according to one or more embodiments described herein;

FIG. 4 is a cross-sectional side view of a coated article, according to one or more embodiments described herein;

FIG. 5 is a cross-sectional side view of a coated article, according to one or more embodiments described herein;

FIG. 6 is a cross-sectional side view of a coated article, according to one or more embodiments described herein;

FIG. 7 is a cross-sectional side view of a coated article, according to one or more embodiments described herein;

FIG. 8 is a cross-sectional side view of a coated article, according to one or more embodiments described herein;

DETAILED DESCRIPTION

Reference will now be made in detail to various embodiments of coated glass articles, examples of which are illustrated in the accompanying drawings. The embodiments disclosed herein may include glass substrates having optical coatings. Further, the coated glass articles are suitable for use as a cover article, user interface and/or display for electronic device products, e.g., mobile devices. As described herein, the coated glass articles may have enhanced optical characteristics as well as enhanced mechanical characteristics due to the combination of particular optical coatings on particular glass substrates. The use of these particular optical coatings in combination with these particular glass substrates, according to one or more embodiments, may provide synergistic enhancements as compared to comparative articles known in the art. In addition, the coated glass articles, cover articles, user interfaces and/or displays of the disclosure can be employed in combination with screen protectors with optical coatings, as disclosed in U.S. Provisional Patent Application No. 63/452,722, filed on Mar. 17, 2023, and entitled "Screen Protectors Tailored for Electronic Device Displays", the contents of which are hereby incorporated by reference herein.

Further, the coated glass articles of the disclosure exhibit a combination of scratch-resistance, drop performance, retained strength after surface damage, and strong optical performance characteristics. The optical performance can be measured in terms of maximum light transmittance and minimum reflectance. In general, the coated glass articles of the disclosure have a glass substrate including a first major surface and a second major surface opposing the first major surface. These coated glass articles further include an optical coating disposed on the first major surface of the glass substrate. The coated glass article may have a retained strength after impact damage of greater than or equal to 250 MPa. The coated glass article may have a failure height of greater than or equal to 50 cm as measured according to a Drop Test Method on 80 grit sandpaper. In addition, the substrate can comprise a glass composition with 5.0-10.0 mol % $Li_2O$, 1.0-10.0 mol % $Na_2O$, and a lithium to sodium molar ratio ($Li_2O$:$Na_2O$) from 1.2 to 2.0. In some implementations, the coated glass articles of the disclosure employ a substrate with a glass composition that is substantially free of $Ta_2O_5$, $HfO_2$, $La_2O_3$, and $Y_2O_3$. Ultimately, the composition selected for the glass substrates of the coated articles of the disclosure can contribute to both the drop performance and retained strength after surface damage of the article, while enabling the use of a coating that can provide the other stated performance attributes (e.g., scratch resistance, high transmittance and low reflectance).

Figure 1A:
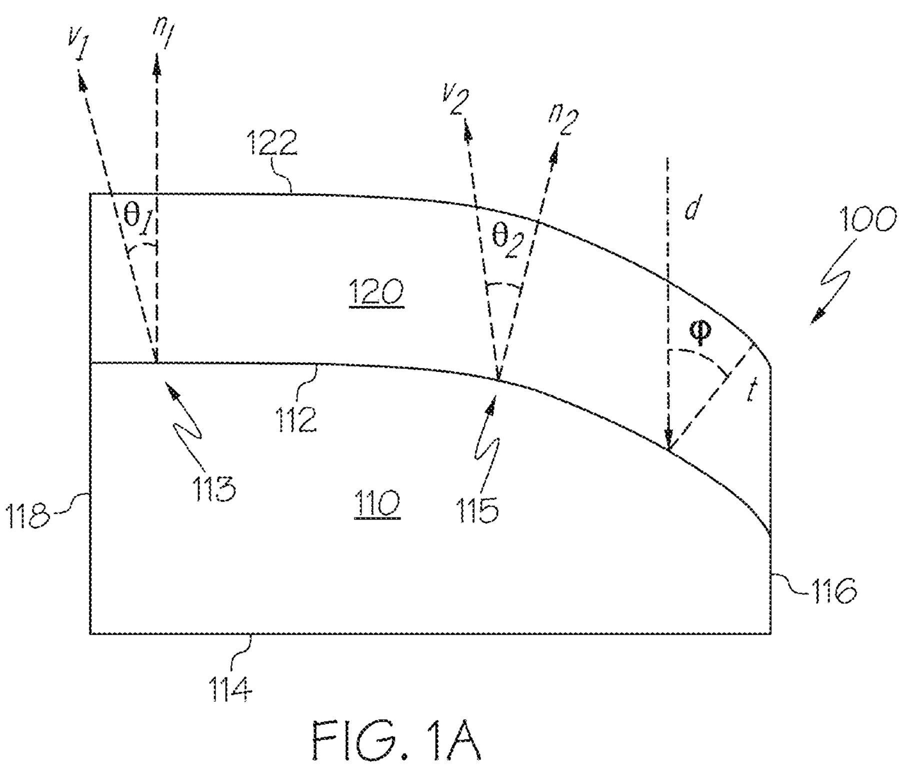
FIG. 1A is a cross-sectional side view of a coated article, according to one or more embodiments described herein.
Figure 1B:
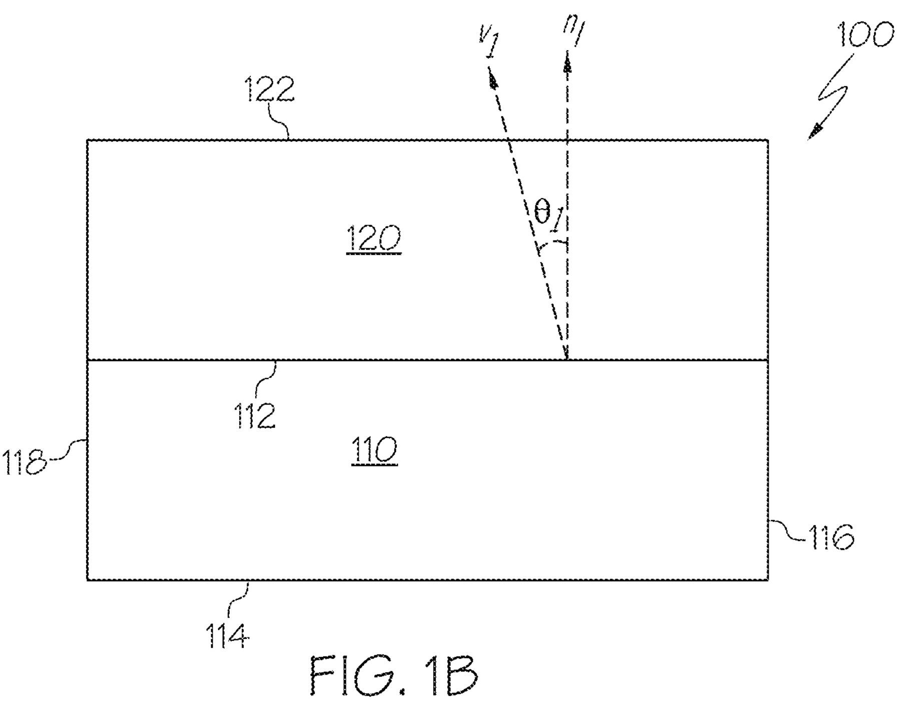
FIG. 1B is a cross-sectional side view of a coated article, according to one or more embodiments described herein.

Referring to FIGS. 1A and 1B, a coated glass article 100, according to one or more embodiments disclosed herein, may include a glass substrate 110, and an optical coating 120 disposed on the substrate. The glass substrate 110 may include opposing major surfaces 112, 114 and opposing minor surfaces 116, 118. The optical coating 120 is shown in FIGS. 1A and 1B as being disposed on a first opposing major surface 112; however, the optical coating 120 may be disposed on the second opposing major surface 114 and/or one or both of the opposing minor surfaces, in addition to or instead of being disposed on the first opposing major surface 112. As is depicted, the second major surface 114 may be planar. In other embodiments, the second major surface 114 may be non-planar. The optical coating 120 forms an anti-reflective surface 122. The anti-reflective surface 122 forms an air-interface and generally defines the edge of the optical coating 120 as well as the edge of the overall coated glass article 100. The glass substrate 110 may be substantially transparent, as described herein.

According to one or more embodiments described herein, the glass substrate 110 may be planar. As used herein, planar substrates refer to substrates where the major surfaces 112, 114 of the glass substrate 110 are geometrically flat in shape. For example, as shown in FIG. 1B, the major surfaces 112, and 114 may comprise a flat geometry.

According to one or more embodiments described herein, the glass substrate 110 may be non-planar. As used herein, non-planar substrates refer to substrates where at least one of the major surfaces 112, 114 of the glass substrate 110 is not geometrically flat in shape. For example, as shown in FIG. 1A, a portion of first major surface 112 may comprise a curved geometry. The degree of curvature of a first major surface 112 may vary. For example, embodiments may have a curvature measured by an approximate radius of about 1 mm to several meters (i.e., nearly planar), such as from about 3 mm to about 30 mm, or from about 5 mm to about 10 mm. In embodiments, the non-planar substrate may comprise planar portions, as shown in FIG. 1A. For example, a touch screen for a portable electronic device may comprise a substantially planar surface at or near its center and curved (i.e., non-planar) portions around its edges. Examples of such substrates include the cover glass from an Apple iPhone 6 smartphone or a Samsung Galaxy S6 Edge smartphone. While some embodiments of non-planar substrates are depicted, it should be understood that non-planar substrates may take on a wide variety of shapes, such as curved sheets, faceted sheets, sheets with angular surfaces, or even tubular sheets.

In one more embodiments, where the glass substrate 110 is non-planar the glass substrate 110 comprises a first major surface 112 which comprises at least two portions, a first portion 113 and a second portion 115, which are not flat relative to one another (i.e., the portions 113, 115 are not in the same plane or otherwise parallel to one another). According to some embodiments, the second portion 115 is curved or faceted in shape. A direction $n_1$ is normal to the first portion 113 of first major surface 112 and a direction $n_2$ is normal to the second portion 115 at position 115A of first major surface 112. In embodiments, the angle between $n_1$ and $n_2$ may be at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 70 degrees, at least about 80 degrees, at least about 90 degrees, at least about 120 degrees, at least about 150 degrees, or even at least about 180 degrees (e.g., the angle between $n_1$ and $n_2$ may be 180 degrees for a tubular substrate. For example, the angle between $n_1$ and $n_2$ may be in a range from about 10 degrees to about 30 degrees, from about 10 degrees to about 45 degrees, from about 10 degrees to about 60 degrees, from about 10 degrees to about 75 degrees, from about 10 degrees to about 90 degrees, from about 10 degrees to about 120 degrees, from about 10 degrees to about 150 degrees, or from about 10 degrees to about 180 degrees. In additional embodiments, the angle between $n_1$ and $n_2$ (and/or $n_3$) may be in a range from about 10 degrees to about 80 degrees, from about 20 degrees to about 80 degrees, from about 30 degrees to about 80 degrees, from about 40 degrees to about 80 degrees, from about 50 degrees to about 80 degrees, from about 60 degrees to about 80 degrees, from about 70 degrees to about 80 degrees, from about 20 degrees to about 180 degrees, from about 30 degrees to about 180 degrees, from about 40 degrees to about 180 degrees, from about 50 degrees to about 180 degrees, from about 60 degrees to about 180 degrees, from about 70 degrees to about 150 degrees, or from about 80 degrees to about 180 degrees.

Light transmitted through or reflected by the coated glass article 100 may be measured in a viewing direction v (i.e., $v_1$ for $n_1$, $v_2$ for $n_2$.), as shown in FIGS. 1A and 1B, which may be non-normal to the first major surface 112 of the glass substrate 110. The viewing direction may be referred to as an incident illumination angle as measured from the normal direction at each surface. For example, and as will be explained herein, reflected color, transmitted color, average light reflectance, average light transmission, photopic reflectance, and photopic transmission. The viewing direction v defines an incident illumination angle θ which is the angle between the direction normal to a substrate surface n and the viewing direction v (i.e., $\theta_1$ is the incident illumination angle between normal direction $n_1$ and viewing direction $v_1$, and $\theta_2$ is the incident illumination angle between normal direction $n_2$ and viewing direction $v_2$.). It should be understood that while FIGS. 1A and 1B depict incident illumination angles that are not equal to 0 degrees, in some embodiments, the incident illumination angle may be equal to about 0 degrees such that the v is equal to n. Optical properties of a portion of the coated glass article 100 may be different when varying the incident illumination angle θ.

As used herein, "transmitted color" and "reflected color" refer to the color transmitted or reflected through the transparent articles of the disclosure with regard to color in the CIE L*,a*,b* colorimetry system under a D65 illuminant. More specifically, the "transmitted color" and "reflected color" are given by $\sqrt{(a^{*}2+b^{*2})}$, as these color coordinates are measured through transmission or reflectance of a D65 illuminant through the primary surfaces of the substrate of the transparent article over an incident angle range, e.g., from 0 degrees to 10 degrees.

In one or more embodiments, a single layer or multiple layers of the optical coating 120 may be deposited onto the glass substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (PVD) (e.g., reactive or nonreactive sputtering or laser ablation), thermal or e-beam evaporation and/or atomic layer deposition. Liquid-based methods may also be used such as spraying, dipping, spin coating, or slot coating (for example, using sol-gel materials). In some embodiments, a PVD technique can be employed that relies on "metal-mode" reactive sputtering in which a thin metallic layer is deposited in one portion of a deposition chamber, and the film is reacted with gases such as oxygen or nitrogen in a different portion of the deposition chamber. In some embodiments, a PVD technique can be employed that relies on "in-line" reactive sputtering in which a material deposition and reaction occur in the same section of the deposition chamber. Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. These deposition processes, particularly the PVD methods, may have a "line-of-sight" character in which deposited materials move in a uniform direction during deposition onto the substrate regardless of the angle between the deposition direction and the angle normal to the substrate surface.

Referring to FIG. 1A, in some embodiments, the thickness of the optical coating 120, as measured in the direction normal to the substrate disposed on first major surface 112, may differ between portions of the optical coating 120 disposed over the first portion 113 and the second portion 115 of the glass substrate 110. Referring to FIG. 1A, arrow d shows a line-of-sight deposition direction. The deposition direction d in FIG. 1A is normal to second major surface 114 of the glass substrate 110, such as may be common in a system where the substrate rests on second major surface 114 during deposition of the optical coating 120. The arrow of line d points in the direction of the line-of-sight deposition. Line t shows the direction normal to the first major surface 112 of the glass substrate 110. The normal thickness of the optical coating 120, as measured in the direction normal to the first major surface 112 is represented by the length of line t. The deposition angle φ is defined as the angle between the deposition direction d and the direction normal to the first major surface 112 (i.e., line t). If the optical coating 120 is deposited with a line-of-sight deposition character, the thickness of a portion of the optical coating 120 has been observed for some vapor deposition processes to generally follow the square root of cosine of φ (see FIG. 9 and corresponding description). Thus, as φ increases, the thickness of the optical coating 120 decreases. While the actual thickness of optical coatings 120 deposited by vapor deposition may be different from that determined by the scalar of the square root of cosine φ, it provides an estimate useful for modeling optical coating designs which may have good performance when applied onto non-planar glass substrates 110. Additionally, while $n_1$ and d are in the same direction in FIG. 1A, they need not be in the same direction in all embodiments. Without being bound by theory, it has also been observed that the physical vapor deposition processes of the disclosure do not always follow a completely line-of-sight character, as complex interactions between the sputtered atoms and molecules can interact with one another during deposition with the sputtering plasma as they travel from the sputtering target to the glass substrate 110. Nevertheless, one can tune the physical vapor deposition processes to achieve a square root of cosine of φ relationship (see FIG. 9 and corresponding description), which can then be advantageously employed in configuring the structure of the optical coating 120 to have desirable optical and mechanical properties at both of the first and second portions 113, 115.

It should be understood that throughout this disclosure, unless specified otherwise, thickness of the optical coating 120 is measured in the normal direction n. In embodiments where the glass substrate 110 is non-planar, based on a line-of-sight coating scheme that is directed at the first portion 113, the thickness of the coating may be thicker over the first portion 113 than the second portion 115. The difference in thickness can be described by a "scaling factor," which is the difference in coating thickness between the two portions 113, 115. For example, and as is described herein, a scaling factor of 0.5 corresponds to an embodiment where the thickness of the coating at the second portion 115 is 50% of the thickness of the coating at the first portion 113, where both thicknesses are measured normal to the normal direction n. In some embodiments, where the glass substrate 110 is non-planar the thickness of the coating may be uniform across the entire surface of the glass substrate 110.

Embodiments of the disclosure also include coated glass articles 100 (see FIGS. 1-8) having a range of part surface angles (part surface curvature), including coated articles with no surface curvature, that are combined with an optical coating 120 in which the optical coating 120 is designed to be robust to thinning of the coating that occurs from various coating deposition processes. The net result is a coated glass article 100 having a range of part surface curvature angles with an optical coating 120 having controlled hardness, reflectance, color, and color shift with viewing angle over the entire surface of the coated glass article 100, including a portion or all of the curved regions (e.g., at second portion 115). In addition to absolute levels of hardness, reflectance, and color that meet certain targets, the coated glass articles 100 can also exhibit small changes in these values, particularly small changes in visible reflectance and color, when the thickness of the optical coating 120 is reduced by a scaling factor corresponding to the actual reduction in coating thickness that occurs in an industrially-scalable reactive sputtering process on a manufactured part with surface curvature angles from 0 to 90 degrees.

An important piece of understanding to create optimal coating designs for a coated glass article 100 (see FIGS. 1-8) with surface curvature, is an understanding of the particular coating process used to form the layers of the optical coating 120, and the level of line-of-sight coating effects that occur in that process. Some coating deposition processes have no line of sight behavior at all, such as atomic layer deposition, where one monolayer of molecules or atoms is deposited at a time. However, this process can be slow (at least as limited by current processing technology) and is typically too expensive for applications involving large substrates or industries that are cost sensitive, such as the consumer electronics and automotive industries. A more cost-effective process for forming the optical coating 120, reactive sputtering, is readily scalable to large areas and can be relatively low cost. However the nature of industrial reactive sputtering processes generally includes a deposition that has at least some line-of-sight character, meaning that the surfaces of the article directly facing the sputtering targets will receive more deposited material (resulting in a thicker coating), while surfaces of the article tilted at some angle relative to the sputtering targets (e.g., its curved surfaces) will generally receive less material, resulting in a thinner coating.

Accordingly, in one or more embodiments, the optical coating 120 has been optimized with regard to the tradeoffs between hardness, reflectance, color, and number of coating layers. Adding an arbitrary number of layers to achieve an optical target (e.g., without consideration to hardness or other mechanical properties) in the optical coating will tend to reduce the hardness of the coating to levels below the required range for applications targeting scratch-resistant chemically strengthened glass for consumer electronics, automotive, and touch screen applications (e.g., to a hardness <<12 GPa, as measured by Berkovich Indenter Hardness Test at an indentation depth of about 100 nm or greater). In the case of coated glass articles 100 having curved surfaces (e.g., at the second portion 115 of the first major surface 112), it can be important to assess how part surface curvature relates to the amount, or scale factor, by which the layers of the optical coating 120 will be reduced or thinned from their target design thicknesses. The target design thickness (or the thickness at 100% scale factor or 1.0 scale factor) is generally the thickness that is coated on the “flat” areas of the coated glass article 100 (e.g., at the first portion 113 of the first major surface 112), those portions of the coated glass article 100 that are closest to directly facing the sputtering targets, or those portions of the coated glass article 100 that receive the most material from the sputtering targets. Any part of the coated glass article 100 that is curved away from this maximum thickness deposition direction will generally receive less material, resulting in a thinner coating on these curved areas as each of the layers of the optical coating 120 is formed. For optimal optical coating design for the optical coating 120 of embodiments of the coated glass articles 100 (see FIGS. 1-8), it can be beneficial to understand the design window in terms of target part curvature, as well as how part curvature corresponds to coating thinning in the deposition process. This can enable optical design of the optical coating 120 in such a way that optimizes, for example, reflectance and color over the target range of part angles and coating thickness variation, without sacrificing too much in terms of the hardness of the coating, number of layers in the coating, or other metrics. Said another way, without an understanding of the relevant window of part angles and coating thickness scale factors, one can over-design the coating to include too many layers to achieve a desired set of optical properties, thus sacrificing hardness and scratch resistance.

Figure 9:
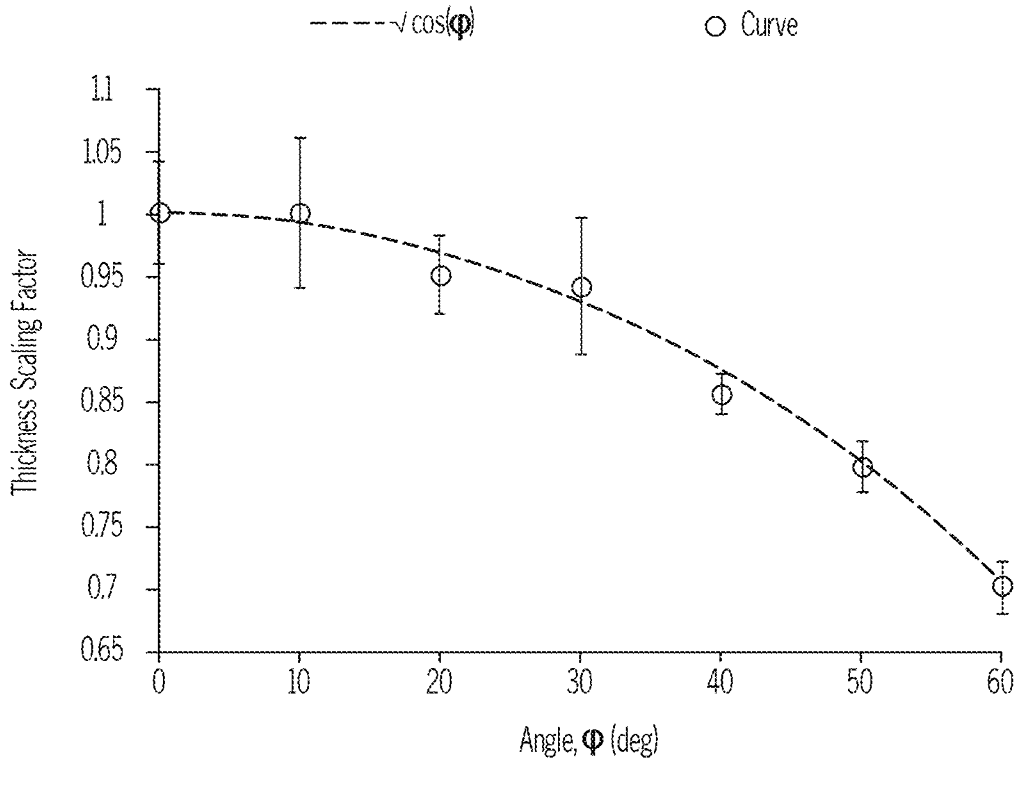
FIG. 9 is a plot of optical coating thickness scaling factor v. part surface curvature for a deposition process, according to one or more embodiments described herein.

Referring now to FIG. 9, a plot is provided of optical coating thickness scaling factor v. part surface curvature for a deposition process. In particular, FIG. 9 shows the experimentally measured correspondence between part surface angle (i.e., at the second portion 115 of the first major surface 112) and coating thickness scale factor (i.e., for the optical coating 120) for a reactive sputtering process employed on coated glass articles 100 (see FIGS. 1-8 and corresponding description above), according to embodiments of the disclosure. FIG. 9 can be employed to establish a target process window to optimize the deposition process employed to form the optical coating of articles of the disclosure. As shown in FIG. 9, the coating thickness scale factor follows a square root (cos(φ)) dependence, where φ is the part surface angle. The data shown in FIG. 9 were obtained from measurements of sputtered thin films using known optical interference calculation methods with a sample fixture that allows rotation of a curved part and measurement of reflectance spectra along the normal angle at each point along the curvature of the part. As shown in FIG. 9, a part surface angle of 30 degrees corresponds to a coating thickness scaling factor of about 0.95, 40 degrees to about 0.85, 50 degrees to about 0.8, and 60 degrees to about 0.7. For example, a coated glass article 100 having a non-planar second portion 115 with an angle q of 30 degrees relative to its first portion 113 can experience a thinning in the layers of its optical coating 120 above its second portion 115 by a scaling factor of 0.85. That is, the thickness of the layers of the optical coating 120 above the first portion 113 and above the second portion 115 can vary based on a thickness scaling factor, as shown in FIG. 9.

Referring again to FIG. 9, the presently disclosed designs of the coated glass articles 100 of the disclosure can be particularly optimized to with an optical coating 120 characterized by an advantageous combination of low reflectance, controlled color, and controlled color shift with viewing angle (incident light angle) at 100% thickness (1.0 scaling factor) as well as at thickness scaling factors of 0.7 (70%) or less. To calculate the optical performance for each thickness scaling factor, the 100% thickness layer design has all of its layers scaled by the same amount (the thickness scaling factor) and the optical results are re-calculated using transfer matrix method techniques according to principles understood by those with ordinary skill in the field of the disclosure. Optical index dispersion curves are measured for sputter deposited films of $SiO_2$, $SiO_xN_y$, and $SiN_x$, (or other materials employed in the layers of the optical coating 120) and these index dispersion values are input into the optical models, according to principles understood by those of ordinary skill in the field of the disclosure.

According to various embodiment disclosed herein, the thickness of the optical coating 120 on the second portion 115 as measured normal to the first major surface 112 at the second portion 115 is 70% or less (i.e., scaling of 0.7 or less) than the thickness of the optical coating 120 on the first portion 113 as measured normal to the first major surface 112 at the first portion 113. In additional embodiments, the thickness of the optical coating 120 on the second portion 115 as measured normal to the first major surface 112 at the second portion 115 is 65% or less (i.e., scaling of 0.65 or less), 60% or less (i.e., scaling of 0.6 or less), 55% or less (i.e., scaling of 0.55 or less), 50% or less (i.e., scaling of 0.5 or less), 45% or less (i.e., scaling of 0.45 or less), 40% or less (i.e., scaling of 0.4 or less), 35% or less (i.e., scaling of 0.35 or less), or even 30% or less (i.e., scaling of 0.3 or less), than the thickness of the optical coating 120 on the first portion 113 as measured normal to the first major surface 112 at the first portion 113

According to embodiments, as described herein, various portions of the coated glass article 100 (e.g., first portion 113 and second portion 115) may have optical characteristics such as light reflectivity, light transmittance, reflected color, and/or transmitted color, which appear similar to one another. For example, the optical characteristics at the first portion 113 may be similar to those at the second portion 115 when each is viewed in a direction about normal to the glass substrate 110 at the respective portion 113, 115 (i.e., θ1 is equal to about 0 degrees and θ2 is equal to about 0 degrees). In other embodiments, the optical characteristics at the first portion 113 may be similar to those at the second portion 115 when each is viewed at an incident illumination angle in a specified range relative to the normal direction at the respective portion 113, 115 (e.g., θ1 is from about 0 degrees to about 90 degrees, θ2 is from about 0 degrees to about 90 degrees). In additional embodiments, the optical characteristics at the first portion 113 may be similar to those at the second portion 115 when each is viewed in about the same direction (e.g., the angle between v1 and v2 is about equal to 0 degrees).

The optical coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed there between. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

The thickness of the optical coating 120 may be about 50 nm or greater in the direction of deposition while still providing an article that exhibits the optical performance described herein. In some examples, the optical coating thickness in the direction of deposition may be in the range from about 0.05 μm to about 10 μm, from about 0.1 μm to about 10 μm, from about 0.5 μm to about 5 μm, from about 2 μm to about 10 μm, from about 2 μm to about 5 μm, from about 2 μm to about 4 μm, and all thickness values of the optical coating 120 between these thickness values. For example, the thickness of the optical coating 120 can be about 0.05 μm, 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, and all thickness values between these thicknesses.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material (s) between the disposed material and the surface. The intervening material(s) may constitute a layer, as defined herein. Additionally, it should be understood that while FIGS. 2-8 schematically depict planar substrates, FIGS. 2-8 may also be considered as having non-planar substrates such as shown in FIG. 1A, and are depicted as planar to simplify the conceptual teachings of the respective figures.

As shown in FIG. 2, the optical coating 120 may include an anti-reflective coating 130, which may include a plurality of layers (130A, 130B). In one or more embodiments, the anti-reflective coating 130 may include a period 132 comprising two or more layers. In one or more embodiments, the two or more layers may be characterized as having different refractive indices from each another. In one embodiment, the period 132 includes a first low RI layer 130A and a second high RI layer 130B. The difference in the refractive index of the first low RI layer and the second high RI layer may be about 0.01 or greater, about 0.05 or greater, about 0.1 or greater, or even about 0.2 or greater.

As used herein, the terms "low RI layer" and "high RI layer" refer to the relative values of the refractive index ("RI") of layers of an optical coating of a transparent article according to the disclosure (i.e., low RI layer<high RI layer). Hence, low RI layers have refractive index values that are less than the refractive index values of high RI layers. Further, as used herein, "low RI layer" and "low index layer" are interchangeable with the same meaning. Likewise, "high RI layer" and "high index layer" are interchangeable with the same meaning.

As shown in FIG. 2, the anti-reflective coating 130 may include a plurality of periods 132. A single period 132 may include a first low RI layer 130A and a second high RI layer 130B, such that when a plurality of periods 132 are provided, the first low RI layer 130A (designated for illustration as "L") and the second high RI layer 130B (designated for illustration as "H") alternate in the following sequence of layers: L/H/L/H or H/L/H/L, such that the first low RI layer 130A and the second high RI layer 130B appear to alternate along the physical thickness of the optical coating 120. In the example in FIG. 2, the anti-reflective coating 130 includes three (3) periods 132. In some embodiments, the anti-reflective coating 130 may include up to twenty-five (25) periods 132 (also referred herein as "N" periods, in which Nis an integer). For example, the anti-reflective coating 130 may include from about 2 to about 20 periods 132, from about 2 to about 15 periods 132, from about 2 to about 12 periods 132, from about 2 to about 10 periods 132, from about 2 to about 12 periods 132, from about 3 to about 8 periods 132, from about 3 to about 6 periods 132, or any other period 132 within these ranges. For example, the anti-reflective coating 130 may include 1, 2, 3, 4, 5, 6, 7, 8, 9, 10, 11, 12, 13, 14, 15, 16, 17, 18, 19, 20, 21, 22, 23, 24 or 25 period(s) 132.

In the embodiment shown in FIG. 3, the anti-reflective coating 130 may include an additional capping layer 131, which may include a lower refractive index material than the second high RI layer 130B. In some embodiments, the period 132 may include one or more third layers 130C, as shown in FIG. 3. The third layer(s) 130C may have a low RI, a high RI or a medium RI. In some embodiments, the third layer(s) 130C may have the same RI as the first low RI layer 130A or the second high RI layer 130B. In other embodiments, the third layer(s) 130C may have a medium RI that is between the RI of the first low RI layer 130A and the RI of the second high RI layer 130B. Alternatively, the third layer(s) 130C may have a refractive index greater than the second high RI layer 130B. The third layer 130C may be provided in the optical coating 120 in the following exemplary configurations: Lthird layer/H/L/H/L; Hthird layer/L/H/L/H; L/H/L/H/Lthird layer; H/L/H/L/Hthird layer; Lthird layer/H/L/H/L/Hthird layer; Hthird layer/L/H/L/H/Lthird layer; Lthird layer/L/H/L/H; Hthird layer/H/L/H/L; H/L/H/L/Lthird layer; L/H/L/H/Hthird layer; Lthird layer/L/H/L/H/Hthird layer; Hthird layer//H/L/H/L/Lthird layer; L/Mthird layer/H/L/M/H; H/M/L/H/M/L; M/L/H/L/M; as well as other combinations. In these configurations, "L" without any subscript refers to the first low RI layer and "H" without any subscript refers to the second high RI layer. Reference to "Lthird sub-layer" refers to a third layer having a low RI, "Hthird sub-layer" refers to a third layer having a high RI and "M" refers to a third layer having a medium RI, all relative to the first layer and the second layer.

As used herein, the terms "low RI", "high RI" and "medium RI" refer to the relative values for the RI to another (e.g., low RI<medium RI<high RI). In one or more embodiments, the term "low RI" when used with the first low RI layer or with the third layer, includes a range from about 1.3 to about 1.7 or 1.75. In one or more embodiments, the term "high RI" when used with the second high RI layer or with the third layer, includes a range from about 1.7 to about 2.6 (e.g., about 1.85 or greater). In some embodiments, the term "medium RI" when used with the third layer, includes a range from about 1.55 to about 1.8. In some instances, the ranges for low RI, high RI, and medium RI may overlap; however, in most instances, the layers of the anti-reflective coating 130 have the general relationship regarding RI of: low RI<medium RI<high RI.

The third layer(s) 130C may be provided as a separate layer from a period 132 and may be disposed between the period 132 or plurality of periods 132 and the capping layer 131, as shown in FIG. 4. The third layer(s) may also be provided as a separate layer from a period 132 and may be disposed between the glass substrate 110 and the plurality of periods 132, as shown in FIG. 5. The third layer(s) 130C may be used in addition to an additional coating 140 instead of the capping layer 131 or in addition to the capping layer 131, as shown in FIG. 6. In some implementations, a third layer(s) 130C (not shown) is disposed adjacent to the scratch-resistant layer 150 or the glass substrate 110 in the configurations depicted in FIGS. 7 and 8.

Materials suitable for use in the anti-reflective coating 130 include: $SiO_2$, $Al_2O_3$, $GeO_2$, SiO, $AlO_xN_y$, AlN, $SiN_x$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI layer include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$). Some examples of suitable materials for use in the second high RI layer include $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$ and diamond-like carbon. In examples, the high RI layer may also be a high hardness layer or a scratch-resistant layer, and the high RI materials listed above may also comprise high hardness or scratch resistance. The oxygen content of the materials for the second high RI layer and/or the scratch-resistant layer may be minimized, especially in $SiN_x$ or $AlN_x$ materials. $AlO_xN_y$ materials may be considered to be oxygen-doped $AlN_x$, that is they may have an $AlN_x$ crystal structure (e.g. wurtzite) and need not have an AlON crystal structure. Exemplary $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary $Si_uAl_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Exemplary $Si_uO_xN_y$ high RI materials may comprise from 45 atom % to 50 atom % silicon, 45 atom % to 50 atom % nitrogen, and 3 atom % to 10 atom % oxygen. In further implementations, the $Si_uO_xN_y$ high RI materials may comprise from 45 atom % to 50 atom % silicon, 35 atom % to 50 atom % nitrogen, and 3 atom % to 20 atom % oxygen. Where a material having a medium refractive index is desired, some embodiments may utilize AlN and/or $SiO_xN_y$. The hardness of the second high RI layer and/or the scratch-resistant layer may be characterized specifically. In some embodiments, the maximum hardness of the second high RI layer 130B and/or a scratch-resistant layer 150 (see FIGS. 7 and 8, and their corresponding description below), as measured by the Berkovich Indenter Hardness Test at an indentation depth of about 100 nm or greater, may be about 8 GPa or greater, about 10 GPa or greater, about 12 GPa or greater, about 15 GPa or greater, about 18 GPa or greater, or about 20 GPa or greater. In some cases, the second high RI layer 130B material may be deposited as a single layer and may be characterized as a scratch-resistant layer (e.g., scratch-resistant layer 150 depicted in FIGS. 7 and 8, and further described below), and this single layer may have a thickness between about 200 nm and 5000 nm for repeatable hardness determination. In other embodiments in which the second high RI layer 130B is deposited as a single layer in the form of a scratch-resistant layer (e.g., scratch-resistant layer 150 as depicted in FIGS. 7 and 8), this layer may have a thickness from about 200 nm to about 5000 nm, from about 200 nm to about 3000 nm, from about 500 nm to about 5000 nm, from about 1000 nm to about 4000 nm, from about 1500 nm to about 4000 nm, from about 1500 nm to about 3000 nm, and all thickness values between these thicknesses.

In one or more embodiments, at least one of the layer(s) of the anti-reflective coating 130 may include a specific optical thickness range. As used herein, the term "optical thickness" is determined by the product of the physical thickness and the intensity attenuation coefficient of a layer. In one or more embodiments, at least one of the layers of the anti-reflective coating 130 may include an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the anti-reflective coating 130 may each have an optical thickness in the range from about 2 nm to about 200 nm, from about 10 nm to about 100 nm, from about 15 nm to about 100 nm, from about 15 nm to about 500 nm, or from about 15 nm to about 5000 nm. In some cases, at least one layer of the anti-reflective coating 130 has an optical thickness of about 50 nm or greater. In some cases, each of the first low RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In other cases, each of the second high RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In yet other cases, each of the third layers have an optical thickness in the range from about 2 nm to about 200 nm, from about 10 nm to about 100 nm, from about 15 nm to about 100 nm, from about 15 nm to about 500 nm, or from about 15 nm to about 5000 nm.

In some embodiments, the top-most air-side layer may comprise a high RI layer 130B (see FIG. 2) that also exhibits high hardness. In some embodiments, an additional coating 140 (see FIG. 6 and its corresponding description below) may be disposed on top of this top-most air-side high RI layer (e.g., the additional coating may include a low-friction coating, an oleophobic coating, or an easy-to-clean coating). The addition of a low RI layer having a very low thickness (e.g., about 10 nm or less, about 5 nm or less, or about 2 nm or less) has minimal influence on the optical performance when added to the top-most air-side layer comprising a high RI layer. The low RI layer having a very low thickness may include $SiO_2$, an oleophobic or low-friction layer, or a combination of $SiO_2$ and an oleophobic material. Exemplary low-friction layers may include diamond-like carbon, such materials (or one or more layers of the optical coating) may exhibit a coefficient of friction less than 0.4, less than 0.3, less than 0.2, or even less than 0.1.

In one or more embodiments, the anti-reflective coating 130 may have a physical thickness of about 800 nm or less. The anti-reflective coating 130 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 300 nm to about 800 nm, from about 400 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 nm to about 300 nm, and all ranges and sub-ranges therebetween. In some embodiments, the anti-reflective coating 130 may have a physical thickness in the range from about 250 nm to about 1000 nm, from about 500 nm to about 1000 nm, and all ranges and sub-ranges therebetween. For example, the anti-reflective coating 130 may have a physical thickness of about 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, and all thicknesses between these thickness values.

In one or more embodiments, the anti-reflective coating 130 may be disposed over the scratch-resistant layer 150. It has been discovered that limiting the thickness of the anti-reflective coating 130 over the scratch-resistant layer 150 may improve hardness. In one or more embodiments, the anti-reflective coating 130 disposed over the scratch-resistant layer 150 may have a physical thickness of about 1000 nm or less, 900 nm or less, 800 nm or less, 700 nm or less, 600 nm or less, 500 nm or less, or even 400 nm or less.

In one or more embodiments, the combined physical thickness of the second high RI layer(s) may be characterized. For example, in some embodiments, the combined thickness of the second high RI layer(s) may be about 100 nm or greater, about 150 nm or greater, about 200 nm or greater, about 250 nm or greater, about 300 nm or greater, about 350 nm or greater, about 400 nm or greater, about 450 nm or greater, about 500 nm or greater, about 550 nm or greater, about 600 nm or greater, about 650 nm or greater, about 700 nm or greater, about 750 nm or greater, about 800 nm or greater, about 850 nm or greater, about 900 nm or greater, about 950 nm or greater, or even about 1000 nm or greater. The combined thickness is the calculated combination of the thicknesses of the individual high RI layer(s) in the anti-reflective coating 130, even when there are intervening low RI layer(s) or other layer(s). In some embodiments, the combined physical thickness of the second high RI layer(s), which may also comprise a high-hardness material (e.g., a nitride or an oxynitride material), may be greater than 30% of the total physical thickness of the anti-reflective coating. For example, the combined physical thickness of the second high RI layer(s) may be about 40% or greater, about 50% or greater, about 60% or greater, about 70% or greater, about 75% or greater, or even about 80% or greater, of the total physical thickness of the anti-reflective coating 130 or the total physical thickness of the optical coating 120. Additionally or alternatively, the amount of the high refractive index material (which may also be a high-hardness material) included in the optical coating may be characterized as a percentage of the physical thickness of the upper most (i.e., user side or side of the optical coating opposite the substrate) 500 nm of the article or optical coating 120. Expressed as a percentage of the upper most 500 nm of the article or optical coating, the combined physical thickness of the second high RI layer(s) (or the thickness of the high refractive index material) may be about 50% or greater, about 60% or greater, about 70% or greater, about 80% or greater, or even about 90% or greater. In some embodiments, greater proportions of hard and high-index material within the anti-reflective coating can also simultaneously be made to also exhibit low reflectance, low color, and high abrasion resistance as further described elsewhere herein. In one or more embodiments, the second high RI layers may include a material having a refractive index greater than about 1.85 and the first low RI layers may include a material having a refractive index less than about 1.75. In some embodiments, the second high RI layers may include a nitride or an oxynitride material. In some instances, the combined thickness of all the first low RI layers in the optical coating (or in the layers that are disposed on the thickest second high RI layer of the optical coating) may be about 200 nm or less (e.g., about 150 nm or less, about 100 nm or less, about 75 nm or less, or about 50 nm or less).

The coated glass article 100 may include one or more additional coatings 140 disposed on the anti-reflective coating, as shown in FIG. 6. In one or more embodiments, the additional coating may include an easy-to-clean coating. An example of a suitable easy-to-clean coating is described in U.S. patent application Ser. No. 13/690,904, entitled "Process for Making of Glass Articles with Optical and Easy-to-Clean Coatings," filed on Nov. 30, 2012, and published as U.S. Patent Application Publication No. 2014/0113083 on Apr. 24, 2014, the salient portions of each are incorporated by reference herein in their entirety. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g. fluorosilanes), phosphonates, alkenes, and alkynes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch-resistant layer or layers. In some embodiments, the additional coating 140 includes a combination of easy-to-clean material and scratch-resistant material. In one example, the combination includes an easy-to-clean material and diamond-like carbon. Such additional coatings 140 may have a thickness in the range from about 5 nm to about 20 nm. The constituents of the additional coating 140 may be provided in separate layers. For example, the diamond-like carbon may be disposed as a first layer and the easy-to clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C:H, and/or a-C—H.

As mentioned herein, the optical coating 120 may include a scratch-resistant layer 150, which may be disposed between the anti-reflective coating 130 and the glass substrate 110. In some embodiments, the scratch-resistant layer 150 is disposed between the layers of the anti-reflective coating 130 (such as the scratch-resistant layer 150 as shown in FIGS. 7 and 8). The two sections of the anti-reflective coating 130 (i.e., a first section disposed between the scratch-resistant layer 150 and the glass substrate 110, and a second section disposed on the scratch-resistant layer) may have a different thickness from one another or may have essentially the same thickness as one another. The layers of the two sections of the anti-reflective coating 130 may be the same in composition, order, thickness and/or arrangement as one another or may differ from one another. In addition, the layers of the two sections of the anti-reflective coating 130 may comprise the same number of periods 132 (N) or the number of periods 132 in each of these sections may differ from one another (see periods 132 shown in FIGS. 2-6 and described earlier). In addition, one or more optional layers 130C (not shown) can be disposed in either or both of the two sections (e.g., directly on the glass substrate 110, at the top of the first anti-reflective coating 130 section in contact with the scratch-resistant layer 150, at the bottom of the second anti-reflective coating 130 section in contact with the scratch-resistant layer 150, and/or at the bottom of the second anti-reflective coating in contact with the glass substrate 110).

Exemplary materials used in the scratch-resistant layer 150 (or the scratch-resistant layer used as an additional coating 140) may include an inorganic carbide, nitride, oxide, diamond-like material, or combination of these. Examples of suitable materials for the scratch-resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layer 150 or coating may include $Al_2O_3$, AlN, $AlO_xN_y$, $Si_3N_4$, $SiO_xN_y$, $Si_uAl_vO_xN_y$, $SiN_x$, diamond, diamond-like carbon, $Si_xC_y$, $Si_xO_yC_z$, $ZrO_2$, $TiO_xN_y$ and combinations thereof. The scratch-resistant layer 150 may also comprise nanocomposite materials, or materials with a controlled microstructure to improve hardness, toughness, or abrasion/wear resistance. For example, the scratch-resistant layer 150 may comprise nanocrystallites in the size range from about 5 nm to about 30 nm. In embodiments, the scratch-resistant layer 150 may comprise transformation-toughened zirconia, partially stabilized zirconia, or zirconia-toughened alumina. In embodiments, the scratch-resistant layer 150 exhibits a fracture toughness value greater than about 1 MPa√m and simultaneously exhibits a hardness value greater than about 12 GPa.

The scratch-resistant layer 150 may include a single layer (as shown in FIGS. 7 and 8), or multiple sub-layers or single layers that exhibit a refractive index gradient. Where multiple layers are used, such layers form a scratch-resistant coating. For example, a scratch-resistant layer 150 may include a compositional gradient of $Si_uAl_vO_xN_y$ where the concentration of any one or more of Si, Al, O and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 28, 2014, and now issued as U.S. Pat. No. 9,703,011 on Jul. 11, 2017, the salient portions of each are hereby incorporated by reference in their entirety.

The scratch-resistant layer 150 may have a thickness from about 200 nm to about 5000 nm, according to some embodiments. In some implementations, the scratch-resistant layer 150 has a thickness from about 200 nm to about 5000 nm, from about 200 nm to about 3000 nm, from about 500 nm to about 5000 nm, from about 500 nm to 3000 nm, from about 500 nm to about 2500 nm, from about 1000 nm to about 4000 nm, from about 1500 nm to about 4000 nm, from about 1500 nm to about 3000 nm, and all thickness values between these thicknesses. For example, the thickness of the scratch-resistant layer 150 can be 200 nm, 300 nm, 400 nm, 500 nm, 600 nm, 700 nm, 800 nm, 900 nm, 1000 nm, 1100 nm, 1200 nm, 1300 nm, 1400 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm, 3000 nm, 3500 nm, 4000 nm, 4500 nm, 5000 nm, and all thickness sub-ranges and thickness values between the foregoing thicknesses.

In one embodiment, depicted in FIG. 8, the optical coating 120 may comprise a scratch-resistant layer 150 that is integrated as a high RI layer, and one or more low RI layers 130A and high RI layers 130B may be positioned over the scratch-resistant layer 150, with an optional capping layer 131 positioned over the low RI layers 130A and high RI layers 130B, where the capping layer 131 comprises a low RI material. The scratch-resistant layer 150 may be alternately defined as the thickest hard layer or the thickest high RI layer in the overall optical coating 120 or in the overall coated glass article 100. Without being bound by theory, it is believed that the coated glass article 100 may exhibit increased hardness at indentation depths when a relatively thin amount of material is deposited over the scratch-resistant layer 150. However, the inclusion of low RI and high RI layers over the scratch-resistant layer 150 may enhance the optical properties of the coated glass article 100. In some embodiments, relatively few layers (e.g., only 1, 2, 3, 4, or 5 layers) may positioned over the scratch-resistant layer 150 and these layers may each be relatively thin (e.g., less than 100 nm, less than 75 nm, less than 50 nm, or even less than 25 nm). In other embodiments, a larger quantity of layers (e.g., 3 to 15 layers) may be positioned over the scratch-resistant layer 150 and each of these layers may also be relatively thin (e.g., less than 200 nm, less than 175 nm, less than 150 nm, less than 125 nm, less than 100 nm, less than 75 nm, less than 50 nm, and even less than 25 nm). In one implementation of the embodiment depicted in FIG. 8, the anti-reflective coating 130 may include a period 132 comprising four periods 132 above the scratch-resistant layer 150, four periods 132 below the scratch-resistant layer (i.e., N=8), a layer 130C disposed adjacent to the scratch-resistant layer 150 or glass substrate 110 (not shown), and a capping layer 131 (as shown in FIG. 8). In another implementation of the embodiment depicted in FIG. 8, the anti-reflective coating 130 may include a period 132 comprising five periods 132 above the scratch-resistant layer 150, five periods 132 below the scratch-resistant layer (i.e., N=8), a layer 130C disposed adjacent to the scratch-resistant layer 150 or glass substrate 110 (not shown), and a capping layer 131 (as shown in FIG. 8).

In embodiments, the layers deposited over the scratch-resistant layer 150 (i.e., on the air side of the scratch-resistant layer 150) may have a total thickness (i.e., in combination) of less than or equal to about 1000 nm, less than or equal to about 500 nm, less than or equal to about 450 nm, less than or equal to about 400 nm, less than or equal to about 350 nm, less than or equal to about 300 nm, less than or equal to about 250 nm, less than or equal to about 225 nm, less than or equal to about 200 nm, less than or equal to about 175 nm, less than or equal to about 150 nm, less than or equal to about 125 nm, less than or equal to about 100 nm, less than or equal to about 90 nm, less than or equal to about 80 nm, less than or equal to about 70 nm, less than or equal to about 60 nm, or even less than or equal to about 50 nm.

In embodiments (e.g., the coated glass article 100 depicted in FIGS. 7 and 8), the total thickness of low RI layer(s) (the sum of thickness of all low RI layers 130A, even if they are not in contact) that are positioned over the scratch-resistant layer 150 (i.e., on the air side of the scratch-resistant layer 150) may be less than or equal to about 500 nm, less than or equal to about 450 nm, less than or equal to about 400 nm, less than or equal to about 350 nm, less than or equal to about 300 nm, less than or equal to about 250 nm, less than or equal to about 225 nm, less than or equal to about 200 nm, less than or equal to about 175 nm, less than or equal to about 150 nm, less than or equal to about 125 nm, less than or equal to about 100 nm, less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, less than or equal to about 20 nm, or even less than or equal to about 10 nm.

In embodiments, where the optical coating 120 comprises a layer or layers that exhibits a refractive index gradient, a gradient layer, the configuration of the optical coating may be substrate/gradient layer/scratch resistant layer/anti-reflective layer. In other embodiments, the configuration of the optical coating 120 may be substrate/anti-reflective layer/scratch-resistant layer/gradient layer. In further embodiments, the configuration of the optical coating may be substrate/first gradient layer/scratch-resistant layer/second gradient layer.

The optical coating 120 and/or the coated glass article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the coated glass article 100 (see FIGS. 1-8) or the surface of any one or more of the layers in the optical coating 120 with the diamond Berkovich indenter to form an indent to an indentation depth in the range from about 50 nm to about 1000 nm (or the entire thickness of the optical coating 120 or layer thereof, whichever is less) and measuring the maximum hardness from this indentation along the entire indentation depth range or a segment of this indentation depth (e.g., in the range from about 100 nm to about 600 nm, e.g., at an indentation depth of 100 nm or greater, etc.), generally using the methods set forth in Oliver, W. C.; Pharr, G. M., "An improved technique for determining hardness and elastic modulus using load and displacement sensing indentation experiments," J. Mater. Res., Vol. 7, No. 6, 1992, 1564-1583; and Oliver, W. C.; Pharr, G. M., "Measurement of Hardness and Elastic Modulus by Instrument Indentation: Advances in Understanding and Refinements to Methodology," J. Mater. Res., Vol. 19, No. 1, 2004, 3-20, the salient portions of which are incorporated by reference within this disclosure in their entirety. As used herein, "hardness" refers to a maximum hardness, and not an average hardness.

As used herein, the "Berkovich Indenter Hardness Test" and "Berkovich Hardness Test" are used interchangeably to refer to a test for measuring the hardness of a material on a surface thereof by indenting the surface with a diamond Berkovich indenter. The Berkovich Indenter Hardness Test includes indenting the outermost surface (e.g., an exposed surface) of a single optical coating or the outer optical coating of a transparent article of the disclosure with the diamond Berkovich indenter to form an indent to an indentation depth in the range from about 50 nm to about 1000 nm (or the entire thickness of the outer or inner optical coating, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. J. Mater. Res., Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. J. Mater.

Res., Vol. 19, No. 1, 2004, 3-20. As used herein, each of "hardness" and "maximum hardness" interchangeably refers to a maximum hardness as measured along a range of indentation depths, and not an average hardness.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical coating 120 thickness or the layer thickness.

In some embodiments, the coated glass article 100 (e.g., as depicted in FIGS. 1-8) may exhibit a hardness of about 10 GPa or greater, about 15 GPa or greater, about 20 GPa or greater, about 25 GPa or greater, or about 30 GPa or greater (e.g., about 10 GPa or greater, about 11 GPa or greater, about 12 GPa or greater, about 13 GPa or greater, about 14 GPa or greater, about 15 GPa or greater, about 16 GPa or greater, about 17 GPa or greater, about 18 GPa or greater, about 19 GPa or greater, about 20 GPa or greater, about 21 GPa or greater, about 22 GPa or greater, about 23 GPa or greater, about 24 GPa or greater, about 25 GPa or greater, about 26 GPa or greater, about 27 GPa or greater, about 28 GPa or greater, about 29 GPa or greater, about 30 GPa or greater) when measured at the anti-reflective surface 122. The hardness of the coated glass article 100 may even be up to about 20 GPa or 30 GPa. Such measured hardness values may be exhibited by the optical coating 120 and/or the coated glass article 100 along an indentation depth of about 50 nm or greater, or about 100 nm or greater (e.g., from about 50 nm to about 300 nm, from about 50 nm to about 400 nm, from about 50 nm to about 500 nm, from about 50 nm to about 600 nm, from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the coated glass article 100 exhibits a hardness that is greater than the hardness of the glass substrate 110 (which can be measured on the opposite surface from the anti-reflective surface). Unless specified otherwise, the hardness may be measured normal to the thickest portion of the optical coating 120.

According to embodiments, the hardness may be measured at different portions of the coated glass article 100. For example, the coated article may exhibit a hardness of at least 12 GPa or greater at an indentation depth of at least about 600 nm at the anti-reflective surface 122 at the first portion 113 and at the second portion 115. For example, the hardness at the first portion 113 and at second portion 115 may be about 15 GPa or greater, about 17.5 GPa or greater, or about 20 GPa or greater (e.g., about 15 GPa or greater, about 16 GPa or greater, about 17 GPa or greater, about 18 GPa, about 19 GPa or about 20 GPa or greater).

According to embodiments, the coated articles described herein may have desirable optical properties (such as low reflectance and neutral color) at various portions of the coated glass article 100, such as the first portion 113 and the second portion 115. For example, light reflectance may be relatively low (and transmittance may be relatively high) at the first portion 113 and at the second portion 115 when each is viewed at an incident illumination angle near normal to the respective portions. In another embodiment, when each portion is viewed at a near normal incident illumination angle, the difference in color between the two portions may be insignificant to the naked eye. In another embodiment, when the portions are viewed at incident illumination angles that have the same direction, the color may be insignificant to the naked eye and there may be relatively low reflectance at each portion (i.e., the incident illumination angles relative to the surfaces of each portion are different because the portions are at an angle to one another, but the illumination direction is the same). Optical properties may include average light transmittance, average light reflectance, photopic reflectance, maximum photopic reflectance, photopic transmittance, reflected color (i.e., in L*a*b* color coordinates), and transmitted color (i.e., in L*a*b* color coordinates).

As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Reflectance may be measured as a single side reflectance (also referred herein as "first surface reflectance") when measured at the anti-reflective surface 122 only (e.g., when removing the reflections from an uncoated back surface (e.g., 114 in FIG. 1) of the article, such as through using index-matching oils on the back surface coupled to an absorber, or other known methods). In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmission may also play a factor in color shift in reflection and vice versa. Factors in angular color shifts in transmission and/or reflection may also include angular color shifts due to viewing angle or angular color shifts away from a certain white point that may be caused by material absorption (somewhat independent of angle) defined by a particular illuminant or test system.

The coated glass article 100 may also be characterized by its photopic transmittance and reflectance at various portions. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in the below Equation (1) as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda \tag{1}$$

In addition, "average reflectance" can be determined over the visible spectrum, or over other wavelength ranges, according to measurement principles understood by those skilled in the field of the disclosure, e.g., in the infrared spectrum from 840 nm to 950 nm, etc. Unless otherwise noted, all reflectance values reported or otherwise referenced in this disclosure are associated with testing through both primary surfaces of the substrate and optical film structure(s) of the transparent articles of the disclosure, e.g., a "two-surface" average photopic reflectance. In cases where "one-surface" or "first-surface" reflectance is specified, the reflectance from the rear surface of the article is eliminated through optical bonding to a light absorber, allowing the reflectance of only the first surface to be measured.

The usability of a transparent article in an electronic device (e.g., as a protective cover) can be related to the total amount of reflectance in the article. Photopic reflectance is particularly important for display devices that employ visible light. Lower reflectance in a cover transparent article over a lens and/or a display associated with the device can reduce multiple-bounce reflections in the device that can generate 'ghost images'. Thus, reflectance has an important relationship to image quality associated with the device, particularly its display and any of its other optical components (e.g., a lens of a camera). Low-reflectance displays also enable better display readability, reduced eye strain, and faster user response time (e.g., in an automotive display, where display readability can also correlate to driver safety). Low-reflectance displays can also allow for reduced display energy consumption and increased device battery life, since the display brightness can be reduced for low-reflectance displays compared to standard displays, while still maintaining the targeted level of display readability in bright ambient environments.

The average photopic transmittance is defined in the below Equation (2) as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380\,nm}^{720\,nm} T(\lambda) \times I(\lambda) \times \bar{y}(\lambda) d\lambda \tag{2}$$

It should also be understood that the photopic transmittance and/or reflectance can be reported as the maximum photopic transmittance and/or reflectance within a given spectral range (e.g., from 425 nm to 950 nm).

According to embodiments, coated glass article 100 depicted in FIGS. 1A-1B may exhibit an average two-sided or two-surface (i.e., through both major surfaces 112, 114 of the glass substrate 110) photopic transmittance, or average visible transmittance, over an optical wavelength regime from 400 to 700 nm, of about 85% or greater, about 88% or greater, about 90% or greater, about 91% or greater, about 92% or greater, about 93% or greater, or even about 94% or greater at normal incidence, from 0 to 10 degrees, from 0 to 20 degrees, from 0 to 30 degrees, from 0 to 40 degrees, from 0 to 50 degrees, or even from 0 to 60 degrees. In some embodiments, the coated glass article 100 can exhibit an average two-sided transmittance in the infrared spectrum (e.g., at 940 nm) of about 85% or greater, about 88% or greater, about 90% or greater, about 91% or greater, about 92% or greater, about 93% or greater, or even about 94% or greater at normal incidence, from 0 to 10 degrees, from 0 to 20 degrees, from 0 to 30 degrees, from 0 to 40 degrees, from 0 to 50 degrees, or even from 0 to 60 degrees. In some embodiments, the coated glass article 100 can exhibit an average two-sided transmittance in the near-infrared spectrum (e.g., an average transmittance from 1000 to 1700 nm) of about 80% or greater, about 85% or greater, about 88% or greater, about 90% or greater, about 91% or greater, about 92% or greater, or even about 93% or greater at normal incidence, from 0 to 10 degrees, from 0 to 20 degrees, from 0 to 30 degrees, from 0 to 40 degrees, from 0 to 50 degrees, or even from 0 to 60 degrees.

According to embodiments described herein, the reflectance may be relatively low in wavelength bands that extend into the infra-red (IR) spectrum. Generally, visible light forms an interface with IR light at about 700 nm. Surprisingly, it has been discovered that extending low reflectance into the IR band is beneficial for coatings that are reduced in thickness due to, for example, line-of-sight deposition. That is, a coating may be designed for the thick region (e.g., over the first portion 113) that has low IR reflectivity, and in turn the coating with reduced thickness (e.g., over the second portion 115) will maintain low reflectivity over visible light wavelengths. Without being bound by theory, it is believed that the low reflectivity band in a coating is reduced in bandwidth range when the coating thickness is reduced. In some embodiments, the bandage of the low reflectivity bandwidth may scale about linearly with the thickness of the coating. For example, a coating that has a 3% or lower reflectivity up to 1500 nm in its thick portion may have 3% or lower reflectivity up to about 750 nm in portions half the thickness of the thick portion, or a coating that has a 3% or lower reflectivity up to 1500 nm in its thick portion may have 3% or lower reflectivity up to about 1000 nm in portions two-thirds the thickness of the thick portion. As such, it is discovered that an improvement for coating systems on curved surfaces may be observed when low IR reflectivity is present in the coating in its thick portions.

According to one or more embodiments, the coated glass article 100 may exhibit a single side light reflectance of about 3% or less at all wavelengths from 410 nm to at least 1050 nm as measured at the anti-reflective surface 122 at the first portion 113 of the glass substrate 110 at an angle of incidence of 5 degrees. In additional embodiments, the coated glass article 100 may exhibit a single side light reflectance of about 3% or less at all wavelengths from 410 nm to at least 1100 nm, at least 1150 nm, at least 1200 nm, at least 1250 nm, at least 1300 nm, at least 1350 nm, at least 1400 nm, at least 1450 nm, at least 1500 nm, at least 1550 nm, at least 1600 nm, at least 1650 nm, at least 1700 nm, at least 1750 nm, at least 1800 nm, at least 1850 nm, at least 1900 nm, at least 1950 nm, at even least 2000 nm, as measured at the anti-reflective surface 122 at the first portion 113 of the glass substrate 110 at an angle of incidence of 5 degrees. In some embodiments, the first portion 113 is analogous to the thickest portion of the optical coating 120, as is described herein.

In additional embodiments, the coated glass article 100 may exhibit a single side light reflectance of about 2.8% or less, about 2.6% or less, about 2.4% or less, about 2.2% or less, about 2% or less, about 1.8% or less, about 1.6% or less, about 1.4% or less, about 1.2% or less, or even about 1% or less, at all wavelengths from 410 nm to at least 1050 nm, at least 1100 nm, at least 1150 nm, at least 1200 nm, at least 1250 nm, at least 1300 nm, at least 1350 nm, at least 1400 nm, at least 1450 nm, at least 1500 nm, at least 1550 nm, at least 1600 nm, at least 1650 nm, at least 1700 nm, at least 1750 nm, at least 1800 nm, at least 1850 nm, at least 1900 nm, at least 1950 nm, at even least 2000 nm, as measured at the anti-reflective surface 122 at the first portion 113 of the glass substrate 110 at an angle of incidence of 5 degrees, 30 degrees, 45 degrees, or 60 degrees, in all combinations of reflectance percentage, wavelength range, and angle of incidence disclosed.

According to one or more embodiments, the coated glass article 100 may exhibit an average single side light reflectance of about 3% or less at wavelengths from 410 nm to at least 1050 nm as measured at the anti-reflective surface 122 at the first portion 113 of the glass substrate 110 at an angle of incidence of 5 degrees. In additional embodiments, the coated glass article 100 may exhibit an average single side light reflectance of about 3% or less at all wavelengths from 410 nm to at least 1100 nm, at least 1150 nm, at least 1200 nm, at least 1250 nm, at least 1300 nm, at least 1350 nm, at least 1400 nm, at least 1450 nm, at least 1500 nm, at least 1550 nm, at least 1600 nm, at least 1650 nm, at least 1700 nm, at least 1750 nm, at least 1800 nm, at least 1850 nm, at least 1900 nm, at least 1950 nm, at even least 2000 nm, as measured at the anti-reflective surface 122 at the first portion 113 of the glass substrate 110 at an angle of incidence of 5 degrees. In some embodiments, the first portion 113 is analogous to the thickest portion of the optical coating 120, as is described herein.

In additional embodiments, the coated glass article 100 may exhibit an average single side light reflectance of about 2.8% or less, about 2.6% or less, about 2.4% or less, about 2.2% or less, about 2% or less, about 1.8% or less, about 1.6% or less, about 1.4% or less, about 1.2% or less, or even about 1% or less, at wavelengths from 410 nm to at least 1050 nm, at least 1100 nm, at least 1150 nm, at least 1200 nm, at least 1250 nm, at least 1300 nm, at least 1350 nm, at least 1400 nm, at least 1450 nm, at least 1500 nm, at least 1550 nm, at least 1600 nm, at least 1650 nm, at least 1700 nm, at least 1750 nm, at least 1800 nm, at least 1850 nm, at least 1900 nm, at least 1950 nm, at even least 2000 nm, as measured at the anti-reflective surface 122 at the first portion 113 of the glass substrate 110 at an angle of incidence of 5 degrees, 30 degrees, 45 degrees, or 60 degrees, in all combinations of reflectance percentage, wavelength range, and angle of incidence disclosed.

In additional embodiments, the coated glass article 100 may exhibit a single side photopic average light reflectance of about 12% or more, about 15% or more, about 20% or more, about 25% or more, about 30% or more, or even 50% or more, at wavelengths from about 400 nm to about 700 nm. In further embodiments, the coated glass article 100 may exhibit a single side maximum reflectance of about 12% or more about 15% or more, about 20% or more, about 25% or more, about 30% or more, or even 50% or more, at wavelengths from about 400 nm to about 700 nm.

According to the embodiments disclosed herein, the reflected color of the coated glass article 100 may be relatively colorless at the first portion 113 and at the second portion 115. As used herein, color refers to the a* and b*, under the CIE L*, a*, b* colorimetry system in reflectance and/or transmittance. In particular, the reflected color of the coated glass article 100 at portions 113 and 115 may be relatively colorless at angles of incidence of from 0 degrees (normal) to 90 degrees (parallel to the anti-reflective surface 122). The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). For example, International Commission on Illumination D65 illuminant may be utilized for measurement.

According to one or more embodiments, the first surface reflected color of the coated glass article 100 at the first portion 113 may be defined by a* is less than or equal to 10, less than or equal to 9, less than or equal to 8, less than or equal to 7, less than or equal to 6, less than or equal to 5, less than or equal to 4, less than or equal to 3, less than or equal to 2, or less than or equal to 1 and/or a* is at least −10, at least −9, at least −8, at least −7, at least −6, at least −5, at least −4, at least −3, at least −2, or at least −1 for all angles of incidence from 0 degrees to 90 degrees as measured normal to the first portion 113. The first surface reflected color of the coated glass article 100 at the first portion 113 may be defined by b* is less than or equal to 10, less than or equal to 9, less than or equal to 8, less than or equal to 7, less than or equal to 6, less than or equal to 5, less than or equal to 4, less than or equal to 3, less than or equal to 2, or less than or equal to 1 and/or b* is at least −10, at least −9, at least −8, at least −7, at least −6, at least −5, at least −4, at least −3, at least −2, or at least −1 for all angles of incidence from 0 degrees to 90 degrees as measured normal to the first portion 113. According to additional embodiments, the disclosed ranges of a* and b* may be measured over angles of incidence ranging from 0 degrees to 80 degrees, to 70 degrees, to 60 degrees, to 50 degrees, to 40 degrees, to 30 degrees, or to 20 degrees.

According to one or more embodiments, the first surface reflected color of the coated glass article 100 at the second portion 115 may be defined by a* is less than or equal to 10, less than or equal to 9, less than or equal to 8, less than or equal to 7, less than or equal to 6, less than or equal to 5, less than or equal to 4, less than or equal to 3, less than or equal to 2, or less than or equal to 1 and/or a* is at least −10, at least −9, at least −8, at least −7, at least −6, at least −5, at least −4, at least −3, at least −2, or at least −1 for all angles of incidence from 0 degrees to 90 degrees as measured normal to the second portion 115. The first surface reflected color of the coated glass article 100 at the second portion 115 may be defined by b* is less than or equal to 10, less than or equal to 9, less than or equal to 8, less than or equal to 7, less than or equal to 6, less than or equal to 5, less than or equal to 4, less than or equal to 3, less than or equal to 2, or less than or equal to 1 and/or b* is at least −10, at least −9, at least −8, at least −7, at least −6, at least −5, at least −4, at least −3, at least −2, or at least −1 for all angles of incidence from 0 degrees to 90 degrees as measured normal to the second portion 115. According to additional embodiments, the disclosed ranges of a* and b* may be measured over angles of incidence ranging from 0 degrees to 80 degrees, to 70 degrees, to 60 degrees, to 50 degrees, to 40 degrees, to 30 degrees, or to 20 degrees. In embodiments having the above described a* and/or b*, the thickness of the optical coating 120 on the second portion 115 is 70% or less (i.e., scaling of 0.7 or less), 65% or less (i.e., scaling of 0.65 or less), 60% or less (i.e., scaling of 0.6 or less), 55% or less (i.e., scaling of 0.55 or less), 50% or less (i.e., scaling of 0.5 or less), 45% or less (i.e., scaling of 0.45 or less), 40% or less (i.e., scaling of 0.4 or less), 35% or less (i.e., scaling of 0.35 or less), or even 30% or less (i.e., scaling of 0.3 or less), than the thickness of the optical coating 120 on the first portion 113.

According to one or more embodiments, the first surface reflected color of the coated glass article 100 at the first portion 113 is defined by b*<2.5 for all angles of incidence from 0 degrees to 90 degrees as measured normal to the first portion 113 of the first major surface 112, and the first surface reflected color of the coated glass article 100 at the second portion 115 is defined by b*<2.5 for all angles of incidence from 0 degrees to 90 degrees as measured normal to the second portion 115 of the first major surface 112, where the scaling factor is 0.7 or less.

According to another embodiment, the first surface reflected color of the coated glass article 100 at the first portion 113 is defined by −10<a*<10 and −10<b*<10 for all angles of incidence from 0 degrees to 90 degrees as measured normal to the first portion 113 of the first major surface 112, and the first surface reflected color of the coated glass article 100 at the second portion 115 is defined by −10<a*<10 and −10<b*<10 for all angles of incidence from 0 degrees to 90 degrees as measured normal to the second portion 115 of the first major surface 112, where the scaling factor is 0.5 or less.

According to another embodiment, the first surface reflected color of the coated glass article 100 at the first portion 113 is defined by −2<a*<2 and −2<b*<2 for all angles of incidence from 0 degrees to 90 degrees as measured normal to the first portion 113 of the first major surface 112, and the first surface reflected color of the coated glass article 100 at the second portion 115 is defined by −2<a*<2 and −2<b*<2 for all angles of incidence from 0 degrees to 90 degrees as measured normal to the second portion 115 of the first major surface 112, where the scaling factor is 0.7 or less.

According to another embodiment, the first surface reflected color of the coated glass article 100 at the first portion 113 is defined by −10<a*<10 and −10<b*<10 for all angles of incidence from 0 degrees to 90 degrees as measured normal to the first portion 113 of the first major surface 112, and the first surface reflected color of the coated glass article 100 at the second portion 115 is defined by −10<a*<10 and −10<b*<10 for all angles of incidence from 0 degrees to 90 degrees as measured normal to the second portion 115 of the first major surface 112, where the scaling factor is 0.6 or less.

According to another embodiment, the first surface reflected color of the coated glass article 100 at the first portion 113 is defined by b*<4 for all angles of incidence from 0 degrees to 90 degrees as measured normal to the first portion 113 of the first major surface 112, and the first surface reflected color of the coated glass article 100 at the second portion 115 is defined by b*<4 for all angles of incidence from 0 degrees to 90 degrees as measured normal to the second portion 115 of the first major surface 112, where the scaling factor is 0.6 or less.

According to another embodiment, the first surface reflected color of the coated glass article 100 at the first portion 113 is defined by −6<a*<6 and −10<b*<10 for all angles of incidence from 0 degrees to 90 degrees as measured normal to the first portion 113 of the first major surface 112, and the first surface reflected color of the coated glass article 100 at the second portion 115 is defined by −6<a*<6 and −10<b*<10 for all angles of incidence from 0 degrees to 90 degrees as measured normal to the second portion 115 of the first major surface 112, where the scaling factor is 0.35 or less.

According to some embodiments the coated glass articles 100 may exhibit color and reflectance uniformity associated with variations in thickness of the optical coating 120 that results from line-of-sight layer, film and optical structure deposition methods together with non-planar portions of the glass substrate 110, e.g., as associated with glass substrates 110 having flat, angled, or curved regions. these coated glass articles 100 can exhibit a color shift in first-surface reflectance and/or two-surface transmittance, as given by $\sqrt{(a^{*2}+b^{*2})}$, of less than 4, less than 3, or even less than 2, for optical film structure thickness scaling factors that range from 70 to 100%, 60 to 100%, 50 to 100%, 40 to 100%, or even 35 to 100%.

In some embodiments, the coated glass articles 100 can exhibit a color shift in first-surface reflectance and/or two-surface transmittance, as given by $\sqrt{(a^{*2}+b^{*2})}$, of more than about 12, more than about 16, or even more than about 18 at least one incidence angle from 0 degrees to 90 degrees. In some embodiments, the optical coating 12—may be a reflective, colored, or color-shifting coating as disclosed in U.S. Pat. No. 10,162,084, entitled "Reflective, Colored, or Color-Shifting Scratch Resistant Coatings and Articles," and U.S. Pat. No. 11,016,680, entitled "Reflective, Colored, or Color-Shifting Scratch Resistant Coatings and Articles," the contents of which are incorporate in their entireties.

As noted earlier, embodiments of the coated glass articles 100 (see FIGS. 1-8) of the disclosure include an optical coating 120 with low reflectance and controlled color. The optical coating 120 in these coated glass articles 100 can be optimized to give desirable combinations of hardness, reflectance, color, and color shift over a range of viewing angles. These desirable combinations are maintained when the optical coating 120 is at its original design thickness, and when all the layers in the coating are thinned by a scale factor that corresponds to the coating thinning that can occur during a variety of vacuum deposition techniques due to line-of-sight effects in the coating process, such as reactive sputtering, thermal evaporation, CVD, PECVD, and the like.

With further regard to the residual compressive stress and elastic modulus levels (along with hardness levels) of the optical coating 120, these properties can be controlled through adjustments to the stoichiometry and/or thicknesses of the low RI layers 130A, high RI layers 130B, and scratch-resistant layer 150. In embodiments, the residual compressive stress and elastic modulus levels (and hardness levels) exhibited by the optical coating 120 can be controlled through adjustments to the processing conditions for sputtering the layers of the optical coating 120, particularly its high RI layers 130B and scratch-resistant layer 150. In some implementations, for example, a reactive sputtering process can be employed to deposit high RI layers 130B comprising a silicon-containing nitride or a silicon-containing oxynitride. Further, these high RI layers 130B can be deposited by applying power to a silicon sputter target in a reactive gaseous environment containing argon gas (e.g., at flow rates from 50 to 150 sccm), nitrogen gas (e.g., at flow rates from 200 to 250 sccm) and oxygen gas, with residual compressive stress and elastic modulus levels largely dictated by the selected oxygen gas flow rate. For example, a relatively low oxygen gas flow rate (e.g., 45 sccm) can be employed according to the foregoing argon and nitrogen gas flow conditions to produce high RI layers 130B with a $SiO_xN_y$ stoichiometry such that its optical coating 120 exhibits a residual compressive stress of about 942 MPa, hardness of 17.8 GPa and an elastic modulus of 162.6 GPa. As another example, a relatively high oxygen gas flow rate (e.g., 65 sccm) can be employed according to the foregoing argon and nitrogen gas flow conditions to produce high RI layers 130B with a $SiO_xN_y$ stoichiometry such that the optical coating 120 exhibits a residual compressive stress of about 913 MPa, hardness of 16.4 GPa and an elastic modulus of 148.4 GPa. Accordingly, the stoichiometry of the optical coating 120, particularly its high RI layers 130B and scratch-resistant layer 150, can be controlled to achieve targeted residual compressive stress and elastic modulus levels, which unexpectedly correlate to the advantageously high average failure stress levels in the coated glass article 100 (e.g., greater than or equal to 700 MPa)

According to some implementations, the coated articles may exhibit a first-surface (i.e., through one of the primary surfaces of the glass substrate 110, reflected color with a D65 illuminant, as given by $\sqrt{(a^{*2}+b^{*2})}$, of less than 10, less than 8, less than 6, less than 4, less than 3, or even less than 2, as measured at normal incidence, from 0 to 10 degrees, or over all incidence angles from 0 to 90 degrees. For example, the coated glass article 100 can exhibit a reflected color of less than 10, 9, 8, 7, 6, 5, 4, 3.75, 3.5, 3.25, 3, 2.75, 2.5, 2.25, 2, 1.9, 1.8, 1.7, 1.6, 1.5, 1.4, 1.3, 1.2, 1.1, 1, or even lower, as measured at normal incidence, from 0 to 10 degrees, or over all incidence angles from 0 to 90 degrees.

The coated articles disclosed may be employed for protection and/or covers of displays, camera lenses, sensors and/or light source components within or otherwise part of electronic devices, along with protection of other components (e.g., buttons, speakers, microphones, etc.). These transparent articles with a protective function employ an optical coating disposed on a glass-ceramic substrate such that the article exhibits a combination of high hardness, high damage resistance and desirable optical properties, including high photopic transmittance and low transmitted color. The optical coating can include a scratch-resistant layer, at any of various locations within the structure. Further, the optical coatings of these articles can include a plurality of alternating high and low refractive index layers, with each high index layer and a scratch resistant layer comprising nitride or an oxynitride and each low index layer comprising an oxide.

The coated glass article 100 may be substantially optically clear, transparent and free from light scattering elements. In such embodiments, the coated glass article 100 may exhibit an average light transmittance over the optical wavelength regime of about 85% or greater, about 86% or greater, about 87% or greater, about 88% or greater, about 89% or greater, about 90% or greater, about 91% or greater, or about 92% or greater. In one or more alternative embodiments, the coated glass article 100 may be opaque or exhibit an average light transmittance over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance of the substrate alone is measured at an incident illumination angle of 0 degrees relative to the substrate major surface 112 (however, such measurements may be provided at incident illumination angles of 45 degrees or 60 degrees). The glass substrate 110 may optionally exhibit a color, such as white, black, red, blue, green, yellow, orange etc.

In one or more embodiments, the glass substrate 110 may comprise glass. In one or more embodiments, the glass substrate 110 may be a lithium aluminosilicate glass composition. Disclosed herein are lithium aluminosilicate glass compositions that exhibit a high fracture toughness ($K_{IC}$). In some embodiments, the glass compositions are characterized by a $K_{IC}$ fracture toughness value of at least 0.70 MPa√m. The glasses described herein are able to achieve these fracture toughness values without the inclusion of additives, such as $Ta_2O_5$, $HfO_2$, $La_2O_3$, and $Y_2O_3$, that increase the fracture toughness but are expensive and may have limited commercial availability. In this respect, the glasses disclosed herein provide comparable or improved performance with reduced manufacturing costs.

In the glass compositions described herein, $SiO_2$ is the largest constituent and, as such, $SiO_2$ is the primary constituent of the glass network formed from the glass composition. Pure $SiO_2$ has a relatively low CTE. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. If the concentration of $SiO_2$ in the glass composition is too low the chemical durability of the glass may be diminished, and the glass may be susceptible to surface damage during post-forming treatments. In embodiments, the concentration of $SiO_2$ in the glass composition may be in the range from 50.0 to 70.0 mol %, from 50.0 to 67.0 mol %, from 50.0 to 65.0 mol %, from 50.0 to 63.0 mol %, from 50.0 to 60.0 mol %, from 55.0 to 70.0 mol %, from 55.0 to 67.0 mol %, from 55.0 to 65.0 mol %, from 55.0 to 64.0 mol %, from 55.0 to 63.0 mol %, from 55.0 to 62.0 mol %, from 55.0 to 61.0 mol %, from 55.0 to 60.0 mol %, from 55.0 to 59.0 mol %, from 56.0 to 70.0 mol %, from 56.0 to 67.0 mol %, from 56.0 to 65.0 mol %, from 56.0 to 64.0 mol %, from 56.0 to 63.0 mol %, from 56.0 to 62.0 mol %, from 56.0 to 61.0 mol %, from 56.0 to 60.0 mol %, from 56.0 to 59.0 mol %, from 57.0 to 70.0 mol %, from 57.0 to 67.0 mol %, from 57.0 to 65.0 mol %, from 57.0 to 64.0 mol %, from 57.0 to 63.0 mol %, from 57.0 to 62.0 mol %, from 57.0 to 61.0 mol %, from 57.0 to 60.0 mol %, or from 57.0 to 59.0 mol %, or any and all sub-ranges formed from any of these endpoints.

The glass compositions may include $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes. The inclusion of $Al_2O_3$ in the glass compositions enables the high fracture toughness values described herein. In embodiments, the concentration of $Al_2O_3$ in the glass composition may be in the range from 10.0 to 25.0 mol %, from 10.0 to 23.0 mol %, from 10.0 to 20.0 mol %, from 10.0 to 19.0 mol %, from 10.0 to 18.0 mol %, from 12.0 to 25.0 mol %, from 12.0 to 23.0 mol %, from 12.0 to 20.0 mol %, from 12.0 to 19.0 mol %, from 12.0 to 18.0 mol %, from 13.0 to 25.0 mol %, from 13.0 to 23.0 mol %, from 13.0 to 20.0 mol %, from 13.0 to 19.0 mol %, from 13.0 to 18.0 mol %, from 14.0 to 25.0 mol %, from 14.0 to 23.0 mol %, from 14.0 to 20.0 mol %, from 14.0 to 19.0 mol %, from 14.0 to 18.0 mol %, from 15.0 to 25.0 mol %, from 15.0 to 23.0 mol %, from 15.0 to 20.0 mol %, from 15.0 to 19.0 mol %, from 15.0 to 18.0 mol %, from 16.0 to 25.0 mol %, from 16.0 to 23.0 mol %, from 16.0 to 20.0 mol %, from 16.0 to 19.0 mol %, from 16.0 to 18.0 mol %, from 17.0 to 25.0 mol %, from 17.0 to 23.0 mol %, from 17.0 to 20.0 mol %, from 17.0 to 19.0 mol %, or from 17.0 to 18.0 mol %, or any and all sub-ranges formed from any of these endpoints. In embodiments, the concentration of $Al_2O_3$ in the glass composition may be greater than or equal to 10.0 mol %, greater than or equal to 11.0 mol %, greater than or equal to 12.0 mol %, greater than or equal to 13.0 mol %, greater than or equal to 14.0 mol %, greater than or equal to 15.0 mol %, greater than or equal to 16.0 mol %, or greater than or equal to 17.0 mol %.

The glass compositions may include $Li_2O$. The inclusion of $Li_2O$ in the glass composition allows for better control of an ion exchange process and further reduces the softening point of the glass, thereby increasing the manufacturability of the glass. The presence of $Li_2O$ in the glass compositions also allows the formation of a stress profile with a parabolic shape. The $Li_2O$ in the glass compositions enables the high fracture toughness values described herein. In embodiments, the glass composition may comprise 5.0 to 15.0 mol % $Li_2O$. In embodiments, the glass composition may comprise 5.0 to 10.0 mol % $Li_2O$. In embodiments, the glass composition may comprise 6.0 to 9.0 mol % $Li_2O$. In embodiments, the concentration of $Li_2O$ in the glass composition may be in the range from 5.0 to 15.0 mol %, from 5.0 to 10.0 mol %, from 5.0 to 9.0 mol %, from 5.0 to 8.5 mol %, from 5.0 to 8.0 mol %, from 6.0 to 15.0 mol %, from 6.0 to 10.0 mol %, from 6.0 to 9.0 mol %, from 6.0 to 8.5 mol %, from 6.0 to 8.0 mol %, from 6.0 to 7.5 mol %, from 6.0 to 7.0 mol %, from 6.5 to 15.0 mol %, from 6.5 to 10.0 mol %, from 6.5 to 9.0 mol %, from 6.5 to 8.5 mol %, from 6.5 to 8.0 mol %, from 7.0 to 15.0 mol %, from 7.0 to 10.0 mol %, from 7.0 to 9.0 mol %, from 7.0 to 8.5 mol %, from 7.0 to 8.0 mol %, 7.5 to 15.0 mol %, from 7.5 to 10.0 mol %, from 7.5 to 9.0 mol %, or from 7.5 to 8.5 mol %, or any and all sub-ranges formed from any of these endpoints. In embodiments, the concentration of $Li_2O$ in the glass composition may be less than or equal to 15.0 mol %, less than or equal to 10.0 mol %, less than or equal to 9.5 mol %, less than or equal to 9.0 mol %, less than or equal to 8.5 mol %, or less than or equal to 8.0 mol %.

The glass compositions described herein may include $Na_2O$. $Na_2O$ may aid in the ion-exchangeability of the glass composition, and improve the formability, and thereby manufacturability, of the glass composition. However, if too much $Na_2O$ is added to the glass composition, the CTE may be too low, and the melting point may be too high. Additionally, if too much $Na_2O$ is included in the glass relative to the amount of $Li_2O$ the ability of the glass to achieve a deep depth of compression when ion exchanged may be reduced. In embodiments, the glass composition may comprise 1.0 to 15.0 mol % $Na_2O$. In embodiments, the glass composition may comprise 4.0 to 10.0 mol % $Na_2O$. In embodiments, the glass composition may comprise 5.0 to 9.0 mol % $Na_2O$. In embodiments, the concentration of $Na_2O$ in the glass composition may be in the range from 1.0 to 15.0 mol %, from 1.0 to 10.0 mol %, from 3.0 to 15.0 mol %, from 3.0 to 10.0 mol %, from 4.0 to 15.0 mol %, from 4.0 to 10.0 mol %, from 4.0 to 9.5 mol %, from 4.0 to 9.0 mol %, from 4.5 to 15.0 mol %, from 4.5 to 10.0 mol %, from 4.5 to 9.5 mol %, from 4.5 to 9.0 mol %, from 5.0 to 15 mol %, from 5.0 to 10.0 mol %, from 5.0 to 9.5 mol %, from 5.0 to 9.0 mol %, from 5.5 to 15.0 mol %, from 5.5 to 10.0 mol %, from 5.5 to 9.5 mol %, from 5.5 to 9.0 mol %, from 6.0 to 15.0 mol %, from 6.0 to 10.0 mol %, from 6.0 to 9.5 mol %, from 6.0 to 9.0 mol %, from 6.5 to 15.0 mol %, from 6.5 to 10.0 mol %, from 6.5 to 9.5 mol %, from 6.5 to 9.0 mol %, from 7.0 to 15.0 mol %, from 7.0 to 10.0 mol %, from 7.0 to 9.5 mol %, from 7.0 to 9.0 mol %, from 7.5 to 15.0 mol %, from 7.5 to 10.0 mol %, from 7.5 to 9.5 mol %, from 8.0 to 15.0 mol %, or from 8.0 to 10.0 mol % or any and all sub-ranges formed from any of these endpoints. In embodiments, the concentration of $Na_2O$ in the glass composition may be less than or equal to 15.0 mol %, less than or equal to 10.0 mol %, less than or equal to 9.5 mol %, or less than or equal to 9.0 mol %.

The glass compositions described herein may include $P_2O_5$. The inclusion of $P_2O_5$ increases the diffusivity of ions in the glass, increasing the speed of the ion exchange process. If too much $P_2O_5$ is included in the composition the amount of compressive stress imparted in an ion exchange process may be reduced and volatility at free surfaces during manufacturing may increase to undesirable levels. In embodiments, the glass composition may comprise from 0.0 to 5.0 mol % $P_2O_5$. In embodiments, the glass composition may comprise from 0.3 to 3.0 mol % $P_2O_5$. In embodiments, the glass composition may comprise from 0.5 to 2.5 mol % $P_2O_5$. In embodiments, the concentration of $P_2O_5$ in the glass composition may be in the range from 0.0 to 5.0 mol %, from 0.0 to 4.0 mol %, from 0.0 to 3.0 mol %, from 0.0 to 2.5 mol %, from 0.0 to 2.3 mol %, from 0.0 to 2.0 mol %, from 0.0 to 1.7 mol %, from 0.0 to 1.5 mol %, from 0.3 to 5.0 mol %, from 0.3 to 4.0 mol %, from 0.3 to 3.0 mol %, from 0.3 to 2.5 mol %, from 0.3 to 2.3 mol %, from 0.3 to 2.0 mol %, from 0.3 to 1.7 mol %, from 0.3 to 1.5 mol %, from 0.5 to 5.0 mol %, from 0.5 to 4.0 mol %, from 0.5 to 3.0 mol %, from 0.5 to 2.5 mol %, from 0.5 to 2.3 mol %, from 0.5 to 2.0 mol %, from 0.5 to 1.7 mol %, from 0.5 to 1.5 mol %, from 0.7 to 5.0 mol %, from 0.7 to 4.0 mol %, from 0.7 to 3.0 mol %, from 0.7 to 2.5 mol %, from 0.7 to 2.3 mol %, from 0.7 to 2.0 mol %, from 0.7 to 1.7 mol %, from 0.7 to 1.5 mol %, from 1.0 to 5.0 mol %, from 1.0 to 4.0 mol %, from 1.0 to 3.0 mol %, from 1.0 to 2.5 mol %, from 1.0 to 2.3 mol %, from 1.0 to 2.0 mol %, from 1.0 to 1.7 mol %, or from 1.0 to 1.5 mol %, or any and all sub-ranges formed from any of these endpoints. In embodiments, the glass composition may comprise less than or equal to 4.0 mol % $P_2O_5$. In embodiments, the concentration of $P_2O_5$ in the glass composition may be less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, or less than or equal to 1.5 mol %.

The glass compositions described herein may include $B_2O_3$. The inclusion of $B_2O_3$ increases the fracture toughness of the glass. In particular, the glass compositions include boron in the trigonal configuration which increases the Knoop scratch threshold and fracture toughness of the glasses. If too much $B_2O_3$ is included in the composition the amount of compressive stress imparted in an ion exchange process may be reduced and volatility at free surfaces during manufacturing may increase to undesirable levels. In embodiments, the glass composition may comprise from 0.0 to 10.0 mol % $B_2O_3$. In embodiments, the glass composition may comprise from 1.0 to 7.0 mol % $B_2O_3$. In embodiments, the glass composition may comprise from 2.0 to 6.0 mol % $B_2O_3$. In embodiments, the concentration of $B_2O_3$ in the glass composition may be in the range from 0.0 to 10.0 mol %, from 0.0 to 9.0 mol %, 0.0 to 8.0 mol %, 0.0 to 7.5 mol %, 0.0 to 7.0 mol %, 0.0 to 6.5 mol %, from 0.0 to 6.0 mol %, from 0.0 to 5.5 mol %, from 0.0 to 5.0 mol %, from 0.0 to 4.5 mol %, from 0.5 to 10.0 mol %, from 0.5 to 9.0 mol %, 0.5 to 8.0 mol %, 0.5 to 7.5 mol %, 0.5 to 7.0 mol %, 0.5 to 6.5 mol %, from 0.5 to 6.0 mol %, from 0.5 to 5.5 mol %, from 0.5 to 5.0 mol %, from 0.5 to 4.5 mol %, from 1.0 to 10.0 mol %, from 1.0 to 9.0 mol %, 1.0 to 8.0 mol %, 1.0 to 7.5 mol %, 1.0 to 7.0 mol %, 1.0 to 6.5 mol %, from 1.0 to 6.0 mol %, from 1.0 to 5.5 mol %, from 1.0 to 5.0 mol %, from 1.0 to 4.5 mol %, from 1.5 to 10.0 mol %, from 1.5 to 9.0 mol %, from 1.5 to 8.0 mol %, from 1.5 to 7.5 mol %, from 1.5 to 7.0 mol %, from 1.5 to 6.5 mol %, from 1.5 to 6.0 mol %, from 1.5 to 5.5 mol %, from 1.5 to 5.0 mol %, from 1.5 to 4.5 mol %, from 2.0 to 10 mol %, from 2.0 to 9.0 mol %, from 2.0 to 8.0 mol %, from 2.0 to 7.5 mol %, from 2.0 to 7.0 mol %, from 2.0 to 6.5 mol %, from 2.0 to 6.0 mol %, from 2.0 to 5.5 mol %, from 2.0 to 5.0 mol %, from 2.0 to 4.5 mol %, from 2.5 to 10.0 mol %, from 2.5 to 9.0 mol %, from 2.5 to 8.0 mol %, from 2.5 to 7.5 mol %, from 2.5 to 7.0 mol %, from 2.5 to 6.5 mol %, from 0.0 to 6.0 mol %, from 0.0 to 5.5 mol %, from 2.5 to 5.0 mol %, from 2.5 to 4.5 mol %, from 3.0 to 10.0 mol %, from 3.0 to 9.0 mol %, from 3.0 to 8.0 mol %, from 3.0 to 7.5 mol %, from 3.0 to 7.0 mol %, from 3.0 to 6.5 mol %, from 3.0 to 6.0 mol %, from 3.0 to 5.5 mol %, from 3.0 to 5.0 mol %, from 3.0 to 4.5 mol %, from 3.5 to 10.0 mol %, from 3.5 to 9.0 mol %, from 3.5 to 8.0 mol %, from 3.5 to 7.5 mol %, from 3.5 to 7.0 mol %, from 3.5 to 6.5 mol %, from 3.5 to 6.0 mol %, from 3.5 to 5.5 mol %, from 3.5 to 5.0 mol %, from 3.5 to 4.5 mol %, from 4.0 to 10.0 mol %, from 4.0 to 9.0 mol %, from 4.0 to 8.0 mol %, from 4.0 to 7.5 mol %, from 4.0 to 7.0 mol %, from 4.0 to 6.5 mol %, from 4.0 to 6.0 mol %, from 4.0 to 5.5 mol %, or from 4.0 to 5.0 mol %, or any and all sub-ranges formed from any of these endpoints. In embodiments, the concentration of $B_2O_3$ in the glass composition may be greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, or greater than or equal to 4.0 mol %.

The glass compositions described herein may include $TiO_2$. The inclusion of too much $TiO_2$ in the glass composition may result in the glass being susceptible to devitrification and/or exhibiting an undesirable coloration as well as undesirably changing the liquidus. The inclusion of $TiO_2$ in the glass composition prevents the undesirable discoloration of the glass if exposed to intense ultraviolet light, such as during post-processing treatments. In embodiments, the glass composition comprises $TiO_2$ in an amount from greater than 0 mol % to less than or equal to 1 mol %, such as greater than or equal to 0.1 mol % to less than or equal to 1.0 mol %, greater than or equal to 0.2 mol % to less than or equal to 0.9 mol %, greater than or equal to 0.3 mol % to less than or equal to 0.8 mol %, greater than or equal to 0.4 mol % to less than or equal to 0.7 mol %, greater than or equal to 0.5 mol % to less than or equal to 0.6 mol %, greater than or equal to 0.1 mol % to less than or equal to 0.2 mol %, greater than or equal to 0.1 mol % to less than or equal to 0.5 mol %, and all ranges and sub-ranges between the foregoing values.

The glass compositions may include $K_2O$. The inclusion of $K_2O$ in the glass composition increases the potassium diffusivity in the glass, enabling a deeper depth of a compressive stress spike ($DOL_{SP}$) to be achieved in a shorter amount of ion exchange time. If too much $K_2O$ is included in the composition the amount of compressive stress imparted during an ion-exchange process may be reduced. In embodiments, the glass composition may comprise 0.0 to 1.0 mol % $K_2O$. In embodiments, the glass composition may comprise 0.0 to 0.5 mol % $K_2O$. In embodiments, the glass composition may comprise 0.0 to 0.4 mol % $K_2O$. In embodiments, the concentration of $K_2O$ in the glass composition may be in the range from 0.0 to 1.0 mol %, from 0.0 to 0.5 mol %, from 0.0 to 0.4 mol %, from 0.0 to 0.3 mol %, from 0.0 to 0.2 mol %, or from 0.0 to 0.1 mol %, or any and all sub-ranges formed from any of these endpoints. In embodiments, the glass composition may comprise less than or equal to 1.0 mol % $K_2O$, less than or equal to 0.5 mol % $K_2O$, less than or equal to 0.4 mol % $K_2O$, less than or equal to 0.3 mol % $K_2O$, less than or equal to 0.2 mol % $K_2O$, or less than or equal to 0.1 mol % $K_2O$.

The glass compositions described herein may include MgO. MgO may lower the viscosity of a glass, which enhances the formability and manufacturability of the glass. The inclusion of MgO in a glass composition may also improve the strain point and the Young's modulus of the glass composition. However, if too much MgO is added to the glass composition, the liquidus viscosity may be too low for compatibility with desirable forming techniques. The addition of too much MgO may also increase the density and the CTE of the glass composition to undesirable levels. The inclusion of MgO in the glass composition also helps to achieve the high fracture toughness values described herein. In embodiments, the glass composition comprises MgO in an amount from greater than or equal to 0 mol % to less than or equal to 4 mol %, such as greater than 0 mol % to less than or equal to 4.0 mol %, greater than or equal to 0.5 mol % to less than or equal to 3.5 mol %, greater than or equal to 1 mol % to less than or equal to 3 mol %, greater than or equal to 1.0 mol % to less than or equal to 3.0 mol %, greater than or equal to 1.5 mol % to less than or equal to 2.5 mol %, greater than or equal to 1 mol % to less than or equal to 2 mol %, greater than or equal to 2.0 mol % to less than or equal to 3 mol %, greater than or equal to 0.1 mol % to less than or equal to 1 mol %, and all ranges and sub-ranges between the foregoing values. In embodiments, the glass composition is substantially free or free of MgO. As used herein, the term "substantially free" means that the component (e.g., MgO) (or multiple components, e.g., $Ta_2O_5$, $HfO_2$, $La_2O_3$, and $Y_2O_3$) is not purposefully added as a component (or components) of the batch material even though the component (or components) may be present in the final glass composition in very small amounts as a contaminant (or contaminants), such as less than 0.1 mol %.

The glass compositions described herein may include CaO. CaO may lower the viscosity of a glass, which may enhance the formability, the strain point, and the Young's modulus. However, if too much CaO is added to the glass composition, the density and the CTE of the glass composition may increase to undesirable levels and the ion exchangeability of the glass may be undesirably impeded. The inclusion of CaO in the glass composition also helps to achieve the high fracture toughness values described herein. In embodiments, the glass composition comprises CaO in an amount from greater than or equal to 0 mol % to less than or equal to 3 mol %, such as greater than 0 mol % to less than or equal to 3.0 mol %, greater than or equal to 0.5 mol % to less than or equal to 2.5 mol %, greater than or equal to 1 mol % to less than or equal to 2 mol %, greater than or equal to 1.0 mol % to less than or equal to 2.0 mol %, greater than or equal to 1.5 mol % to less than or equal to 2.0 mol %, greater than or equal to 1 mol % to less than or equal to 2 mol %, and all ranges and sub-ranges between the foregoing values. In embodiments, the glass composition is substantially free or free of CaO.

The glass compositions described herein may include SrO. SrO may lower the viscosity of a glass, which may enhance the formability, the strain point, and the Young's modulus. However, if too much SrO is added to the glass composition, the density and the CTE of the glass composition may increase to undesirable levels and the ion exchangeability of the glass may be undesirably impeded. The inclusion of SrO in the glass composition also helps to achieve the high fracture toughness values described herein. In embodiments, the glass composition comprises SrO in an amount from greater than or equal to 0 mol % to less than or equal to 4 mol %, such as greater than 0 mol % to less than or equal to 4.0 mol %, greater than or equal to 0.5 mol % to less than or equal to 3.5 mol %, greater than or equal to 1 mol % to less than or equal to 3 mol %, greater than or equal to 1.0 mol % to less than or equal to 3.0 mol %, greater than or equal to 1.5 mol % to less than or equal to 2.5 mol %, greater than or equal to 1 mol % to less than or equal to 2 mol %, greater than or equal to 2.0 mol % to less than or equal to 3 mol %, greater than or equal to 0.5 mol % to less than or equal to 2 mol %, and all ranges and sub-ranges between the foregoing values. In embodiments, the glass composition is substantially free or free of SrO.

The glass compositions described herein may include ZnO. ZnO may lower the viscosity of a glass, which may enhance the formability, the strain point, and the Young's modulus. However, if too much ZnO is added to the glass composition, the density and the CTE of the glass composition may increase to undesirable levels. The inclusion of ZnO in the glass composition also helps to achieve the high fracture toughness values described herein and provides protection against UV induced discoloration. In embodiments, the glass composition comprises ZnO in an amount from greater than or equal to 0 mol % to less than or equal to 1 mol %, such as greater than 0 mol % to less than or equal to 1.0 mol %, greater than or equal to 0.1 mol % to less than or equal to 0.9 mol %, greater than or equal to 0.2 mol % to less than or equal to 0.8 mol %, greater than or equal to 0.3 mol % to less than or equal to 0.7 mol %, greater than or equal to 0.4 mol % to less than or equal to 0.6 mol %, greater than or equal to 0.1 mol % to less than or equal to 0.5 mol %, from greater than or equal to 0 mol % to less than or equal to 0.3 mol %, and all ranges and sub-ranges between the foregoing values. In embodiments, the glass composition is substantially free or free of ZnO.

The glass compositions may optionally include one or more fining agents. In embodiments, the fining agent may include, for example, $SnO_2$. In embodiments, $SnO_2$ may be present in the glass composition in an amount less than or equal to 0.2 mol %, such as from greater than or equal to 0 mol % to less than or equal to 0.2 mol %, greater than or equal to 0 mol % to less than or equal to 0.1 mol %, greater than or equal to 0 mol % to less than or equal to 0.05 mol %, greater than or equal to 0.1 mol % to less than or equal to 0.2 mol %, and all ranges and sub-ranges between the foregoing values. In some embodiments, the glass composition may be substantially free or free of $SnO_2$. In embodiments, the glass composition may be substantially free of one or both of arsenic and antimony. In other embodiments, the glass composition may be free of one or both of arsenic and antimony.

The glass compositions described herein may further include $Fe_2O_3$. In embodiments, the concentration of $Fe_2O_3$ in the glass composition may be from 0.0 to 1.0 mol %, from 0.0 to 0.5 mol %, from 0.0 to 0.4 mol %, from 0.0 to 0.3 mol %, from 0.0 to 0.2 mol %, or from 0.0 to 0.1 mol %, or any and all sub-ranges formed from any of these endpoints. In embodiments, the concentration of $Fe_2O_3$ in the glass composition may be less than or equal to 0.1 mol %. In embodiments, the concentration of $Fe_2O_3$ in the glass composition may be greater than 0.0 mol % to less than or equal to 0.1 mol %. In embodiments, the glass composition may be substantially free or free of $Fe_2O_3$.

In embodiments, the glass composition may be substantially free or free of at least one of $Ta_2O_5$, $HfO_2$, $La_2O_3$, and $Y_2O_3$. In embodiments, the glass composition may be substantially free or free of $Ta_2O_5$, $HfO_2$, $La_2O_3$, and $Y_2O_3$. While these components may increase the fracture toughness of the glass when included, there are cost and supply constraints that make using these components undesirable for commercial purposes. Stated differently, the ability of the glass compositions described herein to achieve high fracture toughness values without the inclusion of $Ta_2O_5$, $HfO_2$, $La_2O_3$, and $Y_2O_3$ provides a cost and manufacturability advantage.

The glass compositions described herein may be described in terms of a lithium to sodium molar ratio ($Li_2O/Na_2O$). A high $Li_2O/Na_2O$ molar ratio allows a deep depth of compression (DOC) to be achieved when the glass compositions are ion exchanged. The increased DOC capability attributable to the high $Li_2O/Na_2O$ molar ratios allows the ion exchanged articles formed from the glass compositions to exhibit improved drop performance, especially on rough surfaces. In embodiments, the glass composition is characterized by a $Li_2O/Na_2O$ molar ratio from greater than or equal to 1.2 to less than or equal to 2.0, such as greater than or equal to 1.3 to less than or equal to 1.9, greater than or equal to 1.4 to less than or equal to 1.8, greater than or equal to 1.5 to less than or equal to 1.7, greater than or equal to 1.6 to less than or equal to 2.0, and all ranges and sub-ranges between the foregoing values.

Physical properties of the glass compositions as disclosed above will now be discussed.

Glass compositions according to embodiments have a high fracture toughness. Without wishing to be bound by any particular theory, the high fracture toughness may impart improved drop performance to the glass compositions. The high fracture toughness of the glass compositions described herein increases the resistance of the glasses to damage and allows a higher degree of stress to be imparted to the glass through ion exchange, as characterized by central tension, without becoming frangible. As utilized herein, Fracture toughness ($K_{1C}$) represents the ability of a glass composition to resist fracture. Fracture toughness is measured on a non-strengthened glass article, such as measuring the $K_{1C}$ value prior to ion exchange (IOX) treatment of the glass article, thereby representing a feature of a glass substrate prior to IOX. The fracture toughness test methods described herein are not suitable for glasses that have been exposed to IOX treatment. The measurements on corresponding underlying glass substrates (without IOX treatment), nonetheless, provide valuable information about the IOX'd glass properties. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Unless otherwise specified, all fracture toughness values were measured by chevron notched short bar (CNSB) method.

In embodiments, the $K_{1C}$ fracture toughness of the glass composition as measured by a chevron notch short bar method may be greater than or equal to 0.70, greater than or equal to 0.71, greater than or equal to 0.72, greater than or equal to 0.73, greater than or equal to 0.74, greater than or equal to 0.75, greater than or equal to 0.76, greater than or equal to 0.77, greater than or equal to 0.78, greater than or equal to 0.79, or greater than or equal to 0.80. In embodiments, the $K_{1C}$ fracture toughness of the glass composition as measured by a chevron notch short bar method may be in the range of from greater than or equal to 0.70 to less than or equal to 0.80 or greater than or equal to 0.73 to less than or equal to 0.75. It should be understood that the fracture toughness may be within a sub-range formed from any and all of the foregoing endpoints.

In one or more embodiments the glass substrates described herein may have an elastic modulus (Young's modulus) of greater than or equal to 72.0 GPa, such as greater than or equal to 73.0 GPa, greater than or equal to 74.0 GPa, greater than or equal to 75.0 GPa, greater than or equal to 76.0 GPa, greater than or equal to 77.0 GPa, greater than or equal to 78.0 GPa, greater than or equal to 79.0 GPa, or even greater than or equal to 80.0 GPa.

The glass compositions described herein have liquidus viscosities that are compatible with manufacturing processes that are especially suitable for forming thin glass sheets. For example, the glass compositions are compatible with down draw processes such as fusion draw processes or slot draw processes. Embodiments of the glass substrates 110 may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate 110. The fusion of the glass films produces a fusion line within the glass substrate 110, and this fusion line allows glass substrates 110 that were fusion formed to be identified without additional knowledge of the manufacturing history. The fusion draw method offers the advantage that, because the two glass films flowing over the channel fuse together, neither of the outside surfaces of the resulting glass substrate 110 comes in contact with any part of the apparatus. Thus, the surface properties of the fusion drawn glass substrate 110 are not affected by such contact.

The glass compositions described herein may be selected to have liquidus viscosities that are compatible with fusion draw processes. Thus, the glass compositions described herein are compatible with existing forming methods, increasing the manufacturability of glass substrates 110 formed from the glass compositions. As used herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. Unless specified otherwise, a liquidus viscosity value disclosed in this application is determined by the following method. First, the liquidus temperature of the glass is measured in accordance with ASTM C829-81 (2015), titled "Standard Practice for Measurement of Liquidus Temperature of Glass by the Gradient Furnace Method." Next, the viscosity of the glass at the liquidus temperature is measured in accordance with ASTM C965-96 (2012), titled "Standard Practice for Measuring Viscosity of Glass Above the Softening Point". The term "Vogel-Fulcher-Tamman ('VFT') relation," as used herein, described the temperature dependence of the viscosity and is represented by the following Equation (3):

$$\log\eta = A + \frac{B}{T - T_o} \tag{3}$$

where $\eta$ is viscosity. To determine VFT A, VFT B, and VFT $T_o$, the viscosity of the glass composition is measured over a given temperature range. The raw data of viscosity versus temperature is then fit with the VFT equation by least-squares fitting to obtain A, B, and $T_o$. With these values, a viscosity point (e.g., 200 P Temperature, 35000 P Temperature, and 200000 P Temperature) at any temperature above softening point may be calculated. Unless otherwise specified, the liquidus viscosity and temperature of a glass composition or article is measured before the composition or article is subjected to any ion-exchange process or any other strengthening process. In particular, the liquidus viscosity and temperature of a glass composition or article is measured before the composition or article is exposed to an ion-exchange solution, for example before being immersed in an ion-exchange solution.

In embodiments, the liquidus viscosity of the glass composition may be greater than or equal to 50 kP, such as greater than or equal to 55 kP, greater than or equal to 60 kP, greater than or equal to 65 kP, greater than or equal to 70 kP, greater than or equal to 75 kP, or more. In embodiments, the liquidus viscosity of the glass composition may be greater than or equal to 50 kP to less than or equal to 80 kP, such as greater than or equal to 55 kP to less than or equal to 75 kP, greater than or equal to 60 kP to less than or equal to 70 kP, greater than or equal to 50 kP to less than or equal to 65 kP, greater than or equal to 50 kP to less than or equal to 75 kP, and all ranges and sub-ranges between the foregoing values. A lower liquidus viscosity has been associated with higher $K_{IC}$ values and improved ion exchange capability, but when the liquidus viscosity is too low the manufacturability of the glass compositions is reduced.

The glass compositions may be described in terms of the components included therein and the properties exhibited by the glass. In embodiments, the glass includes $SiO_2$, $Al_2O_3$, $Li_2O$, $Na_2O$, $P_2O_5$, and $B_2O_3$, with a $Li_2O/Na_2O$ molar ratio greater than or equal to 1.2 to less than or equal to 2.0, has a liquidus viscosity in the range from greater than or equal to 50 kP to less than or equal to 75 kP, and has $K_{IC}$ fracture toughness greater than or equal to 0.75 MPa$\sqrt{m}$.

In one or more embodiments, the glass compositions described herein may form glass substrates 110 that exhibit an amorphous microstructure and may be substantially free of crystals or crystallites. In other words, the glass substrates 110 formed from the glass compositions described herein may exclude glass-ceramic materials.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at or near the surface of the glass substrate 110, and the CS varies with distance d from the surface according to a function. Compressive stress (including surface CS) may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

In embodiments, the CS of the glass substrate 110 is from greater than or equal to 500 MPa to less than or equal to 1500 MPa, such as greater than or equal to 550 MPa to less than or equal to 1500 MPa, greater than or equal to 600 MPa to less than or equal to 1500 MPa, greater than or equal to 650 MPa to less than or equal to 1450 MPa, greater than or equal to 700 MPa to less than or equal to 1400 MPa, greater than or equal to 750 MPa to less than or equal to 1350 MPa, greater than or equal to 800 MPa to less than or equal to 1300 MPa, greater than or equal to 850 MPa to less than or equal to 1250 MPa, greater than or equal to 900 MPa to less than or equal to 1200 MPa, greater than or equal to 950 MPa to less than or equal to 1150 MPa, greater than or equal to 1000 MPa to less than or equal to 1150 MPa, greater than or equal to 1050 MPa to less than or equal to 1500 MPa, greater than or equal to 1200 MPa to less than or equal to 1300 MPa, and all ranges and sub-ranges between the foregoing values.

In embodiments, $Na^+$ and $K^+$ ions are exchanged into the glass substrate 110 and the Na ions diffuse to a deeper depth into the glass substrate 110 than the $K^+$ ions. The depth of penetration of $K^+$ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement. The potassium DOL may define a depth of a compressive stress spike ($DOL_{SP}$), where a stress profile transitions from a steep spike region to a less-steep deep region. The deep region extends from the bottom of the spike to the depth of compression. The $DOL_{SP}$ of the glass substrate 110 may be from greater than or equal to 3 μm to less than or equal to 12 μm, such as greater than or equal to 4 μm to less than or equal to 11 μm, greater than or equal to 5 μm to less than or equal to 10 μm, greater than or equal to 6 μm to less than or equal to 9 μm, greater than or equal to 7 μm and less than or equal to 8 μm, and all ranges and sub-ranges between the foregoing values.

The compressive stress of both major surfaces is balanced by stored tension in the central region of the glass substrate. The maximum central tension (CT) and DOC values may be measured using a scattered light polariscope (SCALP) technique known in the art. The refracted near-field (RNF) method or SCALP may be used to determine the stress profile of the glass substrate 110. When the RNF method is utilized to measure the stress profile, the maximum CT value provided by SCALP is utilized in the RNF method. In particular, the stress profile determined by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass substrate 110 adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The measurement of a maximum CT value is an indicator of the total amount of stress stored in the strengthened articles, due to the force balancing described above. For this reason, the ability to achieve higher CT values correlates to the ability to achieve higher degrees of strengthening and increased performance. In embodiments, the glass substrate 110 may have a maximum CT greater than or equal to 20 MPa, such as greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90

MPa, greater than or equal to 100 MPa, greater than or equal to 110 MPa, greater than or equal to 120 MPa, greater than or equal to 130 MPa, greater than or equal to 140 MPa, greater than or equal to 150 MPa, or more. In embodiments, the glass substrate 110 may have a maximum CT of from greater than or equal to 20 MPa to less than or equal to 160 MPa, such as greater than or equal to 30 MPa to less than or equal to 160 MPa, greater than or equal to 40 MPa to less than or equal to 160 MPa, greater than or equal to 50 MPa to less than or equal to 160 MPa, greater than or equal to 60 MPa to less than or equal to 160 MPa, greater than or equal to 70 MPa to less than or equal to 160 MPa, greater than or equal to 80 MPa to less than or equal to 160 MPa, greater than or equal to 90 MPa to less than or equal to 160 MPa, greater than or equal to 100 MPa to less than or equal to 150 MPa, greater than or equal to 110 MPa to less than or equal to 140 MPa, greater than or equal to 120 MPa to less than or equal to 130 MPa, and all ranges and sub-ranges between the foregoing values.

The high fracture toughness values of the glass compositions described herein also may enable improved performance. The frangibility limit of the glass substrates 110 produced utilizing the glass compositions described herein is dependent at least in part on the fracture toughness. For this reason, the high fracture toughness of the glass compositions described herein allows for a large amount of stored strain energy to be imparted to the glass substrates 110 formed therefrom without becoming frangible. The increased amount of stored strain energy that may then be included in the glass substrates 110 allows the glass substrates 110 to exhibit increased fracture resistance, which may be observed through the drop performance of the glass substrates 110 The relationship between the frangibility limit and the fracture toughness is described in U.S. Patent Application Pub. No. 2020/0079689 A1, titled "Glass-based Articles with Improved Fracture Resistance," published Mar. 12, 2020, the entirety of which is incorporated herein by reference. The relationship between the fracture toughness and drop performance is described in U.S. Patent Application Pub. No. 2019/0369672 A1, titled "Glass with Improved Drop Performance," published Dec. 5, 2019, the entirety of which is incorporated herein by reference.

As noted above, DOC is measured using a scattered light polariscope (SCALP) technique known in the art. The DOC is provided in some embodiments herein as a portion of the thickness (t) of the glass substrate 110. In embodiments, the glass substrate 110 may have a depth of compression (DOC) from greater than or equal to 0.15 t to less than or equal to 0.25 t, such as from greater than or equal to 0.16 t, greater than or equal to 0.17 t, greater than or equal to 0.18 t, greater than or equal to 0.19 t, greater than or equal to 0.20 t, greater than or equal to 0.21 t to less than or equal to 0.24 t, or from greater than or equal to 0.22 t to less than or equal to 0.23 t, and all ranges and sub-ranges between the foregoing values. The high DOC values produced when the glass compositions described herein are ion exchanged provide improved resistance to fracture, especially for situations where deep flaws may be introduced. For example, the deep DOC provides improved resistance to fracture when dropped on rough surfaces.

Thickness (t) of glass substrate 110 is measured between first major surface 112 and first major surface 114. In embodiments, the thickness of glass substrate 110 may be in a range from greater than or equal to 0.1 mm to less than or equal to 4 mm, such as greater than or equal to 0.2 mm to less than or equal to 3.5 mm, greater than or equal to 0.3 mm to less than or equal to 3 mm, greater than or equal to 0.4 mm to less than or equal to 2.5 mm, greater than or equal to 0.5 mm to less than or equal to 2 mm, greater than or equal to 0.6 mm to less than or equal to 1.5 mm, greater than or equal to 0.7 mm to less than or equal to 1 mm, greater than or equal to 0.2 mm to less than or equal to 2 mm, and all ranges and sub-ranges between the foregoing values.

Compressive stress layers may be formed in the glass by exposing the glass to an ion exchange medium. In embodiments, the ion exchange medium may be molten nitrate salt. In embodiments, the ion exchange medium may be a molten salt bath, and may include $KNO_3$, $NaNO_3$, or combinations thereof. In embodiments, other sodium and potassium salts may be used in the ion exchange medium, such as, for example sodium or potassium nitrites, phosphates, or sulfates. In embodiments, the ion exchange medium may include lithium salts, such as $LiNO_3$. The ion exchange medium may additionally include additives commonly included when ion exchanging glass, such as silicic acid. The ion exchange process is applied to a glass substrate 110 to form a glass substrate 110 that includes a compressive stress layer extending from a surface of the glass substrate 110 to a depth of compression and a central tension region. The glass substrate 110 utilized in the ion exchange process may include any of the glass compositions described herein.

In embodiments, the ion exchange medium comprises $NaNO_3$. The sodium in the ion exchange medium exchanges with lithium ions in the glass to produce a compressive stress. In embodiments, the ion exchange medium may include $NaNO_3$ in an amount of less than or equal to 95 wt %, such as less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less. In embodiments, the ion exchange medium may include $NaNO_3$ in an amount of greater than or equal to 5 wt %, such as greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or more. In embodiments, the ion exchange medium may include $NaNO_3$ in an amount of greater than or equal to 0 wt % to less than or equal to 100 wt %, such as greater than or equal to 10 wt % to less than or equal to 90 wt %, greater than or equal to 20 wt % to less than or equal to 80 wt %, greater than or equal to 30 wt % to less than or equal to 70 wt %, greater than or equal to 40 wt % to less than or equal to 60 wt %, greater than or equal to 50 wt % to less than or equal to 90 wt %, and all ranges and sub-ranges between the foregoing values. In embodiments, the molten ion exchange medium includes 100 wt % $NaNO_3$.

In embodiments, the ion exchange medium comprises $KNO_3$. In embodiments, the ion exchange medium may include $KNO_3$ in an amount of less than or equal to 95 wt %, such as less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less. In embodiments, the ion exchange medium may include $KNO_3$ in an amount of greater than or equal to 5 wt %, such as greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or more. In embodiments, the ion exchange medium may include $KNO_3$ in an amount of greater than or equal to 0 wt % to less than or equal to 100 wt %, such as greater than or equal to 10 wt % to less than or equal to 90 wt %, greater than or equal to 20 wt % to less than or equal to 80 wt %, greater than or equal to 30 wt % to less than or equal to 70 wt %, greater than or equal to 40 wt % to less than or equal to 60 wt %, greater than or equal to 50 wt % to less than or equal to 90 wt %, and all ranges and sub-ranges between the foregoing values. In embodiments, the molten ion exchange medium includes 100 wt % $KNO_3$.

The ion exchange medium may include a mixture of sodium and potassium. In embodiments, the ion exchange medium is a mixture of potassium and sodium, such as a molten salt bath that includes both $NaNO_3$ and $KNO_3$. In embodiments, the ion exchange medium may include any combination $NaNO_3$ and $KNO_3$ in the amounts described above, such as a molten salt bath containing 80 wt % $NaNO_3$ and 20 wt % $KNO_3$.

The glass composition may be exposed to the ion exchange medium by dipping a glass substrate made from the glass composition into a bath of the ion exchange medium, spraying the ion exchange medium onto a glass substrate made from the glass composition, or otherwise physically applying the ion exchange medium to a glass substrate made from the glass composition to form the ion exchanged glass substrate. Upon exposure to the glass composition, the ion exchange medium may, according to embodiments, be at a temperature from greater than or equal to 360° C. to less than or equal to 500° C., such as greater than or equal to 370° ° C. to less than or equal to 490° C., greater than or equal to 380° C. to less than or equal to 480° ° C., greater than or equal to 390° ° C. to less than or equal to 470° C., greater than or equal to 400° ° C. to less than or equal to 460° C., greater than or equal to 410° C. to less than or equal to 450° C., greater than or equal to 420° C. to less than or equal to 440° ° C., greater than or equal to 430° C. to less than or equal to 470° C., greater than or equal to 400° C. to less than or equal to 470° C., greater than or equal to 380° ° C. to less than or equal to 470° C., and all ranges and sub-ranges between the foregoing values. In embodiments, the glass composition may be exposed to the ion exchange medium for a duration from greater than or equal to 10 minutes to less than or equal to 48 hours, such as greater than or equal to 10 minutes to less than or equal to 24 hours, greater than or equal to 0.5 hours to less than or equal to 24 hours, greater than or equal to 1 hours to less than or equal to 18 hours, greater than or equal to 2 hours to less than or equal to 12 hours, greater than or equal to 4 hours to less than or equal to 8 hours, and all ranges and sub-ranges between the foregoing values.

The ion exchange process may include a second ion exchange treatment. In embodiments, the second ion exchange treatment may include ion exchanging the glass substrate 110 in a second molten salt bath. The second ion exchange treatment may utilize any of the ion exchange mediums described herein. In embodiments, the second ion exchange treatment utilizes a second molten salt bath that includes $KNO_3$.

The ion exchange process may be performed in an ion exchange medium under processing conditions that provide an improved compressive stress profile as disclosed, for example, in U.S. Patent Application Publication No. 2016/0102011, which is incorporated herein by reference in its entirety. In some embodiments, the ion exchange process may be selected to form a parabolic stress profile in the glass substrate 110, such as those stress profiles described in U.S. Patent Application Publication No. 2016/0102014, which is incorporated herein by reference in its entirety.

After an ion exchange process is performed, it should be understood that a composition at the surface of an ion exchanged glass substrate 110 is be different than the composition of the as-formed glass substrate (i.e., the glass substrate before it undergoes an ion exchange process). This results from one type of alkali metal ion in the as-formed glass substrate, such as, for example $Li^+$ or $Na^+$, being replaced with larger alkali metal ions, such as, for example $Na^+$ or $K^+$, respectively. However, the glass composition at or near the center of the depth of the glass substrate 110 will, in embodiments, still have the composition of the as-formed non-ion exchanged glass substrate utilized to form the glass substrate 110. As utilized herein, the center of the glass substrate 110 refers to any location in the glass substrate 110 that is a distance of at least 0.5 t from every surface thereof, where t is the thickness of the glass substrate 110.

Figure 10A:
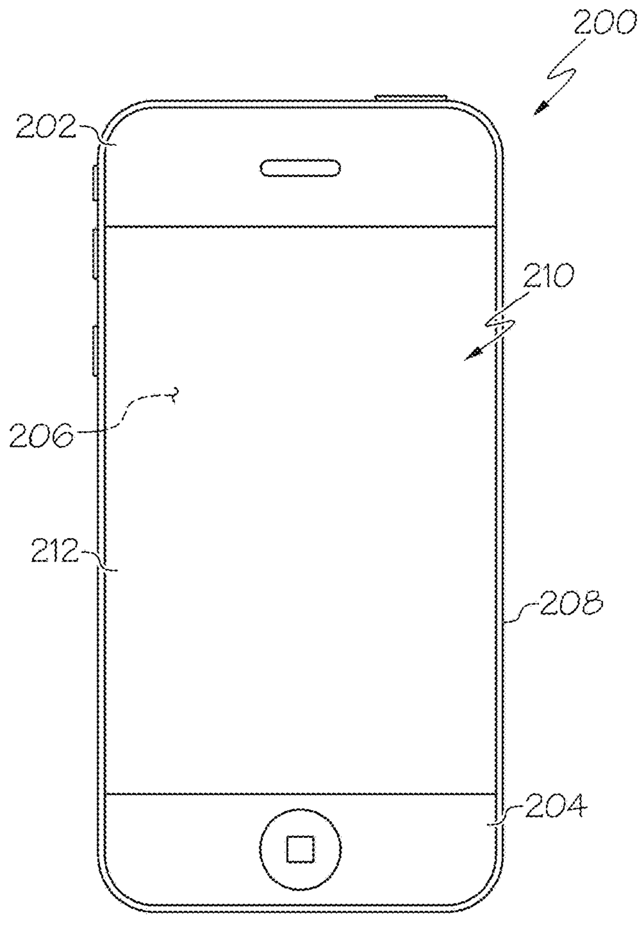
FIG. 10A is a plan view of an exemplary electronic device incorporating any of the coated articles described herein.
Figure 10B:
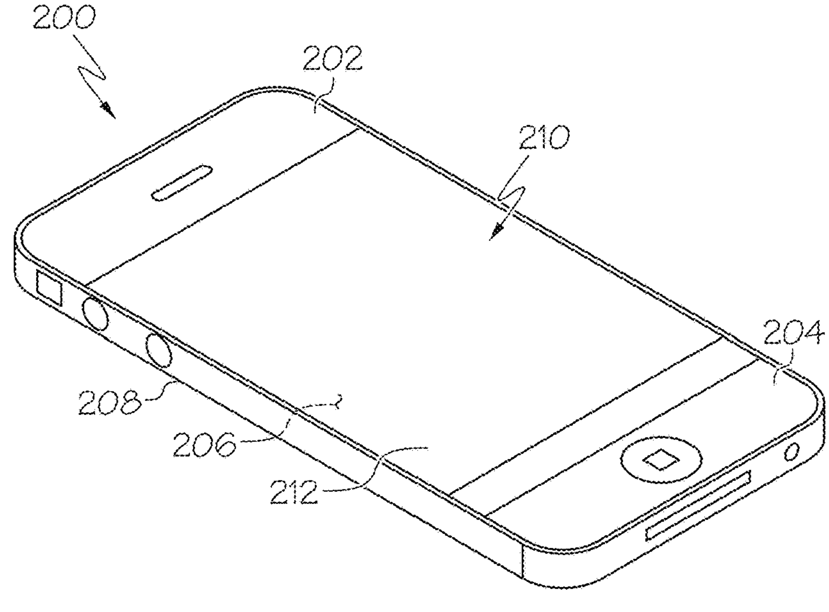
FIG. 10B is a perspective view of the exemplary electronic device of FIG. 10A, according to one or more embodiments described herein.

The coated articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the coated articles disclosed herein is shown in FIGS. 10A and 10B. Specifically, FIGS. 10A and 10B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least one of the cover substrate 212 or a portion of housing 202 may include any of the coated articles disclosed herein The Drop Test Method involves performing face-drop testing on a puck with a glass article attached thereto. The glass article is attached to the puck with Tesa® 61385 double sided adhesive tape to hold the glass article to the puck during the drop test described herein below. The glass article to be tested has a thickness similar or equal to the thickness that will be used in a given hand-held consumer electronic device, such as 0.5 mm or 0.6 mm. A puck refers to a structure meant to mimic the size, shape, and weight distribution of a given device, such as a cell phone. Hereinafter, the term "puck," refers to a structure that has a weight of 200 grams, a length of 133 mm, a width of 68 mm, and a height of 9.4 mm. In embodiments, the puck has the dimensions and weight similar to a handheld electronic device.

Figures 11, 12, 13:
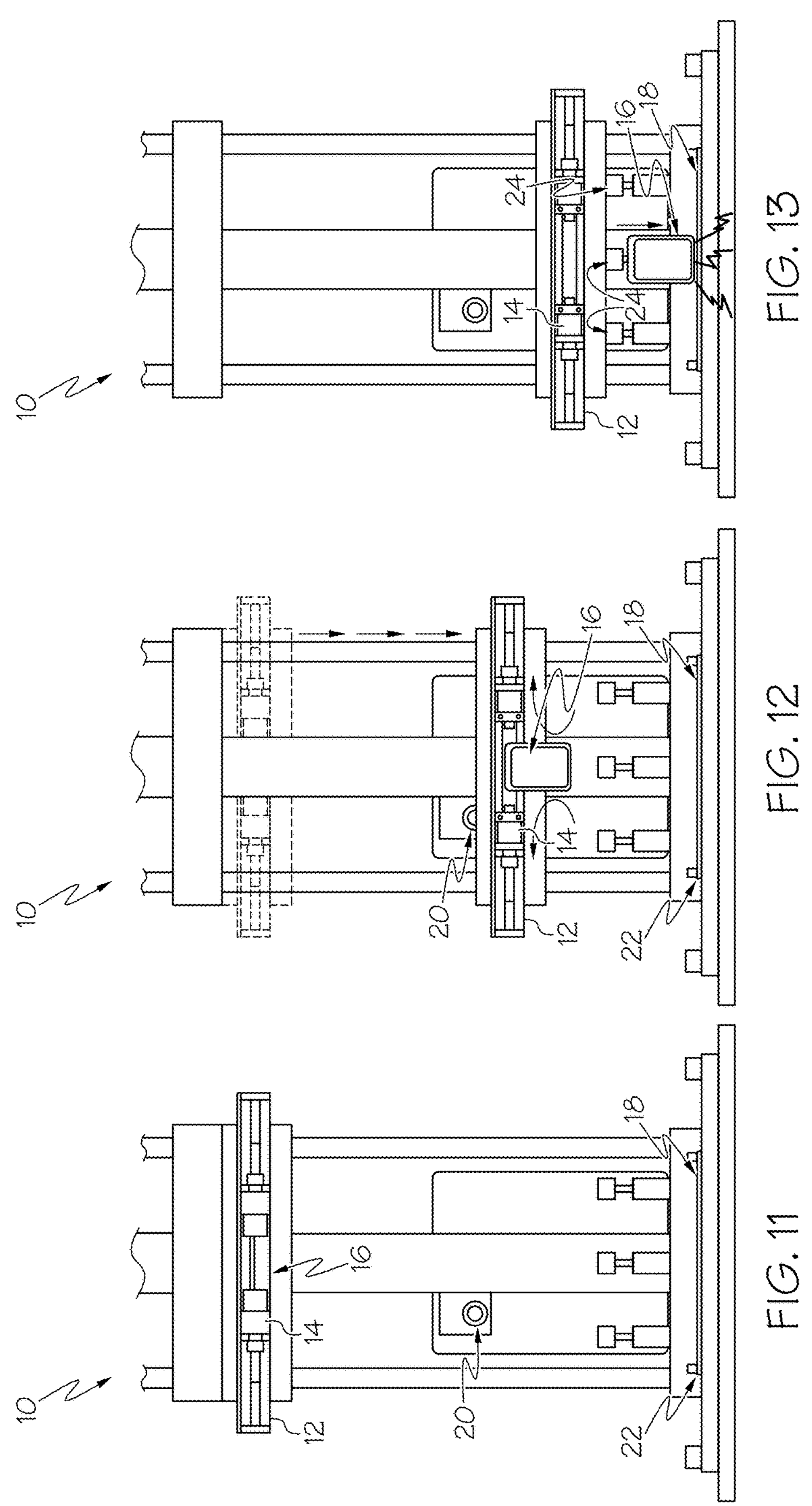
FIG. 11 is a plan view of an exemplary device-drop machine that may be used to conduct the Drop Test Method according to one or more embodiments described herein.
FIG. 12 is a plan view of the machine of FIG. 11, wherein a chuck of the device-drop machine is released, chuck jaws open, and a puck is released.
FIG. 13 is a plan view of the machine of FIG. 11, wherein the falling puck strikes a drop surface.

An exemplary device-drop machine that may be used to conduct the Drop Test Method is shown as reference number 10 in FIG. 11. The device-drop machine 10 includes a chuck 12 having chuck jaws 14. The puck 16 is staged in the chuck jaws 14 with the glass article attached thereto and facing downward. The chuck 12 is ready to fall from, for example, an electro-magnetic chuck lifter. Referring now to FIG. 12, the chuck 12 is released and during its fall, the chuck jaws 14 are triggered to open by, for example, a proximity sensor. As the chuck jaws 14 open, the puck 16 is released. Referring now to FIG. 13, the falling puck 16 strikes a drop surface 18. The drop surface 18 may be sandpaper, such as 180 grit sandpaper, positioned on a steel plate. If the glass article attached to the puck survives the fall (i.e., does not crack), the chuck 12 is set at an increased height and the test is repeated. The failure height is then the lowest height from which the puck including the glass article is dropped and the glass composition fails. A single glass article is tested at multiple heights, such as at 22 cm, 30 cm, 40 cm, 50 cm, 60 cm, and increments of 10 centimeters until the glass article fails by showing damage. The sandpaper is replaced upon failure of the glass. Unless otherwise indicated 80 grit sandpaper is used herein.

In one or more embodiments the failure height of the coated glass article may be greater than or equal to 50 cm, such as greater than or equal to 75 cm, greater than or equal to 100 cm, greater than or equal to 125 cm, greater than or equal to 150 cm, greater than or equal to 175 cm, or even greater than or equal to 200 cm. In some embodiments, the failure height of the coated glass articles is from about 50 cm to about 220 cm, such as from about 50 cm to about 200 cm, from about 50 cm to about 150 cm, from about 50 cm to about 100 cm, from about 100 cm to about 220 cm, from about 100 cm to about 200 cm, from about 100 cm to about 150 cm, from about 150 cm to about 220 cm, from about 150 cm to about 200 cm, from about 200 cm to about 220 cm, or any combination of these ranges.

The term "retained strength," as used herein, refers to the strength of a coated glass article after damage introduction by an impact force when the article is bent to impart tensile tress. Damage is introduced according to the method described in U.S. Patent Publication No. 2019/0072469 A1, which is incorporated herein by reference. For example, an apparatus for impact testing a glass article is shown as reference number 1100 in FIG. 14. The apparatus 1100 includes a pendulum 1102 including a bob 1104 attached to a pivot 1106. The term "bob" on a pendulum, as used herein, is a weight suspended from and connected to a pivot by an arm. Thus, the bob 1104 shown is connected to the pivot 1106 by an arm 1108. The bob 1104 includes a base 1110 for receiving a glass article, and the glass article is affixed to the base. The apparatus 1100 further includes an impacting object 1140 positioned such that when the bob 1104 is released from a position at an angle greater than zero from the equilibrium position, the surface of the bob 1104 contacts the impacting object 1140. The impacting object includes an abrasive sheet having an abrasive surface to be placed in contact with the outer surface of the glass article. The abrasive sheet may comprise sandpaper, which may have a grit size in the range of 30 grit to 400 grit, or 100 grit to 300 grit, for example 180 grit.

For purposes of this disclosure, the impacting object was in the form of a 6 mm diameter disk of 180 grit sandpaper affixed to the apparatus. A glass article having a thickness of approximately 600.0 μm was affixed to the bob. For each impact, a fresh sandpaper disk was used. Damage on the glass article was done by pulling the swing of the arm of the apparatus to approximately a 90° angle.

After twelve hours or more of the damage introduction, the glass articles were fractured in four-point bending (4PB) test as defined by ASTM C-158. The damaged glass article was placed on support rods (support span) with the damaged site on the bottom (i.e., on the tension side) and between the load roads (loading span). For purposes of this disclosure, the loading span was 15 mm and the support span was 30 mm. Loading was done at a constant displacement rate of 5 mm/min using a screw-driven testing machine (Instron®, Norwood, Massachusetts, USA) until failure of glass.

The applied fracture stress (or the applied stress to failure) in four-point bending (4PB) was calculated from the following Equation (4), $$\sigma_f = \frac{3P(L-a)}{2bh^2} \tag{4}$$

where, P is the maximum load to failure, L (=30 mm) is the distance between support rods (support span), a (=15 mm) is the distance between the loading rods (loading span), b is the width of the glass plate, and h is the thickness of the glass plate. In four-point bending, stress is constant under the loading span and thus, the damaged site is under mode I uniaxial tensile stress loading. The retained strength of the glass article is the highest applied fracture stress at which failure does not occur.

In one or more embodiments, the retained strength of the coated glass articles is greater than or equal to 250 MPa, such as greater than or equal to 300 MPa, greater than or equal to 350 MPa, or even greater than or equal to 400 MPa. In some embodiments the retained strength of the coated glass articles is from about 250 MPa to about 400 MPa, such as from about 250 MPa to about 350 MPa, from about 250 MPa to about 300 MPa, from about 300 MPa to about 400 MPa, from about 300 MPa to about 350 MPa, from about 350 MPa to about 400 MPa, or any combination of these ranges.

EXAMPLES

Embodiments will be further clarified by the following examples. It should be understood that these examples are not limiting to the embodiments described above.

Example 1

In this example, coated glass articles and uncoated control glass articles (designated "Sample 1", "Sample 2", "Comparative Example 1" and "Comparative Example 2", respectively) were tested using the Drop Test Method described in detail herein. Sample 1 and Comparative Example 1 used a sheet of Gorilla® Glass Victus® produced by Corning® Incorporated with a composition as specified below in Table 1. Sample 2 and Comparative Example 2 used a glass sheet having a composition as shown below in Table 2. Table 3 illustrates suitable exemplary compositions which contain the compositional ranges of the glass sheets associated with Tables 1 and 2.

TABLE 1

Substrate Composition of Comparative Example 1 and Sample 1

| Composition | Mol % |
|---|---|
| $SiO_2$ | 58.65 |
| $Al_2O_3$ | 17.85 |
| $P_2O_5$ | 1.47 |
| $B_2O_3$ | 4.22 |
| MgO | 1.19 |
| $Li_2O$ | 7.70 |
| $Na_2O$ | 8.72 |
| $K_2O$ | 0.07 |
| $TiO_2$ | 0.10 |
| $SnO_2$ | 0.04 |

TABLE 2

| Substrate Composition of Comparative Example 2 and Sample 2 | |
|---|---|
| Composition | Mol % |
| $SiO_2$ | 64.85 |
| $Al_2O_3$ | 15.55 |
| $P_2O_5$ | 0.86 |
| $B_2O_3$ | 3.22 |
| MgO | 0.54 |
| CaO | 1.46 |
| SrO | 1.07 |
| ZnO | 0.00 |
| $Li_2O$ | 7.21 |
| $Na_2O$ | 4.78 |
| $K_2O$ | 0.21 |
| $TiO_2$ | 0.18 |
| $SnO_2$ | 0.04 |
| $Fe_2O_3$ | 0.02 |
| $ZrO_2$ | 0.01 |
| $Li_2O/Na_2O$ | 1.51 |

TABLE 3

| Suitable Compositions of Substrates | |
|---|---|
| Composition | Mol % |
| $SiO_2$ | 50.0-70.0 |
| $Al_2O_3$ | 10.0-20.0 |
| $P_2O_5$ | 0.0-2.0 |
| $B_2O_3$ | 1.0-6.0 |
| $Li_2O$ | 5.0-10.0 |
| $Na_2O$ | 1.0-10.0 |
| $K_2O$ | 0.01-1.0 |

As noted above, each of Comparative Examples 1 and 2 and Samples 1 and 2 employ substrates with glass compositions within the ranges shown in Table 3. It is believed that similar glasses with compositions in the ranges of Table 3 will have similar improved drop performance and retained strength when coated with the optical coatings of the present disclosure. Further, without being bound by theory, it is believed that other glass compositions outside the ranges of Table 3, but as incorporating further aspects of this disclosure (e.g., a $Li_2O$:$Na_2O$ ratio of from 1.2 to 2.0 and/or a glass composition substantially free of $Ta_2O_5$, $HfO_2$, $La_2O_3$, and $Y_2O_3$) will also have similar improved drop performance and retained strength when coated with the optical coatings of the present disclosure, Samples 1 and 2 were formed by coating Comparative Examples 1 and Comparative Example 2, respectively, with a coating as shown in Table 4 where layer 1 is the layer disposed on the substrate and layer 19 is the outermost layer of the coating. Tables 5-9, show other suitable exemplary coatings, and articles with these coatings are believed to have the same or similar drop performance and retained strength improvements with the disclosed glass substrates. The coatings of Tables 5-9 (layer 1 in each design is disposed on (or contacting) the substrate) are exemplary other coatings which, when coated on the substrates of Tables 1-3, are also believed to have the same or similar drop performance and retained strength improvements with the disclosed glass substrates and coatings of this example that employ the coating in Table 4.

TABLE 4

| Optical Coating Design | | |
|---|---|---|
| Layer | Material | Layer thickness (nm) |
| 1 | SiO2 | 25 |
| 2 | SiOxNy | 10 |
| 3 | SiO2 | 69.2 |
| 4 | SiOxNy | 21.4 |
| 5 | SiO2 | 57.9 |
| 6 | SiOxNy | 35.5 |
| 7 | SiO2 | 38.3 |
| 8 | SiOxNy | 50.5 |
| 9 | SiO2 | 19.6 |
| 10 | SiOxNy | 62.6 |
| 11 | SiO2 | 6.4 |
| 12 | SiOxNy | 2050 |
| 13 | SiO2 | 8 |
| 14 | SiNx | 42.5 |
| 15 | SiO2 | 25.75 |
| 16 | SiNx | 40.5 |
| 17 | SiO2 | 47.2 |
| 18 | SiNx | 22.1 |
| 19 | SiO2 | 133.0 |

TABLE 5

| Optical Coating Design | | |
|---|---|---|
| Layer | Material | Layer thickness (nm) |
| 1 | SiO2 | 29.3 |
| 2 | SiOxNy | 7.05 |
| 3 | SiO2 | 77.3 |
| 4 | SiOxNy | 14.65 |
| 5 | SiO2 | 69.7 |
| 6 | SiOxNy | 27.74 |
| 7 | SiO2 | 45.9 |
| 8 | SiOxNy | 44.96 |
| 9 | SiO2 | 22.1 |
| 10 | SiOxNy | 60.1 |
| 11 | SiO2 | 6 |
| 12 | SiOxNy | 1800 |
| 13 | SiNx | 33.51 |
| 14 | SiO2 | 12.29 |
| 15 | SiNx | 66.97 |
| 16 | SiO2 | 22.6 |
| 17 | SiNx | 58.4 |
| 18 | SiO2 | 38.82 |
| 19 | SiNx | 51.33 |
| 20 | SiO2 | 40.82 |
| 21 | SiNx | 62.31 |
| 22 | SiO2 | 32.55 |
| 23 | SiNx | 58.17 |
| 24 | SiO2 | 54.29 |
| 25 | SiNx | 33.07 |
| 26 | SiO2 | 76.43 |
| 27 | SiNx | 36 |
| 28 | SiO2 | 1.465 |
| 29 | SiNx | 2.042 |
| 30 | SiO2 | 1.465 |
| 31 | SiNx | 2.042 |
| 32 | SiO2 | 1.465 |

TABLE 6

| Optical Coating Design | | |
|---|---|---|
| Layer | Material | Layer thickness (nm) |
| 1 | SiO2 | 20 |
| 2 | SiOxNy | 11.5 |
| 3 | SiO2 | 69.1 |
| 4 | SiOxNy | 25.2 |
| 5 | SiO2 | 58.96 |

TABLE 6-continued

| Optical Coating Design | | |
|---|---|---|
| Layer | Material | Layer thickness (nm) |
| 6 | SiOxNy | 40.6 |
| 7 | SiO2 | 39.78 |
| 8 | SiOxNy | 56.56 |
| 9 | SiO2 | 20.82 |
| 10 | SiOxNy | 69.27 |
| 11 | SiO2 | 6.8 |
| 12 | SiOxNy | 1960 |
| 13 | SiNx | 12.98 |
| 14 | SiO2 | 27.24 |
| 15 | SiNx | 33.01 |
| 16 | SiO2 | 50.09 |
| 17 | SiNx | 20.62 |
| 18 | SiO2 | 133.99 |

TABLE 7

| Optical Coating Design | | |
|---|---|---|
| Layer | Material | Layer thickness (nm) |
| 1 | SiO2 | 20 |
| 2 | SiOxNy | 11.5 |
| 3 | SiO2 | 69.1 |
| 4 | SiOxNy | 25.21 |
| 5 | SiO2 | 58.96 |
| 6 | SiOxNy | 40.59 |
| 7 | SiO2 | 39.78 |
| 8 | SiOxNy | 56.56 |
| 9 | SiO2 | 20.82 |
| 10 | SiOxNy | 69.27 |
| 11 | SiO2 | 6.8 |
| 12 | SiOxNy | 1960 |
| 13 | SiNx | 22.93 |
| 14 | SiO2 | 20.14 |
| 15 | SiNx | 55.16 |
| 16 | SiO2 | 16.55 |
| 17 | SiNx | 76.53 |
| 18 | SiO2 | 16.64 |
| 19 | SiNx | 60.93 |
| 20 | SiO2 | 37.82 |
| 21 | SiNx | 29.77 |
| 22 | SiO2 | 130.89 |

TABLE 8

| Optical Coating Design | | |
|---|---|---|
| Layer | Material | Layer thickness (nm) |
| 1 | SiO2 | 20 |
| 2 | SiOxNy | 11.5 |
| 3 | SiO2 | 69.1 |
| 4 | SiOxNy | 25.21 |
| 5 | SiO2 | 58.96 |
| 6 | SiOxNy | 40.59 |
| 7 | SiO2 | 39.78 |
| 8 | SiOxNy | 56.56 |
| 9 | SiO2 | 20.82 |
| 10 | SiOxNy | 69.27 |
| 11 | SiO2 | 6.8 |
| 12 | SiOxNy | 1960 |
| 13 | SiO2 | 9.34 |
| 14 | SiOxNy | 58.47 |
| 15 | SiO2 | 33.71 |
| 16 | SiOxNy | 32.05 |
| 17 | SiO2 | 125.16 |

TABLE 9

| Optical Coating Design | | |
|---|---|---|
| Layer | Material | Layer thickness (nm) |
| 1 | SiO2 | 20 |
| 2 | SiOxNy | 8.94 |
| 3 | SiO2 | 75.91 |
| 4 | SiOxNy | 18.39 |
| 5 | SiO2 | 76.53 |
| 6 | SiOxNy | 28.52 |
| 7 | SiO2 | 64.29 |
| 8 | SiOxNy | 40.92 |
| 9 | SiO2 | 47.75 |
| 10 | SiOxNy | 54.51 |
| 11 | SiO2 | 30.95 |
| 12 | SiOxNy | 66.96 |
| 13 | SiO2 | 16.5 |
| 14 | SiOxNy | 74.92 |
| 15 | SiO2 | 6 |
| 16 | SiOxNy | 1900 |
| 17 | SiNx | 18.66 |
| 18 | SiO2 | 18.79 |
| 19 | SiNx | 38.88 |
| 20 | SiO2 | 15.82 |
| 21 | SiNx | 42.67 |
| 22 | SiO2 | 12.48 |
| 23 | SiNx | 61.37 |
| 24 | SiO2 | 8.4 |
| 25 | SiNx | 92.2 |
| 26 | SiO2 | 8 |
| 27 | SiNx | 75.76 |
| 28 | SiO2 | 22.57 |
| 29 | SiNx | 49.73 |
| 30 | SiO2 | 48.35 |
| 31 | SiNx | 24.94 |
| 32 | SiO2 | 140.68 |

Figure 19:
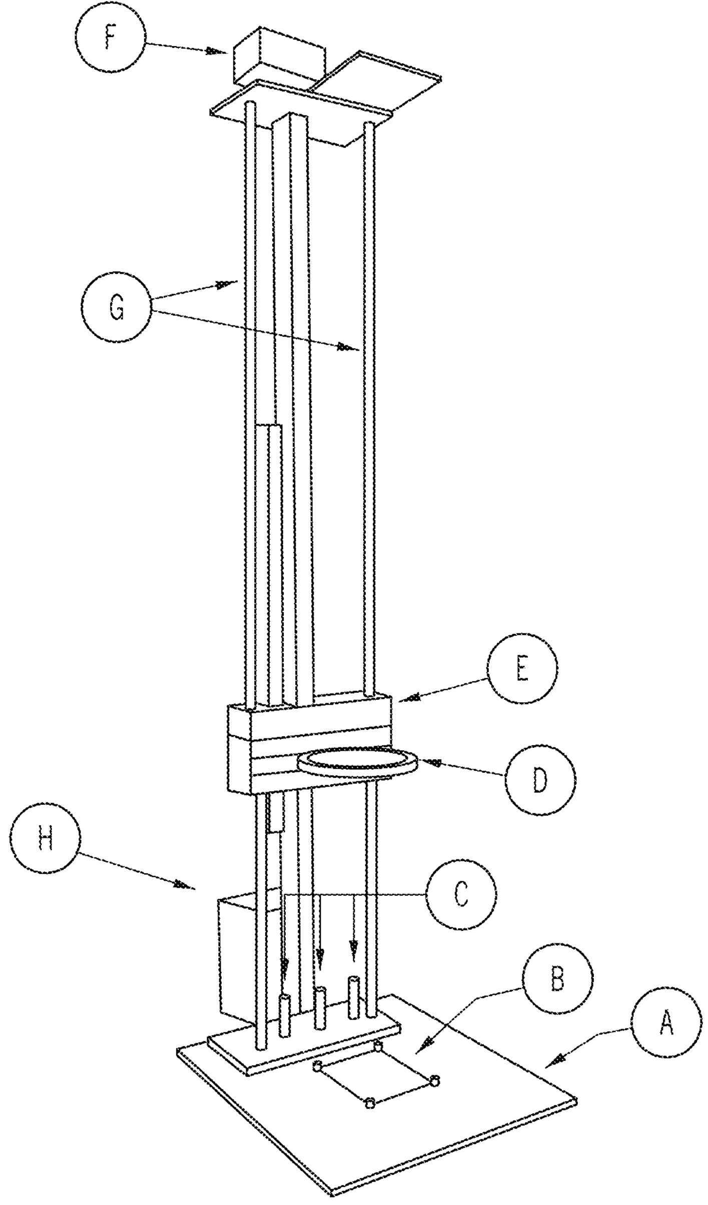
FIG. 19 is an image of an exemplary device-drop machine that may be used to conduct the Drop Test Method according to one or more embodiments described herein.

As described hereinabove a Drop Test method was used to test to the coated articles of the present disclosure. The drop testing was carried out using a "puck" designed to simulate a mobile handheld device from specific heights (from 22 cm to 220 cm) and specific angles (0 deg, 30 deg, etc.) on desired drop surfaces (specific grit sandpapers (30 grit, 80 grit, 180 grit), sandpaper grits with various materials (e.g., $Al_2O_3$, garnet), rough granite, asphalt, etc.)). The drop testing is done using a commercial drop tower manufactured by Shinyei Corporation, (however one may use a machine from a different manufacturer with similar capabilities). An example drop tower is shown in FIG. 19. The drop tower has a drop platform (A), a drop surface (B), stop buffers (C), a chuck assembly (D), and electro-magnetic chuck lifter I, a chuck raise/lower winch (F), guide rods (G), and a main control panel (H).

Figure 20:
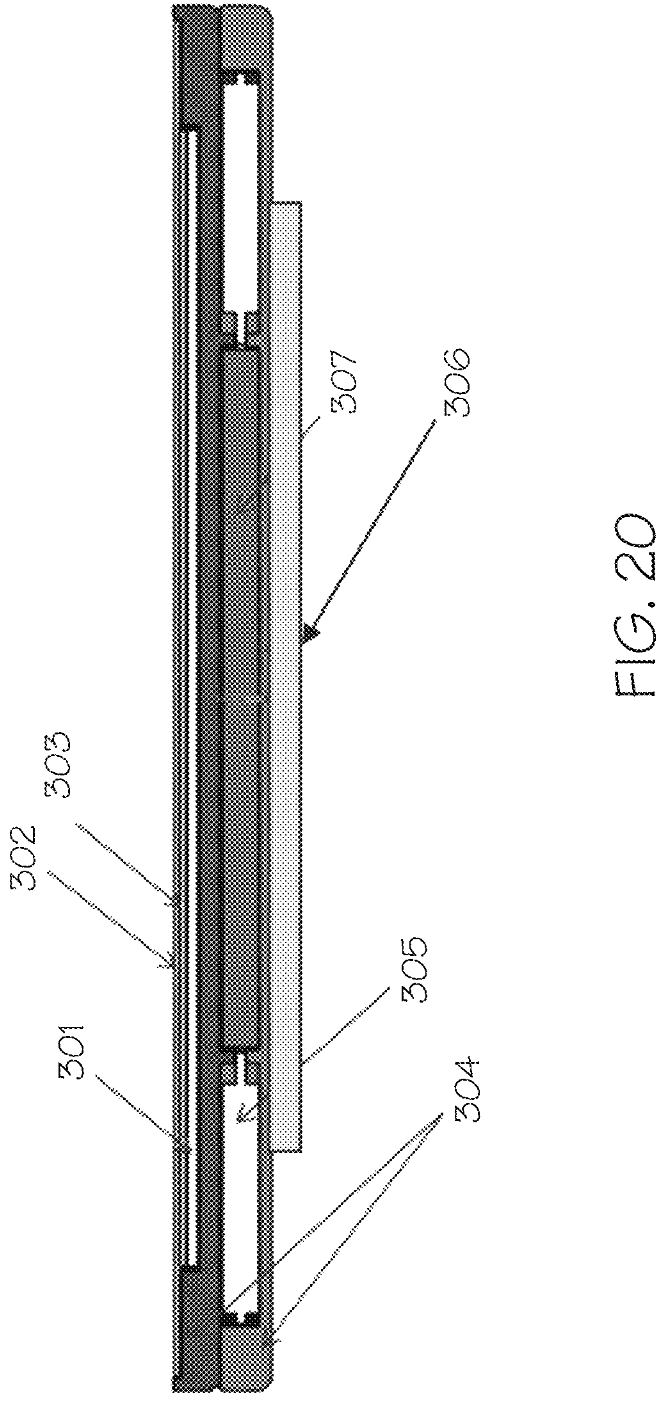
FIG. 20 is a cross-section of a simulated mobile handheld device that may be used to conduct the Drop Test Method according to one or more embodiments described herein.
Figure 21:
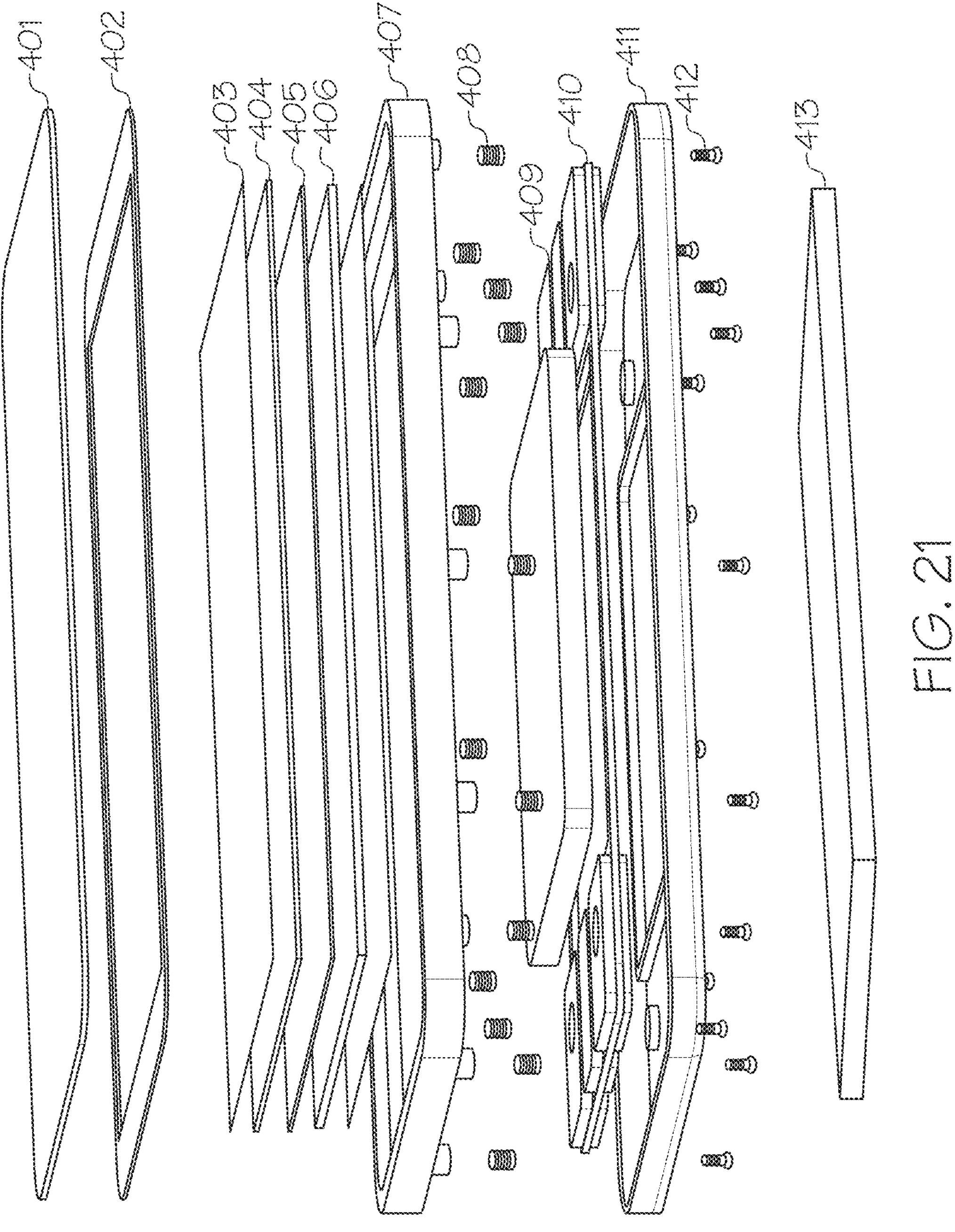
FIG. 21 is another view of a simulated mobile handheld device that may be used to conduct the Drop Test Method according to one or more embodiments described herein.
Figure 22:
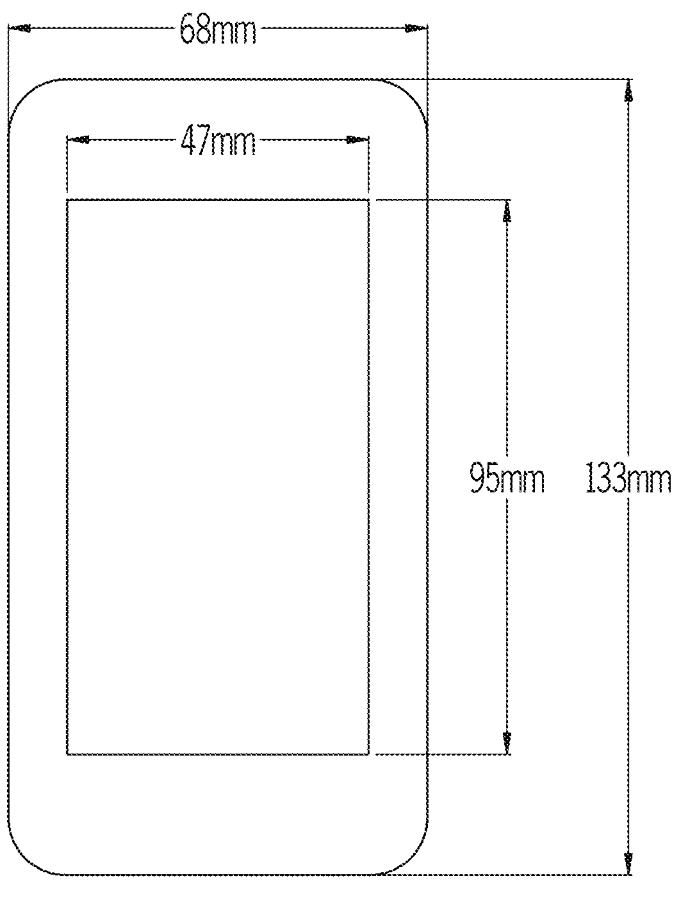
FIG. 22 is a schematic view of one face of a simulate mobile handheld device that may be used to conduct the Drop Test Method according to one or more embodiments described herein.
Figure 23:
FIG. 23 is an image of an exemplary simulated mobile handheld device that may be used to conduct the Drop Test Method according to one or more embodiments described herein.

The cover glass to be tested was assembled in a puck designed to simulate a mobile handheld device. A cross-section of the puck is shown in FIG. 20. FIG. 21 shows a detailed view of the puck. FIG. 22 shows a schematic view of the back of the puck. FIG. 23 shows an example of a cover glass in an assembled puck. Properties of the puck are shown in Table 10.

TABLE 10

| Puck for Drop Test | |
|---|---|
| Property | Puck |
| Mass (g) | 200 |
| Glass size X/Y (mm) | 130.2 × 65.2 |
| Mass/Unit area (g/mm^2) | 0.02355979 |
| Bezel proud (mm) | 0.05 |

Figure 24:
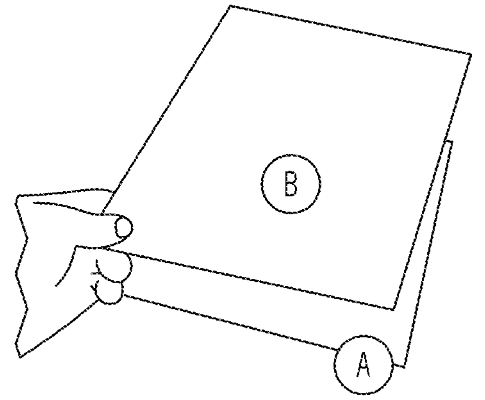
FIG. 24 is an image of an exemplary drop surface that may be used to conduct the DROP Test Method according to one or more embodiments described herein.
Figure 24:
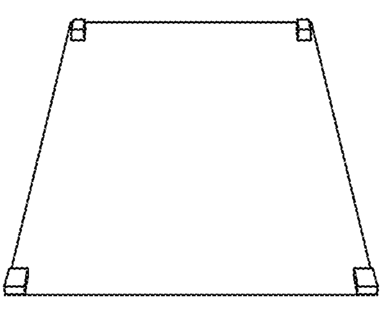

For controlled and repeatable drop testing, the drops were done at a specific angle and on a specific sandpaper that mimics real life surface. The puck was dropped flat (Zero degree) on 3M 80 grit sandpaper. For Flat face drop on 3M 80 grit Garnet sandpaper, first the drop surface is prepared as shown in FIG. 24. Two layers of sandpaper were used, the bottom sandpaper "A" is 180 grit $Al_2O_3$ paper which acts as the base and the desired test surface "B", here 80 Grit 3M Garnet sandpaper "B" was laid on top of "A". The bottom sheet (A) remains in-place, drop after drop, and served simply as a means of preventing the top sheet from moving from its staged location. The top sheet (B) was changed every time a new device was loaded (i.e.: for each device tested one sandpaper sheet was used). Magnets were placed at the corners of the sandpaper for additional stability. This held the sandpaper in-place during the drop procedure and there was no displacement. It was made sure that the sandpaper was flat, and had no visible damages in the target center area where the Puck device was to be dropped. For flat face drop testing the assembled puck with cover glass is aligned in the jaws of the drop tower to be flat using dual axis inclinometer and made sure the angles are aligned to zero degrees.

The drop testing was done at a starting height of 22 cm, then 30 cm, 40 cm and so on with a delta of 10 cm. The chuck was raised to required drop height (start 22 cm) and dropped flat on the drop surface. High speed videos were captured from X and Y directions to make sure the drop is flat and it is <2 degrees in both directions (i.e.: along short and long axis of the puck). After the drop from the desired height the cover glass was inspected for chipping and fractures. If there was a chip or fracture in the glass it was deemed as a failure and the failure height is noted, and if there were no chips or fractures in the cover glass the device was raised to the next height and dropped, this process was continued until the cover glass chipped or fractured. Once the cover glass failed, the sandpaper was removed and a new sandpaper was placed as per the above procedure and a new cover glass puck was loaded and adjusted to be flat. The start height was brought to 22 cm and continued from there.

The same drop procedure was followed for both the comparative examples and the coated samples. 15-20 of each cover glass sample were dropped for each condition and the corresponding failure heights were noted. The resulting data was the summary of description of the product and the corresponding failure height. The data was plotted as an individual value plot (FIGS. 15 and 16) and the mean failure of the control and coated parts were compared. After the drops the samples are submitted for Failure Mode Analysis (FMA) to understand the nature of the failure.

Figure 15:
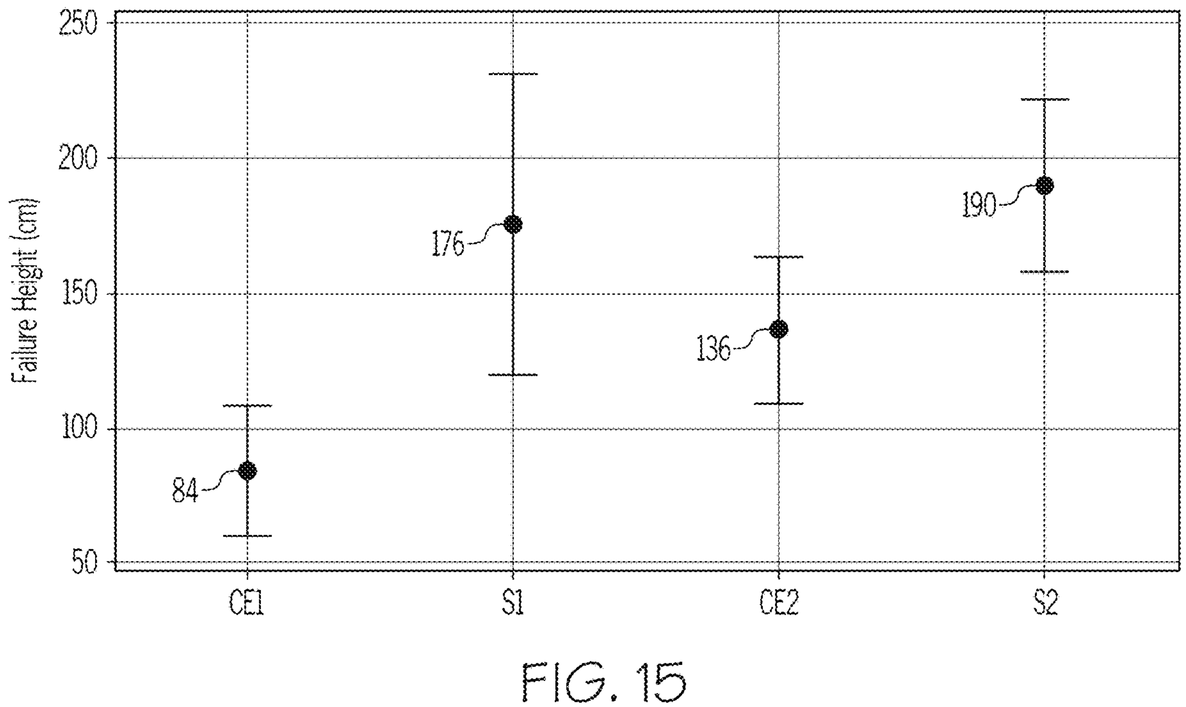
FIG. 15 is a box plot of the failure height of example glass articles versus comparative glass articles according to one or more embodiments described herein.
Figure 16:
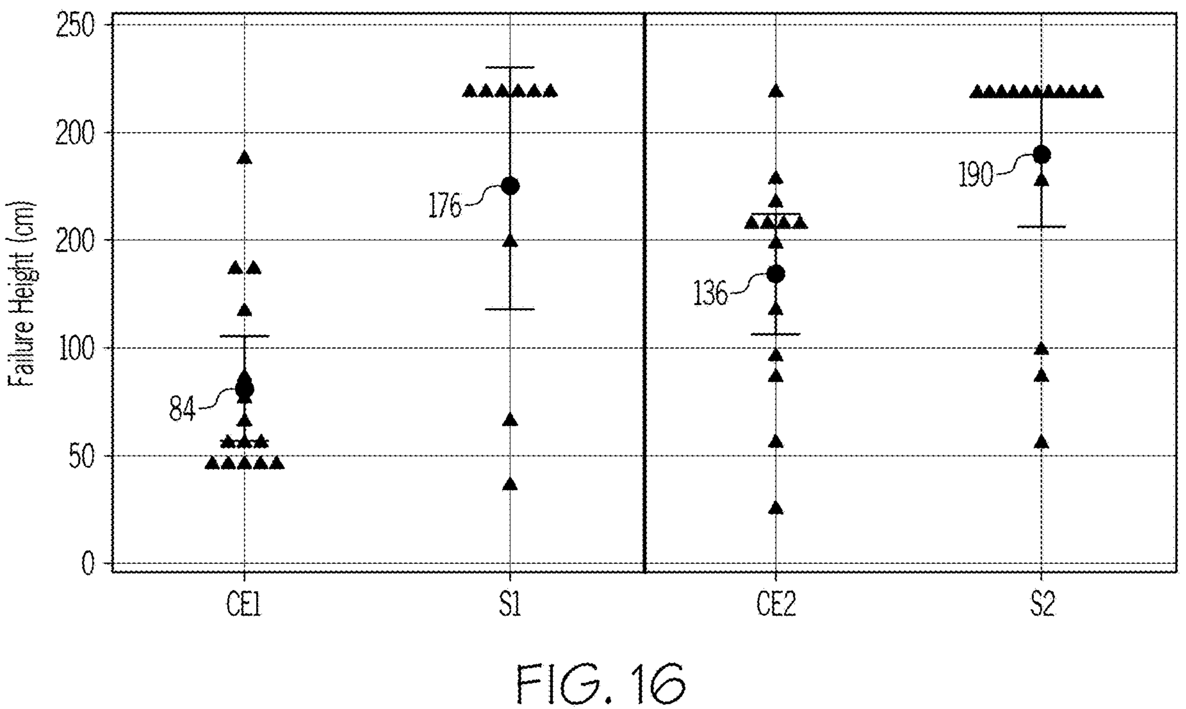
FIG. 16 is the plot of the failure height of example glass articles versus comparative glass articles of FIG. 15, as including all raw failure height data, according to one or more embodiments described herein.

The results of the Drop Test Method testing are shown in FIG. 15 and FIG. 16. As shown in FIGS. 15 and 16, the coated samples (e.g., Samples 1 and 2, designated "S1" and "S2" in FIGS. 15 and 16) had improved drop performance when compared to the uncoated glass substrates of Comparative Examples 1 and 2 (designated "CE1" and "CE2" in FIGS. 15 and 16) indicating that the combination of the coating and the glass improved the drop performance of the overall glass article. For both glass compositions (i.e., Gorilla® Glass Victus® and the composition of Tables 1-2), the proposed drop ranges for the Comparative Examples 1 and 2 was from 22 cm to 175 cm, and for the coated glass (i.e., Samples 1 and 2) the range was from 50 cm to 220 cm.

Example 2

In Example 2, the retained strength of Samples 1 and 2 and Comparative Examples 1 and 2 after damage introduction by an impact force was tested using the method described hereinabove and now described in further detail.

Figure 14:
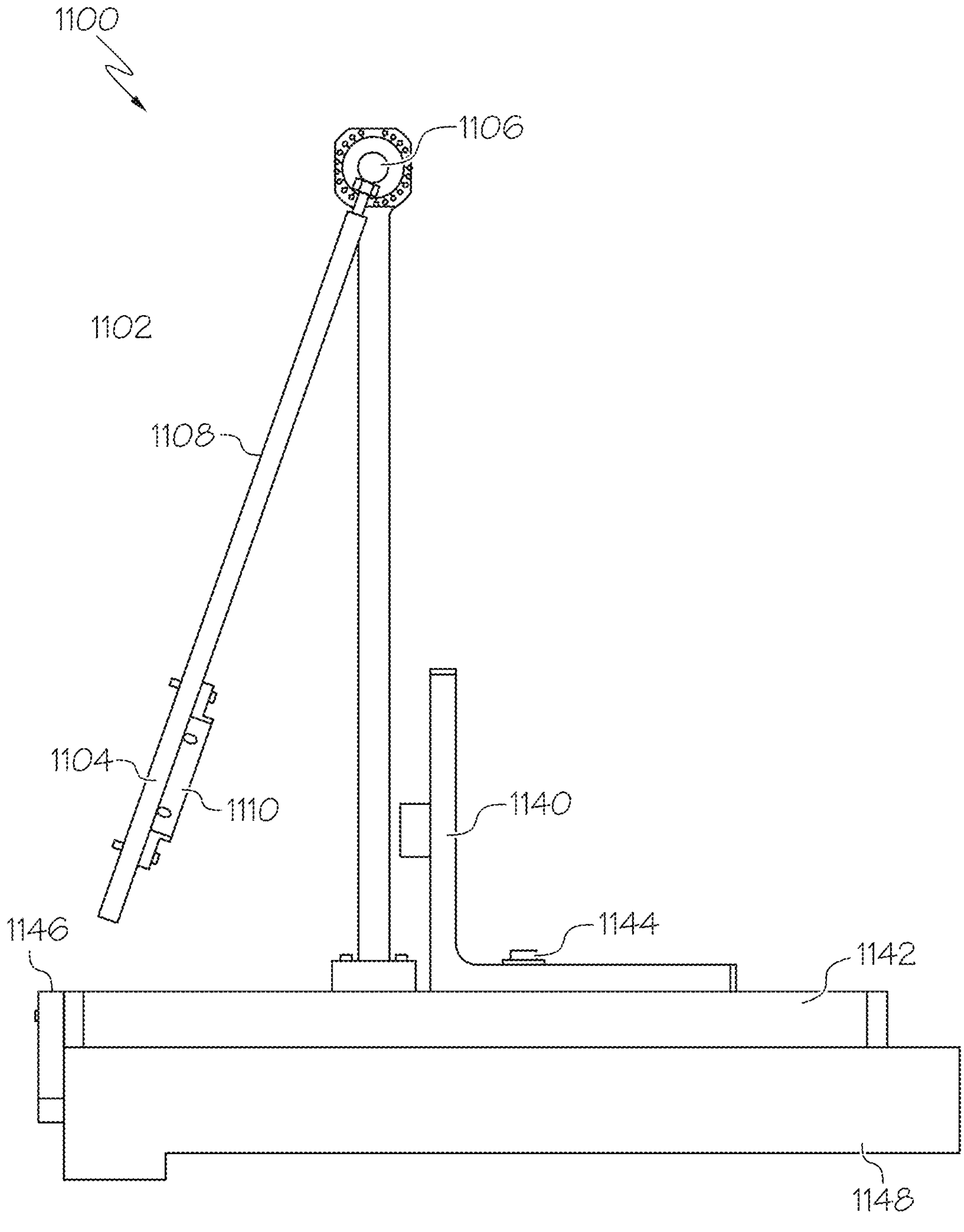
FIG. 14 is a schematic view of an apparatus that introduces damage to a glass article via impact with an impacting object according to one or more embodiments described herein.
Figure 25:
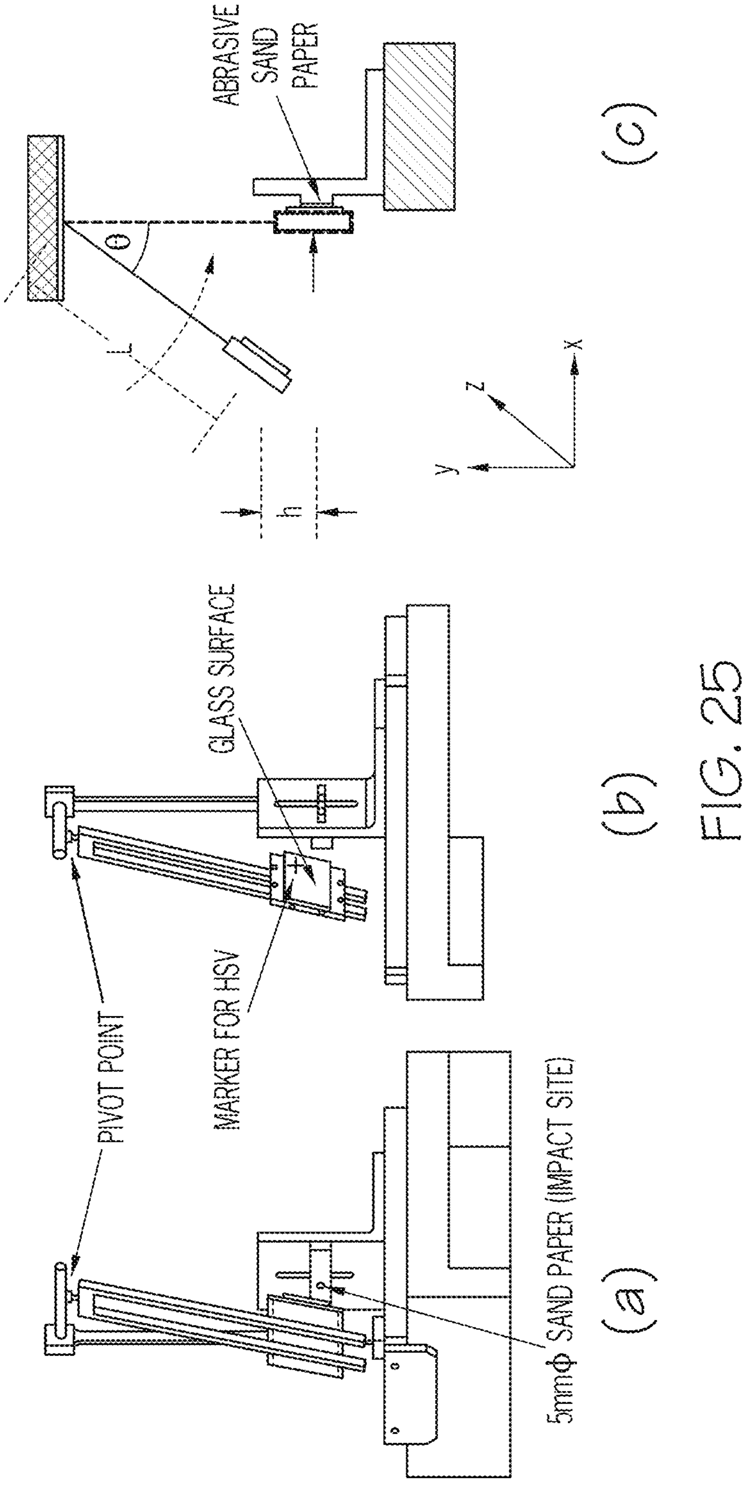
FIG. 25 is another schematic view of an apparatus that introduces damage to a glass article via impact with an impacting object according to one or more embodiments described herein.

In the retained strength test, controlled damage was introduced on the surface of the test cover glass specimen and the retained strength (MPa) of the test specimen was measured using ASTM (C-158) specified Four-point bend test post damage (4PB). The 4PB will provide the failure stress after damage. The comparative examples without coating and the coated samples were tested similarly and compared. The coated Samples provide clear advantage over non-coated comparative examples for sharp contact damage. It is believed that the coating protects from damage introduction on the surface compared to the uncoated comparative examples. The damage is introduced on the surface using 180 grit Garnet sandpaper. A schematic view of the impact damage apparatus is shown in FIG. 14 and also in FIGS. 25A-25C.

Figure 26:
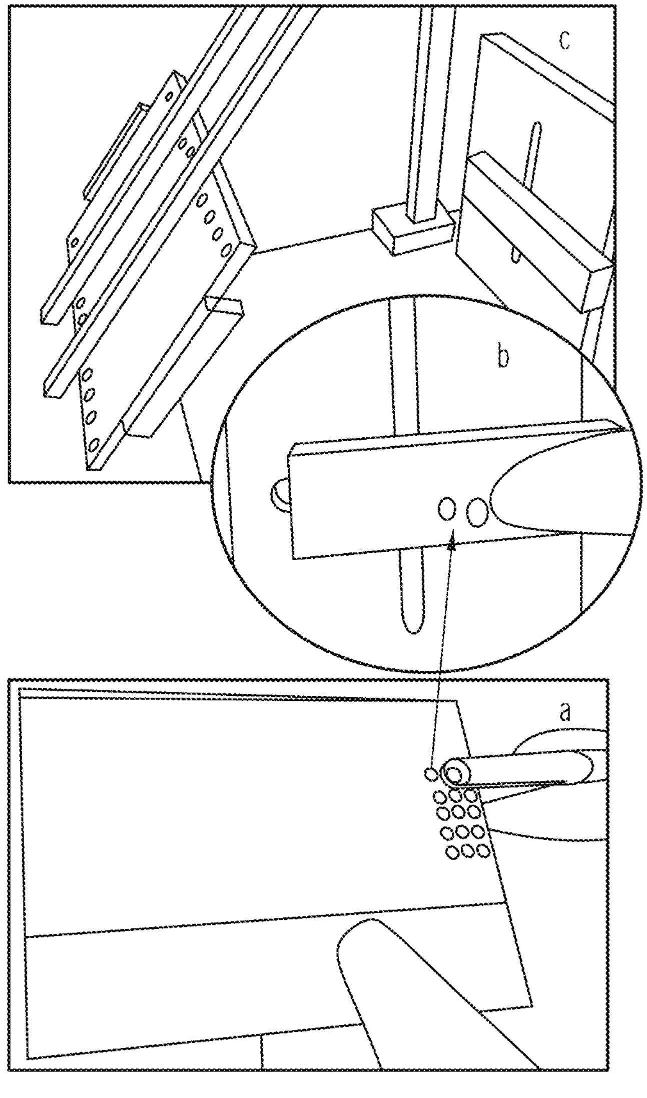
FIG. 26 is an image showing the preparation of the impacting object of an apparatus that introduces damage to a glass article via impact with an impacting object according to one or more embodiments described herein.
Figure 27:
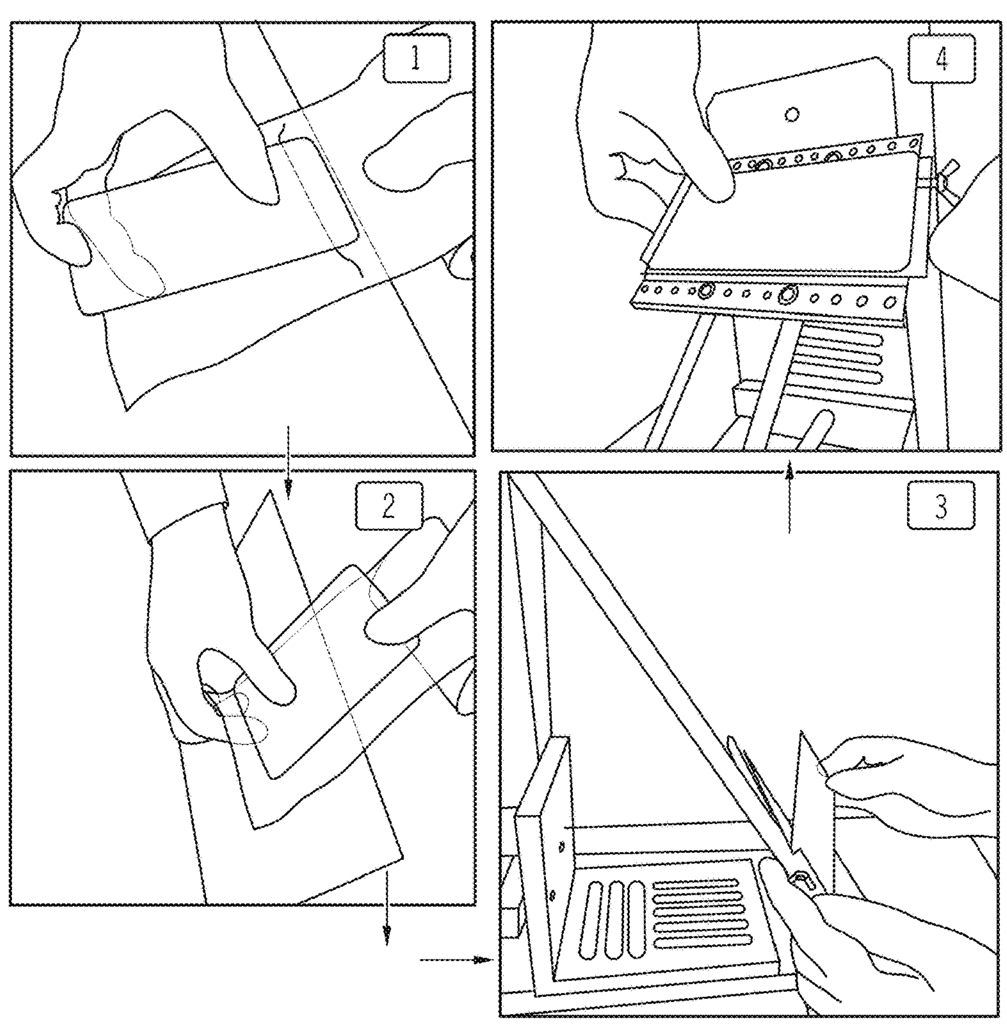
FIG. 27 is an image of the preparation of a glass article for used with an apparatus that introduces damage to a glass article via impact with an impacting object according to one or more embodiments described herein.
Figure 28:
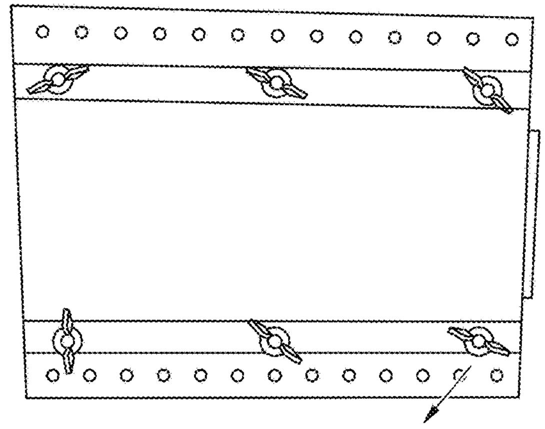
FIG. 28 is an image of a glass article positioned in an apparatus that introduces damage to a glass article via impact with an impacting object according to one or more embodiments described herein.

To introduce a flaw on the surface, the desired sandpaper (180 grit Garnet) was cut using a punch. The punched diameter was approximately 5 mm. This circular cut 180 grit sandpaper was secured on the "impact site" as shown in FIG. 26 with double-sided tape. To ensure safe collection of broken specimens after testing, test cover glass was laminated first on one side with a 130 μm thick vinyl tape, covering the entire surface. The laminated cover glass was then seated on the flat surface of the specimen holder with the non-laminated surface of cover glass facing out and clamped using the screws. FIG. 27 shows the preparation of a cover glass sample for flaw introduction. FIG. 28 shows a cover glass sample secured on the impact damage apparatus. The specimen holder was normally made of DelRin® material.

Figure 29:
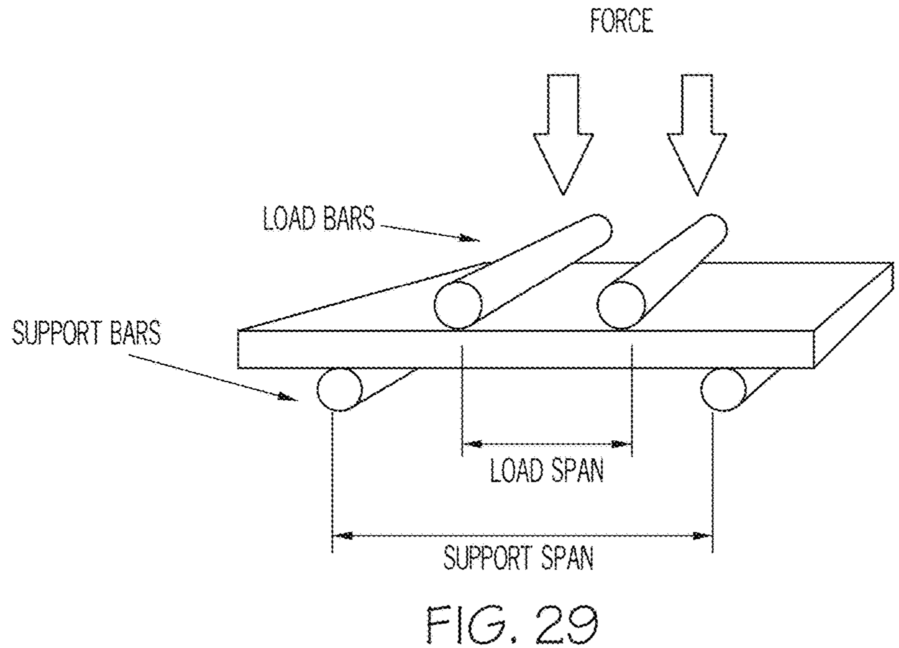
FIG. 29 is a schematic view of a testing setup for a 4 point bend test according to one or more embodiments described herein.

The angle of impact (Θ) was adjustable and was adjusted to desired angle and released freehand. The tested angle of impact was 90 degrees. After damage introduction the failure stress (MPa) was measured using the ASTM C-158 defined four-point bend test method. The four-point test setup is shown in FIG. 29. The setup had a pair of support knives and a pair of loading knives. This setup was secured in an Instron or similar equipment. Four-point bend is typically used to measure the edge strength of a part, here however it is used to understand the impact of damage introduction. If the damage is severe enough the failure will occur from the damage site instead of the edges. It is believed this is due to the weakening of the strength of the glass at the damage site, due to damage introduction causing the strength to be lower than the edge strength (glass fails in tension from the weakest link).

After introducing damage on the test cover glass by slapper, damaged side of the test specimen is placed in tension (facing down) in the center of the support bars of the 4PB set up and a force is applied by the load bar vertically till the test specimen breaks. The Load/Support spans are chosen so the Load-Deflection curve is linear. This will enable us to use the linear conversion equation from Load to failure (kgf) to Break stress (MPa), as shown below in Equation (5):

$$\sigma_f = \frac{3P(L-a)}{2bh^2} \tag{5}$$

In the load to stress conversion equation shown in Equation (5), P is the maximum load to failure, L (=30 mm) is the distance between support rods (support span), a (=15 mm) is the distance between the loading rods (loading span), b is the width of the glass plate, and h is the thickness of the glass plate. For 0.6 mm thick specimens and linearity of the Load-Deflection curve, the span ratio is 15 mm/30 mm (i.e., the load span spacing is 15 mm and the support span spacing is 30 mm).

Figure 17:
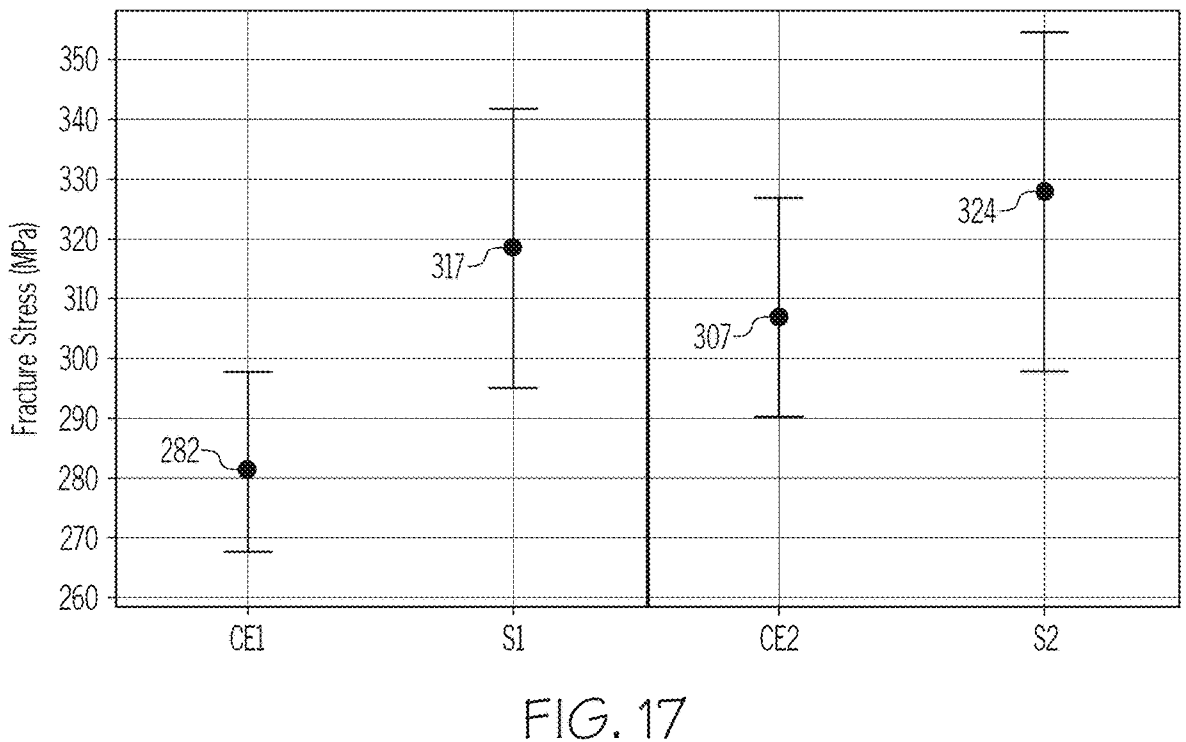
FIG. 17 is a box plot of the failure stress of example glass articles versus comparative glass articles according to one or more embodiments described herein.
Figure 18:
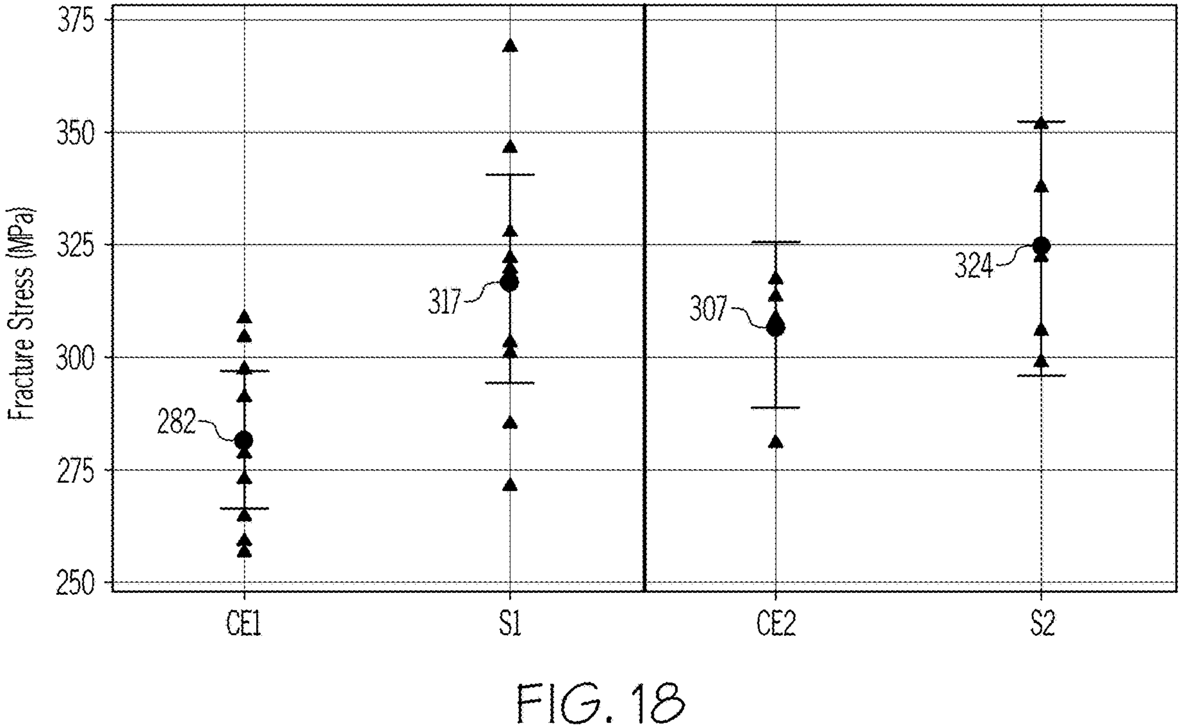
FIG. 18 is the plot of the failure stress of example glass articles versus comparative glass articles of FIG. 17, as including all raw failure stress data, according to one or more embodiments described herein.
Figure 30:
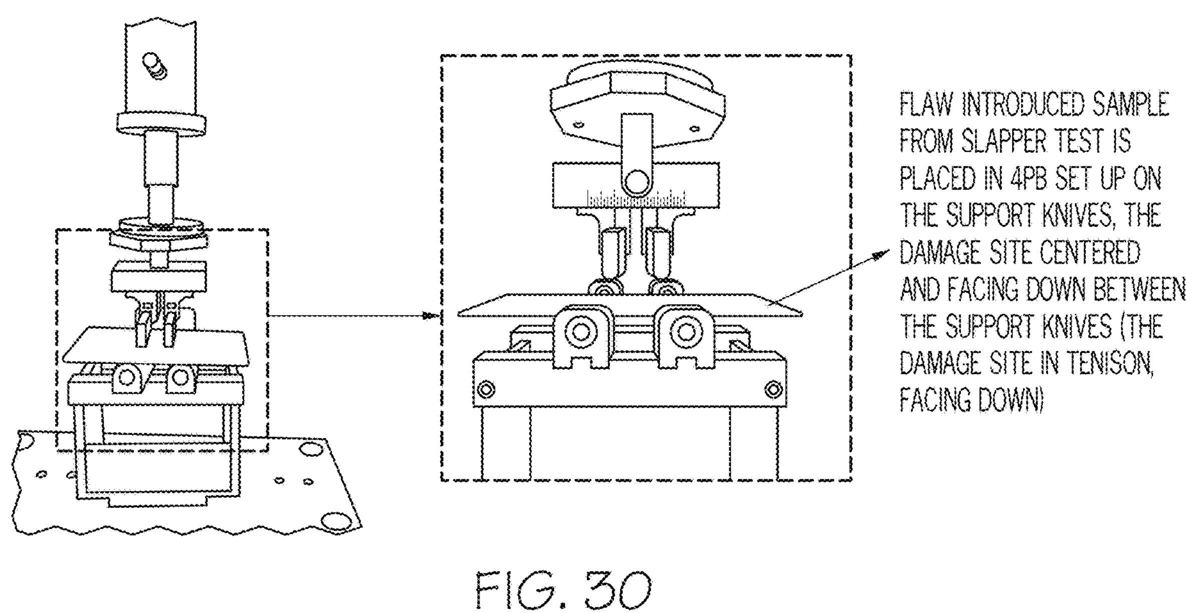
FIG. 30 is an image of an exemplary 4 point bend testing apparatus according to one or more embodiments described herein.

The flaw-introduced cover glass is placed in 4PB set up on the support knives, the damage site centered and facing down between the support knives (the damage site is in tension, facing down) as shown in FIG. 30. The results of the retained strength testing are shown in FIG. 17 and FIG. 18, both of which report failure stress (MPa) for each of the samples tested. As shown in FIGS. 17 and 18, the coated samples (i.e., Samples 1 and 2, designated "S1" and "S2" in FIGS. 17 and 18) had improved retained strength after damage introduction by an impact force when compared to the uncoated glass (i.e., Comparative Examples 1 and 2, designated "CE1" and "CE2" in FIGS. 17 and 18).

It will be appreciated that the various disclosed embodiments may involve particular features or elements that are described in connection with that particular embodiment. It will also be appreciated that a particular feature or element although described in relation to one particular embodiment, may be interchanged or combined with alternate embodiments in various non-illustrated combinations or permutations.

As outlined herein, a first aspect of the disclosure is a coated glass article that may comprise a glass substrate including a first major surface and a second major surface. The first major surface and the second major surface may be opposing sides of the glass substrate. The glass substrate may have a composition comprising: $SiO_2$ in an amount greater than or equal to 50.0 mol % and less than or equal to 70.0 mol %; $Al_2O_3$ in an amount greater than or equal to 10.0 mol % and less than or equal to 20.0 mol %; $P_2O_5$ in an amount greater than or equal to 0.0 mol % and less than or equal to 2.0 mol %; $B_2O_3$ in an amount greater than or equal to 1.0 mol % and less than or equal to 6.0 mol %; $Li_2O$ in an amount greater than or equal to 5.0 mol % and less than or equal to 10.0 mol %; $Na_2O$ in an amount greater than or equal to 1.0 mol % and less than or equal to 10.0 mol %; and $K_2O$ in an amount greater than or equal to 0.01 mol % and less than or equal to 1.0 mol %. The coated glass article may also comprise an optical coating disposed on the first major surface of the glass substrate. The optical coating may form an anti-reflective surface. The optical coating may comprise a scratch-resistant layer and an anti-reflective coating including a plurality of alternating high refractive index and low refractive index layers disposed between the scratch-resistant layer and the glass substrate. The optical coating may have a physical thickness of from about 50 nm to about 10 microns. The coated glass article may exhibit a maximum hardness of from about 10 GPa to about 30 GPa measured at an indentation depth of about 600 nm from the anti-reflective surface of the optical coating, the maximum hardness measured by a Berkovich Indenter Hardness Test. The coated glass article may exhibit a retained strength of greater than or equal to 250 MPa.

According to a second aspect of the disclosure, the first aspect is provided, wherein the coated class article exhibits a retained strength of from about 250 MPa to about 400 MPa.

According to a third aspect of the disclosure, any preceding aspect is provided, wherein the coated glass article has a failure height of greater than or equal to 50 cm as measured according to a Drop Test Method on 80 grit sandpaper.

According to a fourth aspect of the disclosure, any preceding aspect is provided, wherein the coated glass article has a failure height of from about 50 cm to about 220 cm as measured according to a Drop Test Method on 80 grit sandpaper.

According to a fifth aspect of the disclosure, any preceding aspect is provided, wherein the glass substrate has a compressive stress of greater than or equal to 500 MPa.

According to a sixth aspect of the disclosure, any preceding aspect is provided, wherein the glass substrate has a maximum central tension of greater than or equal to 20 MPa.

According to a seventh aspect of the disclosure, any preceding aspect is provided, wherein the glass substrate has a maximum central tension of less than or equal to 160 MPa.

According to an eighth aspect of the disclosure, any preceding aspect is provided, wherein the glass substrate has a depth of layer of greater than or equal to 3.0 microns.

According to a ninth aspect of the disclosure, any preceding aspect is provided, wherein the glass substrate has a depth of layer of less than or equal to 12 microns.

According to a tenth aspect of the disclosure, any preceding aspect is provided, wherein the plurality of alternating high refractive index and low refractive index layers comprises at least 3 layers.

According to an eleventh aspect of the disclosure, any preceding aspect is provided, wherein each low refractive index layer comprises a silicon-containing oxide, and each high refractive index layer comprises a silicon-containing nitride or a silicon-containing oxynitride.

According to a twelfth aspect of the disclosure, any preceding aspect is provided, wherein the scratch-resistant layer is a high refractive index layer.

According to a thirteenth aspect of the disclosure, any preceding aspect is provided, wherein the thickness of the scratch-resistant layer is from about 200 nm to about 5000 nm.

According to a fourteenth aspect of the disclosure, any preceding aspect is provided, wherein each low refractive index layer comprises at least one of $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$, and each high refractive index layer comprises at least one of $Si_uAl_vO_xN_y$, $Ta_2O_5$, $Nb_2O_5$, AlN, $Si_3N_4$, $AlO_xN_y$, $SiO_xN_y$, $SiN_x$, $SiN_xH_y$, $HfO_2$, $TiO_2$, $ZrO_2$, $Y_2O_3$, $Al_2O_3$, and $MoO_3$.

According to a fifteenth aspect of the disclosure, any preceding aspect is provided, wherein the coated glass article exhibits a two-sided average light transmittance measured at the anti-reflective surface of greater than or equal to about 92% over an optical wavelength regime in the range of from about 400 nm to about 800 nm.

According to a sixteenth aspect of the disclosure, any preceding aspect is provided, wherein the coated glass article exhibits an average single side reflectance of less than or equal to 3% over an optical wavelength range of from about 410 nm to about 1050 nm.

According to a seventeenth aspect of the disclosure, any preceding aspect is provided, wherein the coated glass article exhibits either one or both of: article transmittance color coordinates in the (L*, a*, b*) colorimetry system at normal incidence under an International Commission on Illumination illuminant exhibiting a reference point color shift of less than about 2 from a reference point as measured at the anti-reflective surface, the reference point comprising at least one of the color coordinates (a*=0, b*=0) and the transmittance color coordinates of the substrate, and article reflectance color coordinates in the (L*, a*, b*) colorimetry system at normal incidence under an International Commission on Illumination illuminant exhibiting a reference point color shift of less than about 5 from a reference point as measured at the anti-reflective surface, the reference point comprising at least one of the color coordinates (a*=0, b*=0), the color coordinates (a*=−2, b*=−2), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates (a*=−2, b*=−2), the color shift is defined by $\sqrt{((a^*_{article}+2)^2+(b^*_{article}+2)^2)}$. When the reference point is the color coordinates of the substrate, the color shift is defined by $\sqrt{((a^*_{article}-a^*_{substrate})^2+(b^*_{article}-b^*_{substrate})^2)}$.

According to an eighteenth aspect of the disclosure, the first aspect is provided, wherein the coated glass article exhibits a single side average photopic light reflectance measured at the anti-reflective surface at near normal incidence of about 10% or less over an optical wavelength regime in the range from about 400 nm to about 700 nm; and article reflectance color coordinates in the (L*, a*, b*) colorimetry system for at least one incidence angle from 0 degrees to 90 degrees under an International Commission on Illumination illuminant exhibiting a reference point color shift of more than about 18 from a reference point as measured at the anti-reflective surface, the reference point comprising at least one of the color coordinates (a*=0, b*=0), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{((a^*_{article}-a^*_{substrate})^2+(b^*_{article}-b^*_{substrate})^2)}$.

According to a nineteenth aspect of the disclosure, the first aspect is provided, wherein the coated glass article exhibits either one or both of: a single side photopic average light reflectance of about 12% or more; and a single side maximum reflectance of about 12% or more, measured at the anti-reflective surface for at least one near normal incident angle over an optical wavelength regime in the range from about 400 nm to about 700 nm. The article exhibits exhibits article reflectance color coordinates in the (L*, a*, b*) colorimetry system for at least one incidence angle from 0 degrees to 90 degrees under an International Commission on Illumination illuminant exhibiting a reference point color shift of more than 12 from a reference point as measured at the anti-reflective surface, the reference point comprising at least one of the color coordinates (a*=0, b*=0), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates of the substrate, the color shift is defined by $\sqrt{((a^*_{article}-a^*_{substrate})^2+(b^*_{article}-b^*_{substrate})^2)}$.

According to a twentieth aspect of the disclosure a coated glass article for a mobile display cover comprises a glass substrate having a composition comprising $SiO_2$ in an amount greater than or equal to 50.0 mol % and less than or equal to 70.0 mol %, $Al_2O_3$ in an amount greater than or equal to 10.0 mol % and less than or equal to 25.0 mol %, $Li_2O$ in an amount greater than or equal to 5.0 mol % and less than or equal to 15.0 mol %, wherein the glass substrate comprises a first major surface and a second major surface, wherein the first major surface and the second major surface are opposing sides of the glass substrate, and wherein the glass substrate comprises: a depth of layer of greater than or equal to 3 μm, an elastic modulus of greater than or equal to 72 GPa, and a fracture toughness of greater than or equal to 0.7 $MPa \cdot m^{0.5}$; and an optical coating disposed on the first major surface of the glass substrate, the coated glass article exhibits: an average photopic transmittance of greater than 85% and an average photopic reflectance of less than 8%; a maximum hardness of from about 12 GPa to about 30 GP as measured at an indentation depth of about 600 nm from the anti-reflective surface of the optical coating, the maximum hardness measured by a Berkovich Indenter Hardness Test; and a retained strength of greater than or equal to 250 MPa.

According to a twenty-first aspect of the disclosure the twentieth aspect is provided, wherein the coated glass article has a retained strength of from about 250 MPa to about 400 MPa.

According to a twenty-second aspect of the disclosure the twentieth or twenty-first aspect is provided, wherein the coated glass article has a failure height of greater than or equal to 50 cm as measured according to a Drop Test Method on 80 grit sandpaper.

According to a twenty-third aspect of the disclosure any of the twentieth to twenty-second aspects is provided, wherein the coated glass article has a failure height of greater than or equal to 50 cm to less than or equal to 220 cm as measured according to a Drop Test Method on 80 grit sandpaper.

According to a twenty-fourth aspect of the disclosure any of the twentieth to twenty-third aspects is provided, wherein the glass substrate has a composition further comprising: $P_2O_3$ in an amount greater than or equal to 0.0 mol % and less than or equal to 5.0 mol %; $B_2O_3$ in an amount greater than or equal to 0.0 mol % and less than or equal to 10.0 mol %; $Na_2O$ in an amount greater than or equal to 1.0 mol % and less than or equal to 15.0 mol %; and $K_2O$ in an amount greater than or equal to 0.0 mol % and less than or equal to 1.0 mol %.

According to a twenty-fifth aspect of the disclosure any of the twentieth to twenty-fourth aspects is provided, wherein the scratch-resistant layer is a high refractive index layer.

According to a twenty-sixth aspect of the disclosure any of the twentieth to twenty-fifth aspects is provided, wherein the maximum hardness is greater than or equal to 15 MPa and less than or equal to 30 MPa.

According to a twenty-seventh aspect of the disclosure any of the twentieth to twenty-sixth aspects is provided, wherein the thickness of the scratch-resistant layer is from about 200 nm to about 5000 nm.

According to a twenty-eighth aspect of the disclosure any of the twentieth to twenty-seventh aspects is provided, wherein the optical coating forming an anti-reflective surface, the optical coating comprising an anti-reflective coating comprising a plurality of alternating high refractive index and low refractive index layers and a scratch-resistant layer; each low refractive index layer comprises at least one of $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$, and each high refractive index layer comprises at least one of $Si_uAl_vO_xN_y$, $Ta_2O_5$, $Nb_2O_5$, AlN, $Si_3N_4$, $AlO_xN_y$, $SiO_xN_y$, $SiN_x$, $SiN_xH_yHfO_2$, $TiO_2$, $ZrO_2$, $Y_2O_3$, $Al_2O_3$, and $MoO_3$.

According to a twenty-ninth aspect of the disclosure any of the twentieth to twenty-eighth aspects is provided, wherein the plurality of alternating high refractive index and low refractive index layers comprises at least 3 layers.

According to a thirtieth aspect of the disclosure any of the twentieth to twenty-seventh aspects is provided, wherein the optical coating comprises a compositional gradient.

According to a thirty-first aspect of the disclosure any of the twentieth to thirtieth aspects is provided, wherein the coated glass article exhibits a two-sided average light transmittance measured at the anti-reflective surface of greater than or equal to about 92% over an optical wavelength regime in the range from about 400 nm to about 800 nm.

According to a thirty-second aspect of the disclosure any of the twentieth to thirty-first aspects is provided, wherein the coated glass article exhibits either one or both of: article transmittance color coordinates in the (L*, a*, b*) colorimetry system at normal incidence under an International Commission on Illumination illuminant exhibiting a reference point color shift of less than about 2 from a reference point as measured at the anti-reflective surface, the reference point comprising at least one of the color coordinates (a*=0, b*=0) and the transmittance color coordinates of the substrate, and article reflectance color coordinates in the (L*, a*, b*) colorimetry system at normal incidence under an International Commission on Illumination illuminant exhibiting a reference point color shift of less than about 5 from a reference point as measured at the anti-reflective surface, the reference point comprising at least one of the color coordinates (a*=0, b*=0), the color coordinates (a*=−2, b*=−2), and the reflectance color coordinates of the substrate. When the reference point is the color coordinates (a*=0, b*=0), the color shift is defined by $\sqrt{((a^*_{article})^2+(b^*_{article})^2)}$. When the reference point is the color coordinates (a*=−2, b*=−2), the color shift is defined by $\sqrt{((a^*_{article}+2)^2+(b^*_{article}+2)^2)}$. When the reference point is the color coordinates of the substrate, the color shift is defined by $\sqrt{((a^*_{article}-a^*_{substrate})^2+(b^*_{article}-b^*_{substrate})^2)}$.

According to a thirty-third aspect of the disclosure any of the twentieth to thirty-second aspects is provided, wherein the coated glass article exhibits an average single side reflectance of less than or equal to 3% over an optical wavelength range from about 410 nm to about 1050 nm.

According to a thirty-fourth aspect of the disclosure any of the twentieth to thirty-third aspects is provided, wherein the glass substrate has a compressive stress of greater than or equal to 500 MPa.

According to a thirty-fifth aspect of the disclosure any of the twentieth to thirty-fourth aspects is provided, wherein the glass substrate has a maximum central tension of greater than or equal to 20 MPa.

According to a thirty-sixth aspect of the disclosure any of the twentieth to thirty-fifth aspects is provided, wherein the glass substrate has a maximum central tension of less than or equal to 160 MPa.

According to a thirty-seventh aspect of the disclosure a coated glass article comprising: a glass substrate comprising a first major surface and a second major surface, wherein the first major surface and the second major surface are opposing sides of the glass substrate; an optical coating disposed on the first major surface of the glass substrate, the optical coating forming an anti-reflective surface, wherein the optical coating comprises a scratch-resistant layer and an anti-reflective coating comprising a plurality of alternating high refractive index and low refractive index layers disposed between the scratch-resistant layer and the glass substrate; wherein, the optical coating has a physical thickness of from about 50 nm to about 10 microns; wherein the coated glass article exhibits a maximum hardness of from about 10 GPa to about 30 GPa measured at an indentation depth of about 600 nm from the anti-reflective surface of the optical coating, the maximum hardness measured by a Berkovich Indenter Hardness Test; and wherein the coated glass article has a failure height of from about 50 cm to about 220 cm as measured according to a Drop Test Method on 80 grit Garnet sandpaper.

According to a thirty-eighth aspect of the disclosure the thirty-seventh aspect is provided, wherein the coated glass article exhibits a retained strength of greater than or equal to 250 MPa.

According to a thirty-ninth aspect of the disclosure the thirty-seventh aspect is provided, wherein the coated glass article exhibits a retained strength of from about 250 MPa to about 400 MPa.

According to a fortieth aspect of the disclosure any of the thirty-seventh to thirty-ninth aspects is provided, wherein the glass substrate comprises a glass-ceramic substrate.

According to a forty-first aspect of the disclosure a consumer electronic product, comprising: a housing comprising a front surface, a back surface and side surfaces; electrical components at least partially within the housing, the electrical components comprising a controller, a memory, and a display, the display at or adjacent to the front surface of the housing; and a coated glass article disposed over the display, wherein the coated glass article is in accordance with any of the thirty-seventh to fortieth aspects and aspects 48-50.

According to a forty-second aspect of the disclosure any of the first through nineteenth aspects is provided, wherein the composition of the glass substrate further comprises a lithium to sodium molar ratio ($Li_2O:Na_2O$) of from greater than or equal to 1.2 to less than or equal to 2.0.

According to a forty-third aspect of the disclosure any of the first through nineteenth aspects is provided, wherein the composition of the glass substrate is substantially free or free of $Ta_2O_5$, $HfO_2$, $La_2O_3$, and $Y_2O_3$.

According to a forty-fourth aspect of the disclosure any of the first through nineteenth aspects is provided, wherein the composition of the glass substrate comprises: 61-67 mol % $SiO_2$; 12-18 mol % $Al_2O_3$; 0.25-1.25 mol % $P_2O_5$; 2-4 mol % $B_2O_3$; 6-9 mol % $Li_2O$; 3-6 mol % $Na_2O$; and 0.1-0.5 mol % $K_2O$.

According to a forty-fifth aspect of the disclosure any of the twentieth through thirty-sixth aspects is provided, wherein the composition of the glass substrate further comprises: $Li_2O$ in an amount greater than or equal to 5.0 mol % and less than or equal to 10.0 mol %; $Na_2O$ in an amount greater than or equal to 1.0 mol % and less than or equal to 10.0 mol %; and a lithium to sodium molar ratio ($Li_2O:Na_2O$) of from greater than or equal to 1.2 to less than or equal to 2.0.

According to a forty-sixth aspect of the disclosure any of the twentieth through thirty-sixth aspects is provided, wherein the composition of the glass substrate is substantially free or free of $Ta_2O_5$, $HfO_2$, $La_2O_3$, and $Y_2O_3$.

According to a forty-seventh aspect of the disclosure any of the twentieth through thirty-sixth aspects is provided, wherein the composition of the glass substrate comprises: 61-67 mol % $SiO_2$; 12-18 mol % $Al_2O_3$; 0.25-1.25 mol % $P_2O_5$; 2-4 mol % $B_2O_3$; 6-9 mol % $Li_2O$; 3-6 mol % $Na_2O$; and 0.1-0.5 mol % $K_2O$.

According to a forty-eighth aspect of the disclosure any of the thirty-seventh through fortieth aspects is provided, wherein a composition of the glass substrate comprises: $Li_2O$ in an amount greater than or equal to 5.0 mol % and less than or equal to 10.0 mol %; $Na_2O$ in an amount greater than or equal to 1.0 mol % and less than or equal to 10.0 mol %; and a lithium to sodium molar ratio ($Li_2O:Na_2O$) of from greater than or equal to 1.2 to less than or equal to 2.0.

According to a forty-ninth aspect of the disclosure any of the thirty-seventh through fortieth aspects is provided, wherein the composition of the glass substrate is substantially free or free of $Ta_2O_5$, $HfO_2$, $La_2O_3$, and $Y_2O_3$.

According to a fiftieth aspect of the disclosure any of the thirty-seventh through fortieth aspects is provided, wherein a composition of the glass substrate comprises: 61-67 mol % $SiO_2$; 12-18 mol % $Al_2O_3$; 0.25-1.25 mol % $P_2O_5$; 2-4 mol % $B_2O_3$; 6-9 mol % $Li_2O$; 3-6 mol % $Na_2O$; and 0.1-0.5 mol % $K_2O$.

According to aspect 51 of the disclosure a consumer electronic product, comprising: a housing comprising a front surface, a back surface and side surfaces; electrical components at least partially within the housing, the electrical components comprising a controller, a memory, and a display, the display at or adjacent to the front surface of the housing; and a coated glass article disposed over the display, wherein the coated glass article is in accordance with any of the aspects 1-19 and 42-44.

According to aspect 52 of the disclosure a consumer electronic product, comprising: a housing comprising a front surface, a back surface and side surfaces; electrical components at least partially within the housing, the electrical components comprising a controller, a memory, and a display, the display at or adjacent to the front surface of the housing; and a coated glass article disposed over the display, wherein the coated glass article is in accordance with any of the aspects 20-36 and 45-47.

What is claimed is:

1. A coated glass article comprising:

a glass substrate comprising a first major surface and a second major surface, wherein the first major surface and the second major surface are opposing sides of the glass substrate, wherein the glass substrate has a composition comprising:

$SiO_2$ in an amount greater than or equal to 50.0 mol % and less than or equal to 70.0 mol %;

$Al_2O_3$ in an amount greater than or equal to 10.0 mol % and less than or equal to 20.0 mol %;

$P_2O_5$ in an amount greater than or equal to 0.0 mol % and less than or equal to 2.0 mol %;

$B_2O_3$ in an amount greater than or equal to 1.0 mol % and less than or equal to 6.0 mol %;

$Li_2O$ in an amount greater than or equal to 5.0 mol % and less than or equal to 10.0 mol %;

$Na_2O$ in an amount greater than or equal to 1.0 mol % and less than or equal to 10.0 mol %; and $K_2O$ in an amount greater than or equal to 0.01 mol % and less than or equal to 1.0 mol %; and an optical coating disposed on the first major surface of the glass substrate, the optical coating forming an anti-reflective surface, wherein the optical coating comprises a scratch-resistant layer and an anti-reflective coating comprising a plurality of alternating high refractive index and low refractive index layers disposed between the scratch-resistant layer and the glass substrate and over the scratch-resistant layer, wherein the thickness of the scratch-resistant layer is from about 500 nm to about 5000 nm, and wherein each of the plurality of alternating high refractive index and low refractive index layers disposed over the scratch-resistant layer have a thickness of less than 200 nm; and wherein the coated glass article exhibits a maximum hardness of from about 10 GPa to about 30 GPa measured at an indentation depth of about 600 nm from the anti-reflective surface of the optical coating, the maximum hardness measured by a Berkovich Indenter Hardness Test; and wherein the coated glass article exhibits a retained strength of greater than or equal to 250 MPa.

2. The coated glass article of claim 1, wherein the coated glass article exhibits a retained strength of from about 250 MPa to about 400 MPa.

3. The coated glass article of claim 1, wherein the coated glass article has a failure height of greater than or equal to 50 cm as measured according to a Drop Test Method on 80 grit sandpaper.

4. The coated glass article of claim 1, wherein the coated glass article has a failure height of from about 50 cm to about 220 cm as measured according to a Drop Test Method on 80 grit sandpaper.

5. The coated glass article of claim 1, wherein the glass substrate has a compressive stress of greater than or equal to 500 MPa.

6. The coated glass article of claim 1, wherein the glass substrate has a maximum central tension of greater than or equal to 20 MPa.

7. The coated glass article of claim 1, wherein the glass substrate has a maximum central tension of less than or equal to 160 MPa.

8. The coated glass article of claim 1, wherein the glass substrate has a depth of a compressive stress spike ($DOL_{SP}$) of greater than or equal to 3.0 microns.

9. The coated glass article of claim 1, wherein the glass substrate has a depth of a compressive stress spike ($DOL_{SP}$) of less than or equal to 12 microns.

10. The coated glass article of claim 1, wherein the plurality of alternating high refractive index and low refractive index layers comprises at least 3 layers.

11. The coated glass article of claim 1, wherein each low refractive index layer comprises a silicon-containing oxide, and each high refractive index layer comprises a silicon-containing nitride or a silicon-containing oxynitride.

12. The coated glass article of claim 1, wherein the scratch-resistant layer is a high refractive index layer.

13. The coated glass article of claim 1, wherein:

each low refractive index layer comprises at least one of $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$, and each high refractive index layer comprises at least one of $Si_uAl_vO_xN_y$, $Ta_2O_5$, $Nb_2O_5$, AlN, $Si_3N_4$, $AlO_xN_y$, $SiO_xN_y$, $SiN_x$, $SiN_xH_y$, $HfO_2$, $TiO_2$, $ZrO_2$, $Y_2O_3$, $Al_2O_3$, and $MoO_3$.

14. The coated glass article of claim 1, wherein the coated glass article exhibits a two-sided average light transmittance measured at the anti-reflective surface of greater than or equal to about 92% over an optical wavelength regime in the range of from about 400 nm to about 800 nm.

15. The coated glass article of claim 1, wherein the coated glass article exhibits an average single side reflectance of less than or equal to 3% over an optical wavelength range of from about 410 nm to about 1050 nm.

16. The coated glass article of claim 1, wherein the coated glass article exhibits either one or both of:

article transmittance color coordinates in the (L*, a*, b*) colorimetry system at normal incidence under an International Commission on Illumination illuminant exhibiting a reference point color shift of less than about 2 from a reference point as measured at the anti-reflective surface, the reference point comprising at least one of the color coordinates (a*=0, b*=0) and the transmittance color coordinates of the substrate, and article reflectance color coordinates in the (L*, a*, b*) colorimetry system at normal incidence under an International Commission on Illumination illuminant exhibiting a reference point color shift of less than about 5 from a reference point as measured at the anti-reflective surface, the reference point comprising at least one of the color coordinates (a*=0, b*=0), the color coordinates (a*=−2, b*=−2), and the reflectance color coordinates of the substrate, wherein, when the reference point is the color coordinates (a*=0, b*=0), the color shift is defined by $\sqrt{((a^*_{article})^2+(b^*_{article})^2)}$, wherein, when the reference point is the color coordinates (a*=−2, b*=−2), the color shift is defined by $\sqrt{((a^*_{article}+2)^2+(b^*_{article}+2)^2)}$, and wherein, when the reference point is the color coordinates of the substrate, the color shift is defined by $\sqrt{((a^*_{article}-a^*_{substrate})^2+(b^*_{article}-b^*_{substrate})^2)}$.

17. The coated glass article of claim 1, wherein the coated glass article exhibits:

a single side average photopic light reflectance measured at the anti-reflective surface at near normal incidence of about 10% or less over an optical wavelength regime in the range from about 400 nm to about 700 nm; and article reflectance color coordinates in the (L*, a*, b*) colorimetry system for at least one incidence angle from 0 degrees to 90 degrees under an International Commission on Illumination illuminant exhibiting a reference point color shift of more than about 18 from a reference point as measured at the anti-reflective surface, the reference point comprising at least one of the color coordinates (a*=0, b*=0), and the reflectance color coordinates of the substrate, wherein, when the reference point is the color coordinates (a*=0, b*=0), the color shift is defined by √((a*article)²+(b*article)²); and wherein, when the reference point is the color coordinates of the substrate, the color shift is defined by √((a*article−a*substrate)²+(b*article−b*substrate)²).

18. The coated glass article of claim 1, wherein the coated glass article exhibits either one or both of:

a single side photopic average light reflectance of about 12% or more; and a single side maximum reflectance of about 12% or more, measured at the anti-reflective surface for at least one near normal incident angle over an optical wavelength regime in the range from about 400 nm to about 700 nm; and wherein the article exhibits exhibits article reflectance color coordinates in the (L*, a*, b*) colorimetry system for at least one incidence angle from 0 degrees to 90 degrees under an International Commission on Illumination illuminant exhibiting a reference point color shift of more than 12 from a reference point as measured at the anti-reflective surface, the reference point comprising at least one of the color coordinates (a*=0, b*=0), and the reflectance color coordinates of the substrate;

wherein, when the reference point is the color coordinates (a*=0, b*=0), the color shift is defined by $\sqrt{((a^*_{article})^2+(b^*_{article})^2)}$; and wherein, when the reference point is the color coordinates of the substrate, the color shift is defined by $\sqrt{((a^*_{article}-a^*_{substrate})^2+(b^*_{article}-b^*_{substrate})^2)}$.

19. The coated glass article of claim 1, wherein the composition of the glass substrate further comprises a lithium to sodium molar ratio ($Li_2O$:$Na_2O$) of from greater than or equal to 1.2 to less than or equal to 2.0.

20. The coated glass article of claim 1, wherein the composition of the glass substrate is substantially free or free of $Ta_2O_5$, $HfO_2$, $La_2O_3$, and $Y_2O_3$.

21. The coated glass article of claim 1, wherein the composition of the glass substrate comprises:

61-67 mol % $SiO_2$;
12-18 mol % $Al_2O_3$;
0.25-1.25 mol % $P_2O_5$;
2-4 mol % $B_2O_3$;
6-9 mol % $Li_2O$;
3-6 mol % $Na_2O$; and
0.1-0.5 mol % $K_2O$.

22. A consumer electronic product, comprising:

a housing comprising a front surface, a back surface and side surfaces;

electrical components at least partially within the housing, the electrical components comprising a controller, a memory, and a display, the display at or adjacent to the front surface of the housing; and a coated glass article disposed over the display, wherein the coated glass article is in accordance with claim 1.

23. A coated glass article for a mobile display cover comprising:

a glass substrate having a composition comprising $SiO_2$ in an amount greater than or equal to 50.0 mol % and less than or equal to 70.0 mol %, $Al_2O_3$ in an amount greater than or equal to 10.0 mol % and less than or equal to 25.0 mol %, $Li_2O$ in an amount greater than or equal to 5.0 mol % and less than or equal to 15.0 mol %, wherein the glass substrate comprises a first major surface and a second major surface, wherein the first major surface and the second major surface are opposing sides of the glass substrate, and wherein the glass substrate comprises:

a depth of a compressive stress spike ($DOL_{SP}$) of greater than or equal to 3 μm;

an elastic modulus of greater than or equal to 72 GPa;

and a fracture toughness of greater than or equal to 0.7 $MPa{\cdot}m^{0.5}$; and an optical coating disposed on the first major surface of the glass substrate, wherein the optical coating comprises a scratch-resistant layer and an anti-reflective coating comprising a plurality of alternating high refractive index and low refractive index layers disposed between the scratch-resistant layer and the glass substrate and over the scratch-resistant layer, wherein the thickness of the scratch-resistant layer is from about 500 nm to about 5000 nm, and wherein each of the plurality of alternating high refractive index and low refractive index layers disposed over the scratch-resistant layer have a thickness of less than 200 nm; and wherein the coated glass article exhibits:

an average photopic transmittance of greater than 85% and an average photopic reflectance of less than 8%;

a maximum hardness of from about 12 GPa to about 30 GP as measured at an indentation depth of about 600 nm from the anti-reflective surface of the optical coating, the maximum hardness measured by a Berkovich Indenter Hardness Test; and a retained strength of greater than or equal to 250 MPa.

24. A coated glass article comprising:

a glass substrate comprising a first major surface and a second major surface, wherein the first major surface and the second major surface are opposing sides of the glass substrate, an optical coating disposed on the first major surface of the glass substrate, the optical coating forming an anti-reflective surface, wherein the optical coating comprises a scratch-resistant layer and an anti-reflective coating comprising a plurality of alternating high refractive index and low refractive index layers disposed between the scratch-resistant layer and the glass substrate and over the scratch-resistant layer, wherein the thickness of the scratch-resistant layer is from about 500 nm to about 5000 nm, and wherein each of the plurality of alternating high refractive index and low refractive index layers disposed over the scratch-resistant layer have a thickness of less than 200 nm; and wherein the coated glass article exhibits a maximum hardness of from about 10 GPa to about 30 GPa measured at an indentation depth of about 600 nm from the anti-reflective surface of the optical coating, the maximum hardness measured by a Berkovich Indenter Hardness Test; and wherein the coated glass article has a failure height of from about 50 cm to about 220 cm as measured according to a Drop Test Method on 80 grit Garnet sandpaper.

25. The coated glass article of claim 1, wherein the thickness of the scratch-resistant layer is from about 600 nm to about 2500 nm.

26. The coated glass article of claim 25, wherein the scratch-resistant layer is an oxynitride.

27. The coated glass article of claim 26, wherein the oxynitride is a silicon-containing oxynitride.

28. The coated glass article of claim 27, wherein the plurality of alternating high refractive index and low refractive index layers disposed between the scratch-resistant layer and the glass substrate comprise alternating layers of a silicon-containing oxynitride and $SiO_2$.

29. The coated glass article of claim 28, wherein the alternating high refractive index and low refractive index layers disposed over the scratch-resistant layer comprise alternating layers of a silicon-containing nitride and $SiO_2$.

30. The coated glass article of claim 1, wherein the composition of the glass substrate comprises $Al_2O_3$ in an amount greater than or equal to 15.0 mol % and less than or equal to 20.0 mol %.

31. The coated glass article of claim 1, wherein the optical coating has a physical thickness of less than or equal to about 10 microns.

32. The coated glass article of claim 23, wherein the optical coating has a physical thickness of less than or equal to about 10 microns.

33. The coated glass article of claim 24, wherein the optical coating has a physical thickness of less than or equal to about 10 microns.

* * * * *